United States Patent
Allegretti et al.

(10) Patent No.: US 11,919,729 B2
(45) Date of Patent: *Mar. 5, 2024

(54) BULK MATERIAL SHIPPING CONTAINER UNLOADER

(71) Applicant: SANDBOX ENTERPRISES, LLC, Katy, TX (US)

(72) Inventors: C. John Allegretti, Barrington Hills, IL (US); Kevin Sylvester Corrigan, Forest Park, IL (US); Margarito Guerrero, Bellwood, IL (US); Felix Guerrero, Bellwood, IL (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/307,433

(22) Filed: May 4, 2021

(65) Prior Publication Data

US 2022/0055846 A1 Feb. 24, 2022

Related U.S. Application Data

(63) Continuation of application No. 15/635,850, filed on Jun. 28, 2017, now Pat. No. 10,994,954.

(Continued)

(51) Int. Cl.
*B65D 90/12* (2006.01)
*B65D 88/02* (2006.01)
(Continued)

(52) U.S. Cl.
CPC .......... B65G 65/44 (2013.01); B65D 88/022 (2013.01); B65D 90/125 (2013.01);
(Continued)

(58) Field of Classification Search
CPC . B65F 1/122; B65D 90/125; B65D 2590/664; B65D 90/587; B65D 90/66;
(Continued)

(56) References Cited

U.S. PATENT DOCUMENTS 572,468 A 12/1896 Brown et al.
710,611 A 10/1902 Ray
(Continued)

FOREIGN PATENT DOCUMENTS

DE 1948503 A1 4/1971
WO 2012058059 A1 5/2012

OTHER PUBLICATIONS

Examination Report issued in corresponding Canadian Patent Application No. 2,945,454, dated Oct. 17, 2022 (7 pages).

*Primary Examiner* — Saul Rodriguez
*Assistant Examiner* — Willie W Berry, Jr.
(74) *Attorney, Agent, or Firm* — Osha Bergman Watanabe & Burton LLP

(57) ABSTRACT

An unloader for a shipping container includes a supporter having a frame structure and a pallet base supported by the frame structure and configured to receive the pallet and support the shipping container in an elevated position. A gate moving mechanism is supported by the pallet base and configured to engage the moveable gate assembly when the full shipping container is positioned onto the pallet base. A material director has a first end located beneath the pallet base subjacent of the gate moving mechanism. The material director extends downwardly from the pallet base and terminates at a second end opposite the first end. Bulk material is dispensed from the shipping container into the first end and is discharged from the second end of the material (Continued)

director. Shipping containers may be positioned onto and removed from the pallet base without disassembly of the unloader.

20 Claims, 83 Drawing Sheets

Related U.S. Application Data

(60) Provisional application No. 62/357,023, filed on Jun. 30, 2016, provisional application No. 62/410,089, filed on Oct. 19, 2016.

(51) Int. Cl.
  *B65D 90/58* (2006.01)
  *B65D 90/66* (2006.01)
  *B65G 11/02* (2006.01)
  *B65G 27/16* (2006.01)
  *B65G 65/44* (2006.01)
  *B65G 67/04* (2006.01)
  *B65G 67/06* (2006.01)
  *G01G 19/52* (2006.01)
  *B65D 88/12* (2006.01)

(52) U.S. Cl.
  CPC .......... *B65D 90/587* (2013.01); *B65D 90/66* (2013.01); *B65G 11/026* (2013.01); *B65G 27/16* (2013.01); *B65G 67/04* (2013.01); *B65G 67/06* (2013.01); *G01G 19/52* (2013.01); *B65D 88/129* (2013.01); *B65D 2590/664* (2013.01); *B65D 2590/668* (2013.01); *B65G 2201/04* (2013.01); *B65G 2814/0323* (2013.01); *B65G 2814/0344* (2013.01)

(58) Field of Classification Search
  CPC .......... B65D 88/022; B65G 2814/0323; B65G 27/16; B65G 11/026
  See application file for complete search history.

(56) References Cited

U.S. PATENT DOCUMENTS

| | | |
|---|---|---|
| 917,646 A | 4/1909 | Newey |
| 2,066,220 A | 12/1936 | Orcutt |
| 2,204,847 A | 6/1940 | Ebsworth |
| 2,385,245 A | 9/1945 | Willoughby |
| 2,462,693 A | 2/1949 | Wabshaw |
| 2,563,470 A | 8/1951 | Kane |
| 2,622,771 A | 12/1952 | Tulou |
| 2,640,598 A | 6/1953 | Peacock |
| 2,652,174 A | 9/1953 | Shea et al. |
| 2,670,866 A | 3/1954 | Glesby |
| 2,678,737 A | 5/1954 | Mangrum |
| 2,802,603 A | 8/1957 | Mccray |
| 2,865,521 A | 12/1958 | Fisher et al. |
| 2,894,666 A | 7/1959 | Campbell, Jr. |
| 2,972,322 A | 2/1961 | Parker et al. |
| 2,972,323 A | 2/1961 | Einarsson et al. |
| 3,049,248 A | 8/1962 | Heltzel et al. |
| 3,083,879 A | 4/1963 | Coleman |
| 3,151,779 A | 10/1964 | Rensch et al. |
| 3,270,921 A | 9/1966 | Nadolske et al. |
| 3,294,306 A | 12/1966 | Areddy |
| 3,318,473 A | 5/1967 | Jones et al. |
| 3,343,688 A | 9/1967 | Ross |
| 3,354,918 A | 11/1967 | Coleman |
| 3,406,995 A | 10/1968 | Mccarthy |
| 3,407,971 A | 10/1968 | Oehler |
| 3,476,270 A | 11/1969 | Cox et al. |
| 3,602,400 A | 8/1971 | Cooke |
| 3,752,511 A | 8/1973 | Racy |
| 3,785,534 A | 1/1974 | Smith |
| 3,797,727 A | 3/1974 | Downing et al. |
| 3,802,584 A | 4/1974 | Sackett et al. |
| 3,904,105 A | 9/1975 | Booth |
| 3,955,703 A | 5/1976 | Zebarth |
| 3,986,708 A | 10/1976 | Heltzel et al. |
| 3,999,290 A | 12/1976 | Wood |
| 4,008,147 A | 2/1977 | Kondo |
| 4,019,634 A | 4/1977 | Bonnot |
| 4,019,635 A | 4/1977 | Boots |
| 4,023,719 A | 5/1977 | Noyon |
| 4,056,295 A | 11/1977 | Downing |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,247,228 A | 1/1981 | Gray et al. |
| 4,258,953 A | 3/1981 | Johnson |
| 4,313,708 A | 2/1982 | Tiliakos |
| 4,398,653 A | 8/1983 | Daloisio |
| 4,626,166 A | 12/1986 | Jolly |
| 4,701,095 A | 10/1987 | Berryman et al. |
| 4,856,681 A | 8/1989 | Murray |
| D304,120 S | 10/1989 | Buchanan et al. |
| 4,890,740 A | 1/1990 | Tabler |
| 4,917,255 A | 4/1990 | Foy et al. |
| 4,919,583 A | 4/1990 | Speakman |
| D307,718 S | 5/1990 | Tabler |
| 4,936,458 A | 6/1990 | Tabler et al. |
| 4,946,068 A | 8/1990 | Erickson et al. |
| 4,948,186 A | 8/1990 | Pruitt |
| 4,956,821 A * | 9/1990 | Fenelon ............... B28C 7/067 366/26 |
| 4,960,207 A | 10/1990 | Tabler et al. |
| 4,966,310 A | 10/1990 | Hawkins |
| 4,974,737 A | 12/1990 | Miller |
| 4,993,883 A | 2/1991 | Jones |
| 4,995,522 A | 2/1991 | Barr |
| 5,036,979 A | 8/1991 | Selz |
| 5,094,356 A | 3/1992 | Miller |
| 5,096,096 A | 3/1992 | Calaunan |
| 5,224,635 A | 7/1993 | Wise |
| 5,232,120 A | 8/1993 | Dunken et al. |
| 5,269,455 A | 12/1993 | Grigsby et al. |
| 5,277,014 A | 1/1994 | White |
| 5,290,139 A | 3/1994 | Hedrick |
| 5,330,069 A | 7/1994 | Jamison et al. |
| 5,339,996 A | 8/1994 | Dubbert et al. |
| 5,375,730 A | 12/1994 | Bahr et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,439,113 A | 8/1995 | Elvin-Jensen |
| 5,441,321 A | 8/1995 | Karpisek |
| 5,445,289 A | 8/1995 | Owen |
| 5,524,750 A | 6/1996 | Miller |
| 5,564,599 A | 10/1996 | Barber et al. |
| 5,667,090 A | 9/1997 | Langham, Jr. et al. |
| 5,673,791 A | 10/1997 | Jamison |
| 5,715,962 A | 2/1998 | Mcdonnell |
| 5,722,550 A | 3/1998 | Ficker |
| 5,722,552 A | 3/1998 | Olson |
| 5,788,121 A | 8/1998 | Sasaki et al. |
| 5,803,296 A | 9/1998 | Olson |
| 5,895,865 A * | 4/1999 | Ozawa ............... G01F 1/206 73/861.73 |
| D688,350 S | 8/2013 | Oren et al. |
| D688,772 S | 8/2013 | Oren et al. |
| 8,545,148 B2 | 10/2013 | Wanek-Pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| D703,582 S | 4/2014 | Oren |
| 8,887,914 B2 | 11/2014 | Allegretti et al. |
| 8,915,691 B2 | 12/2014 | Mintz |
| 9,309,064 B2 | 4/2016 | Sheesley |

(56) References Cited

U.S. PATENT DOCUMENTS

| | | |
|---|---|---|
| 9,446,801 B1 | 9/2016 | Oren |
| 9,650,216 B2 * | 5/2017 | Allegretti .............. B65D 90/587 |
| 2008/0187423 A1 * | 8/2008 | Mauchle ............... B05B 7/1472 |
| | | 414/415 |
| 2013/0142421 A1 | 6/2013 | Silver et al. |
| 2014/0018129 A1 | 1/2014 | Baldini et al. |
| 2014/0018236 A1 | 1/2014 | Hikazudani et al. |
| 2014/0083554 A1 | 3/2014 | Harris |
| 2014/0305769 A1 | 10/2014 | Eiden, III et al. |
| 2015/0119799 A1 | 4/2015 | Wotton et al. |
| 2015/0191150 A1 | 7/2015 | Van Wiemeersch et al. |
| 2015/0192061 A1 | 7/2015 | Vallee et al. |
| 2015/0284194 A1 | 10/2015 | Oren et al. |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0044012 A1 | 2/2016 | Carrer et al. |
| 2016/0130095 A1 | 5/2016 | Oren et al. |
| 2016/0160067 A1 | 6/2016 | Xia et al. |
| 2016/0178694 A1 | 6/2016 | Fry et al. |
| 2016/0178695 A1 | 6/2016 | Zhang et al. |
| 2016/0244253 A1 * | 8/2016 | Oren ...................... B65G 65/30 |

\* cited by examiner

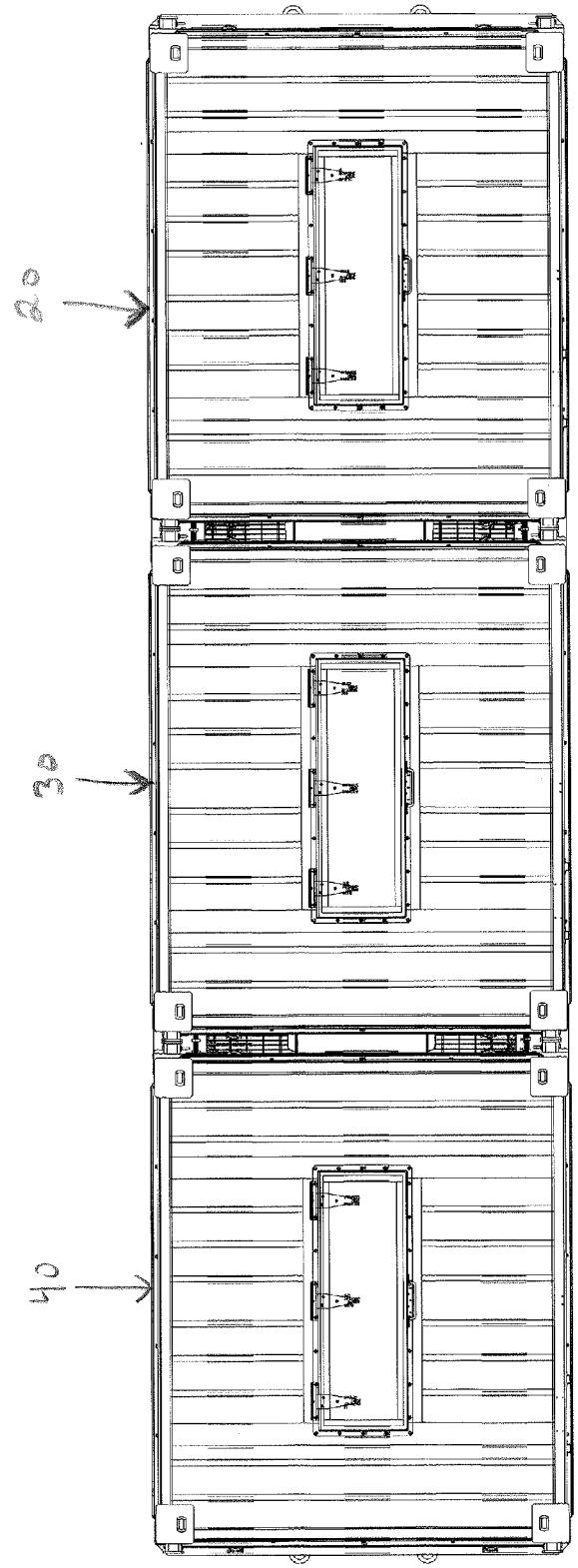

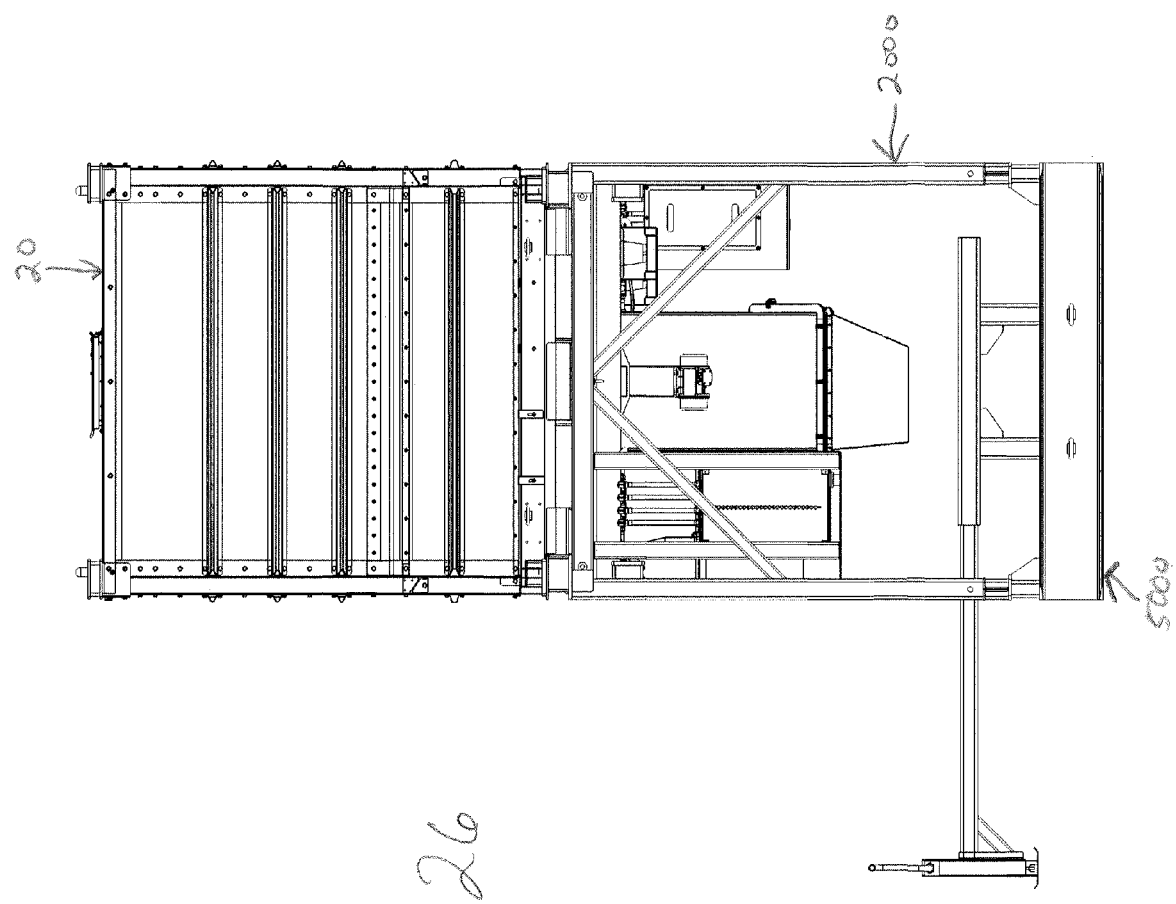

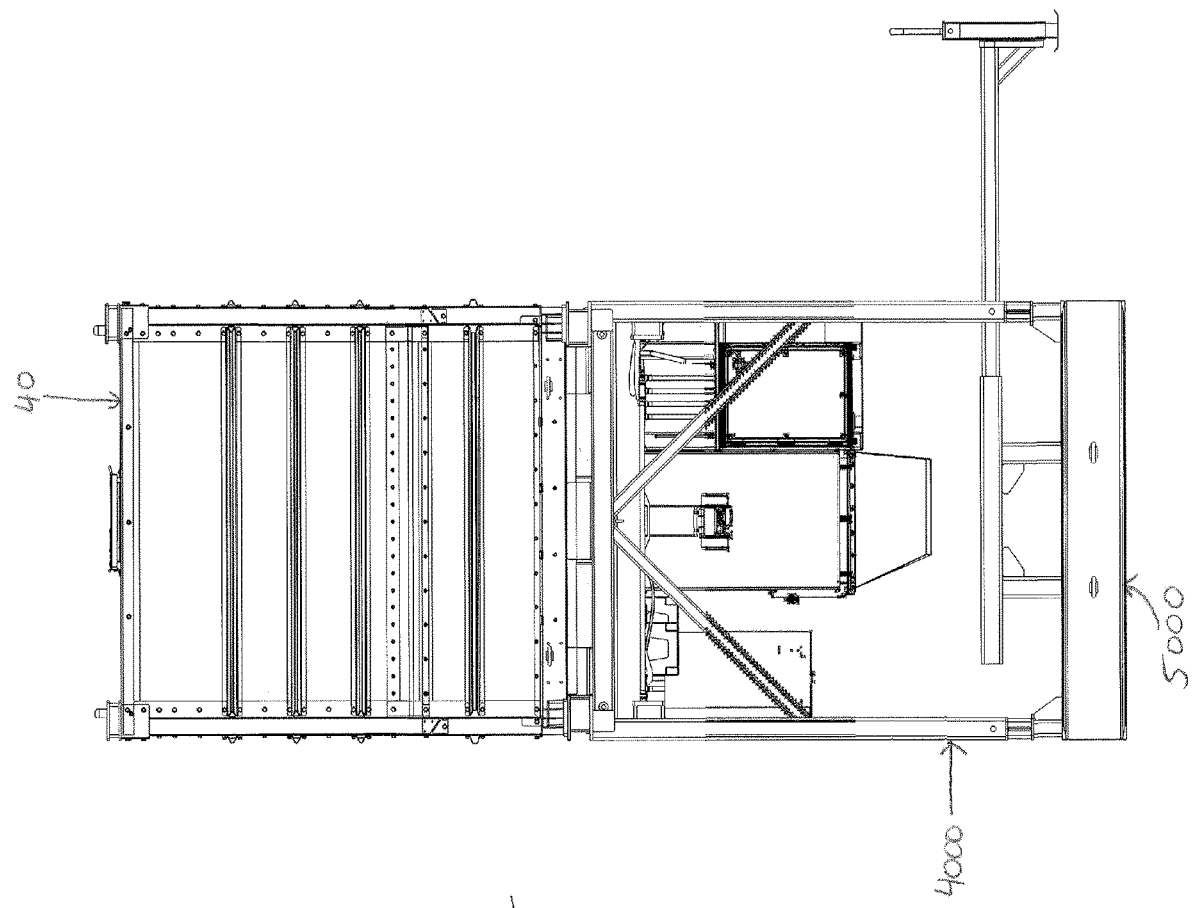

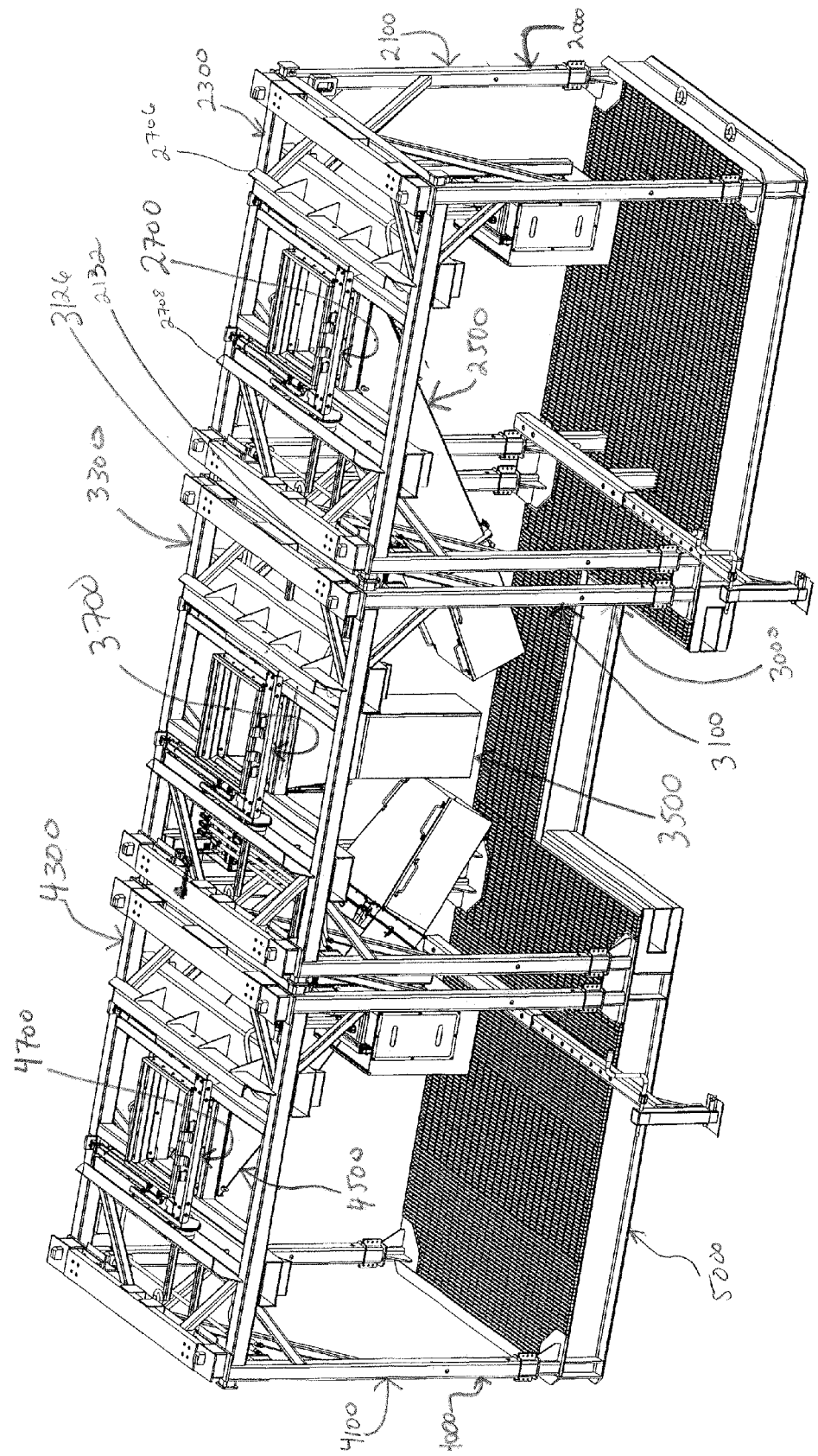

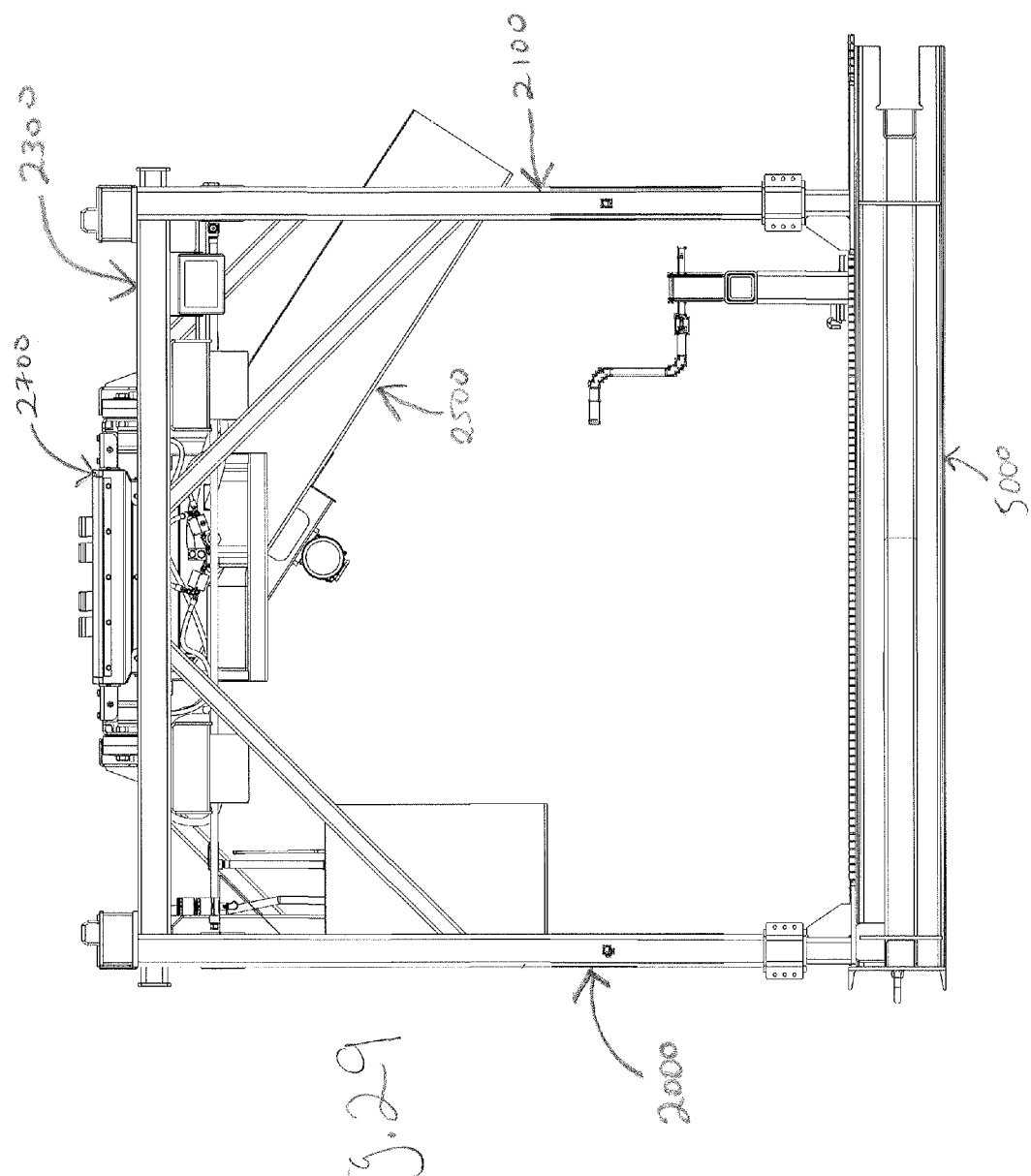

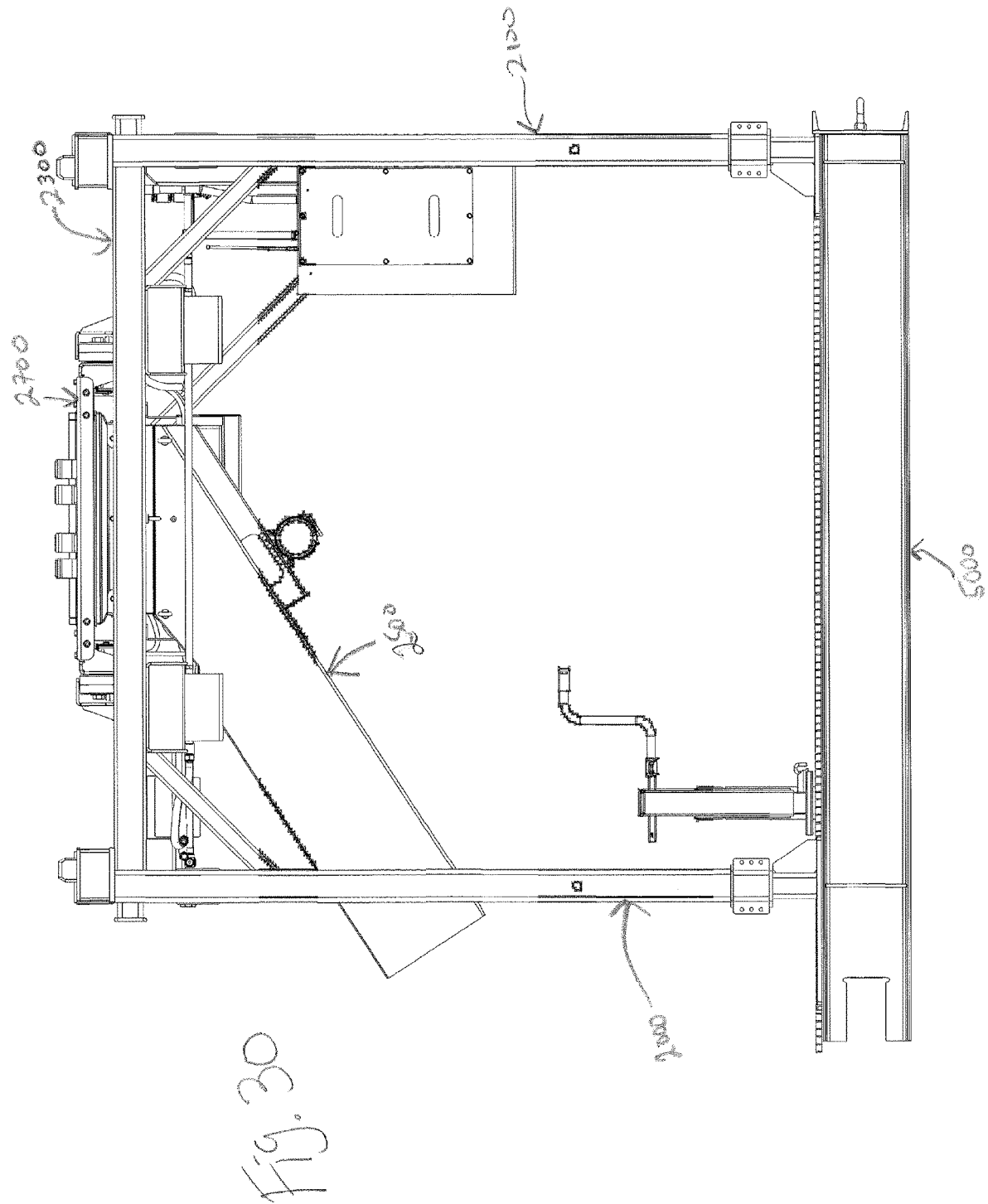

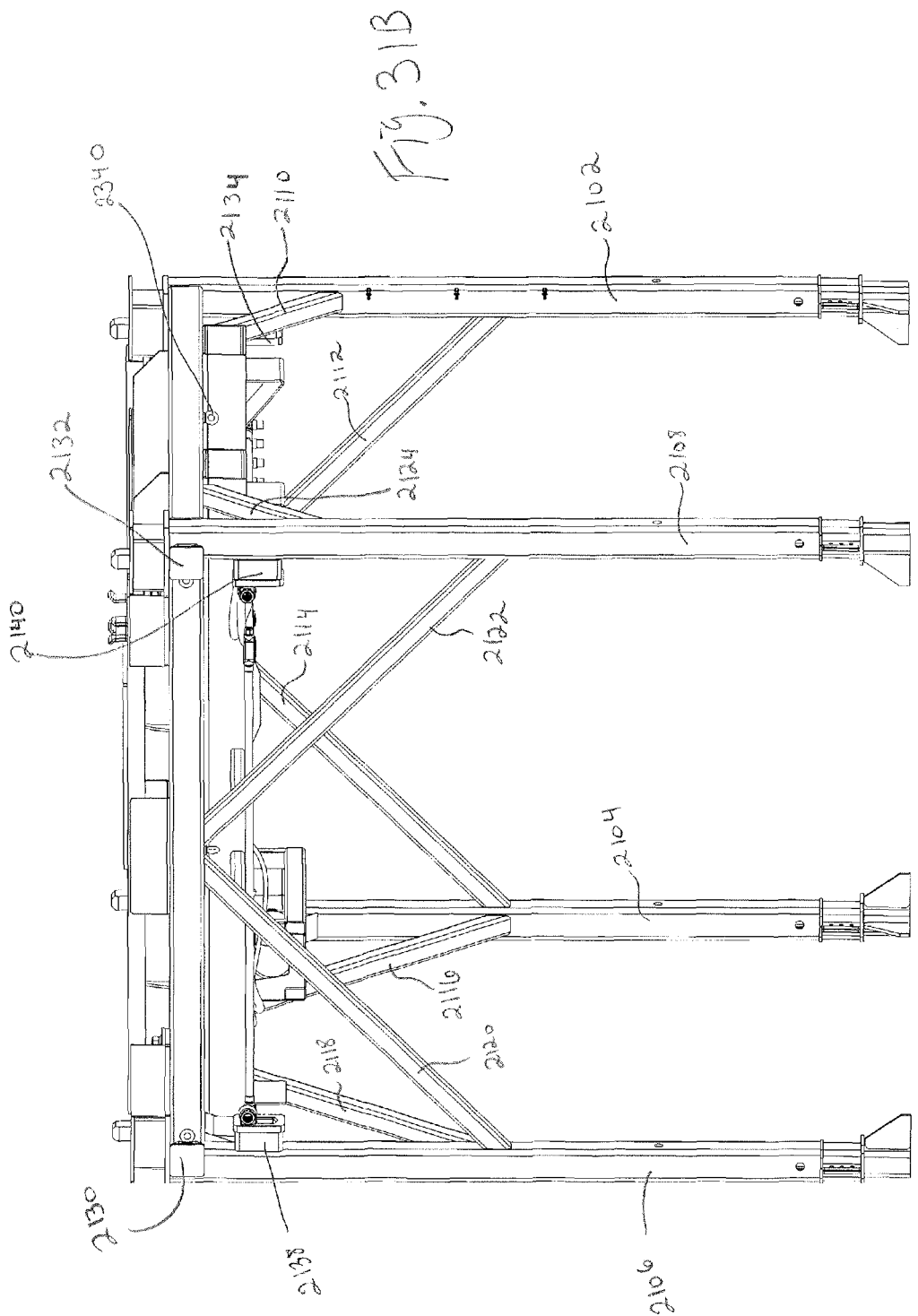

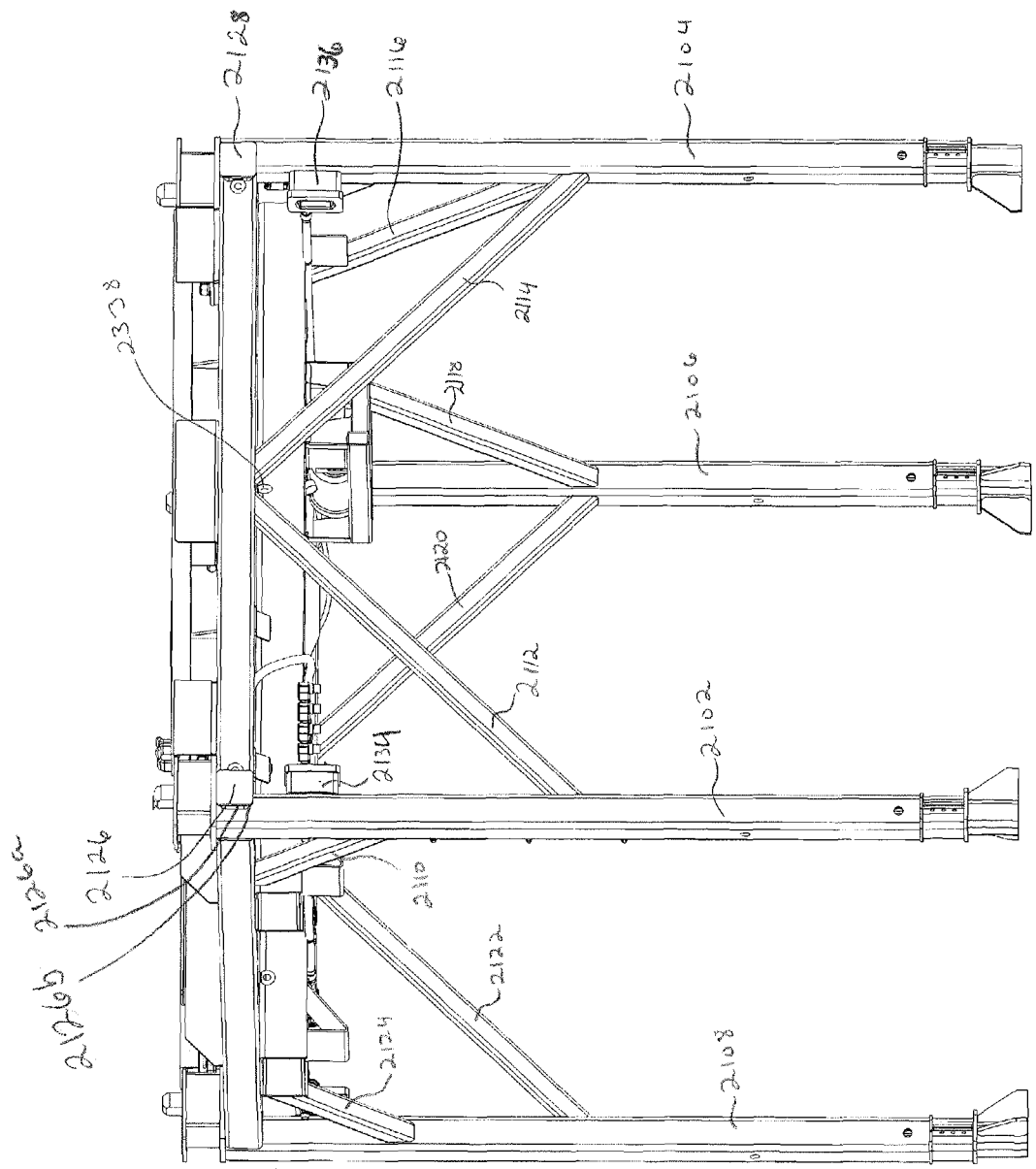

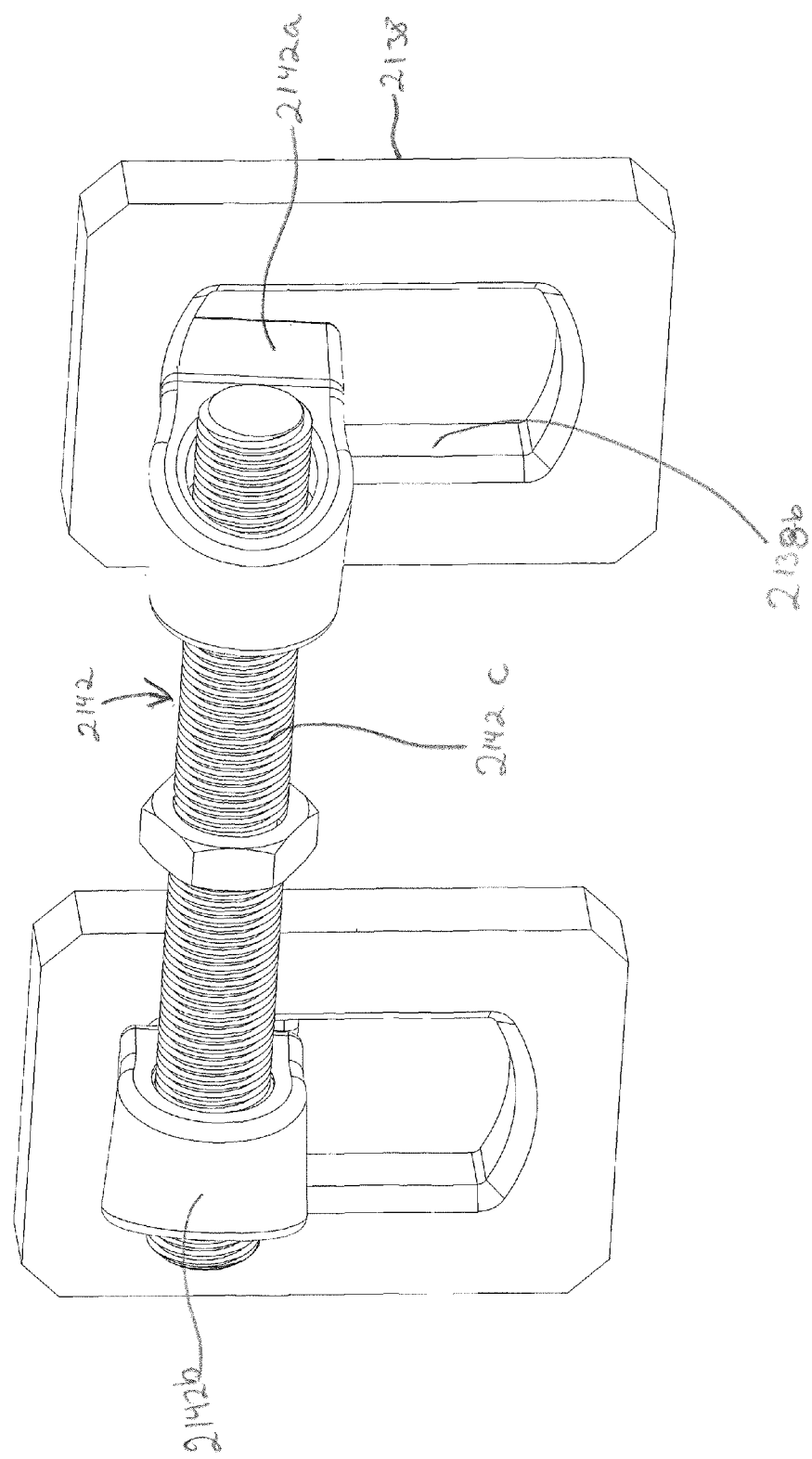

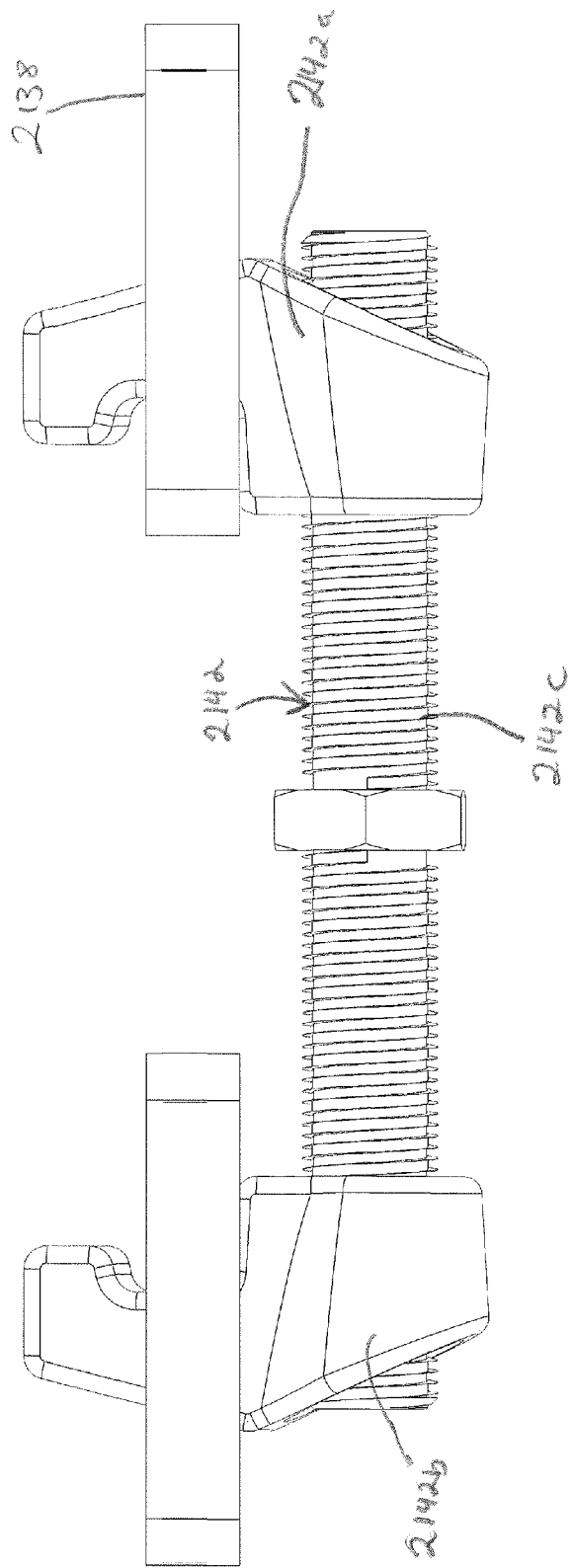

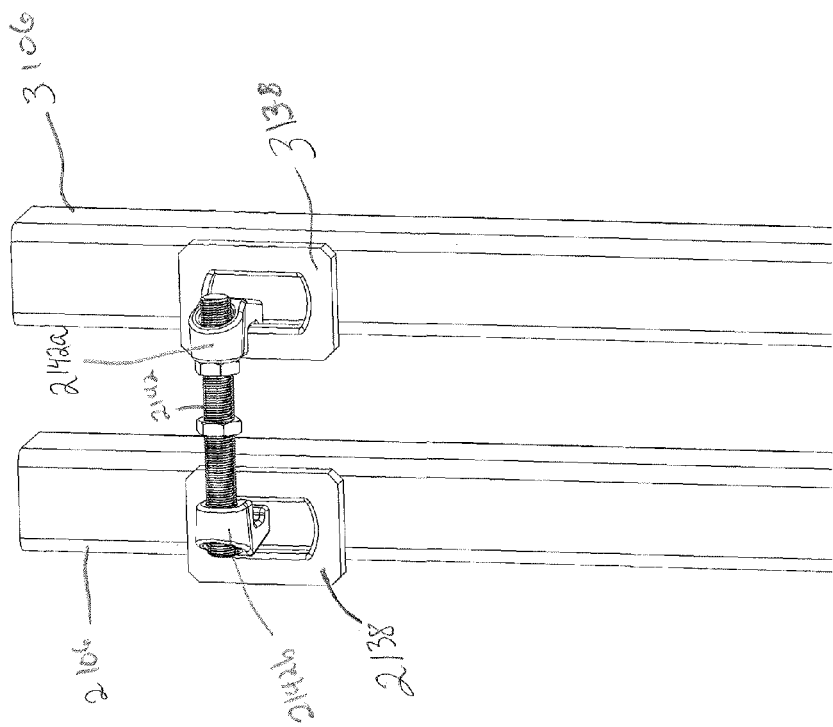

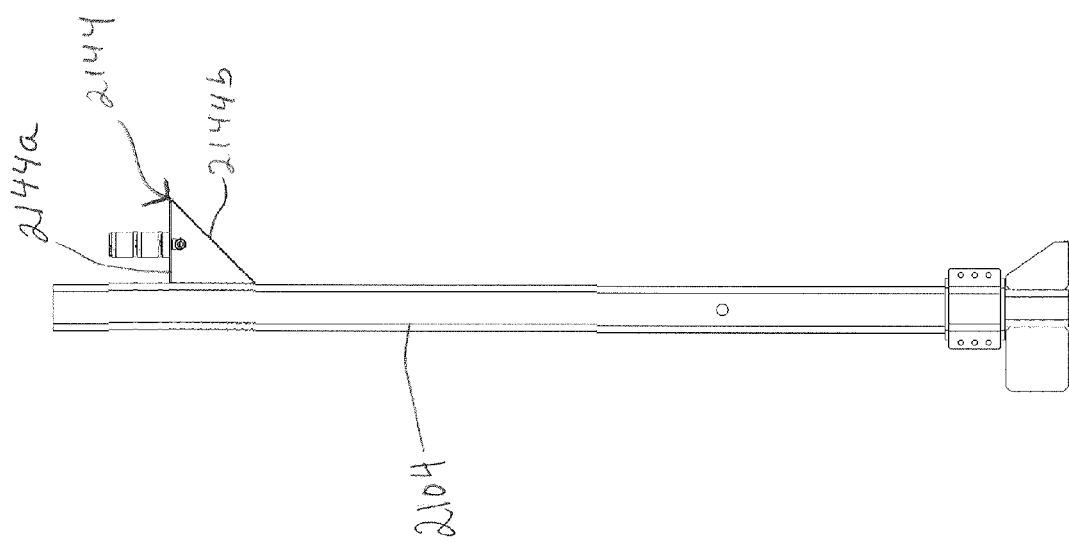

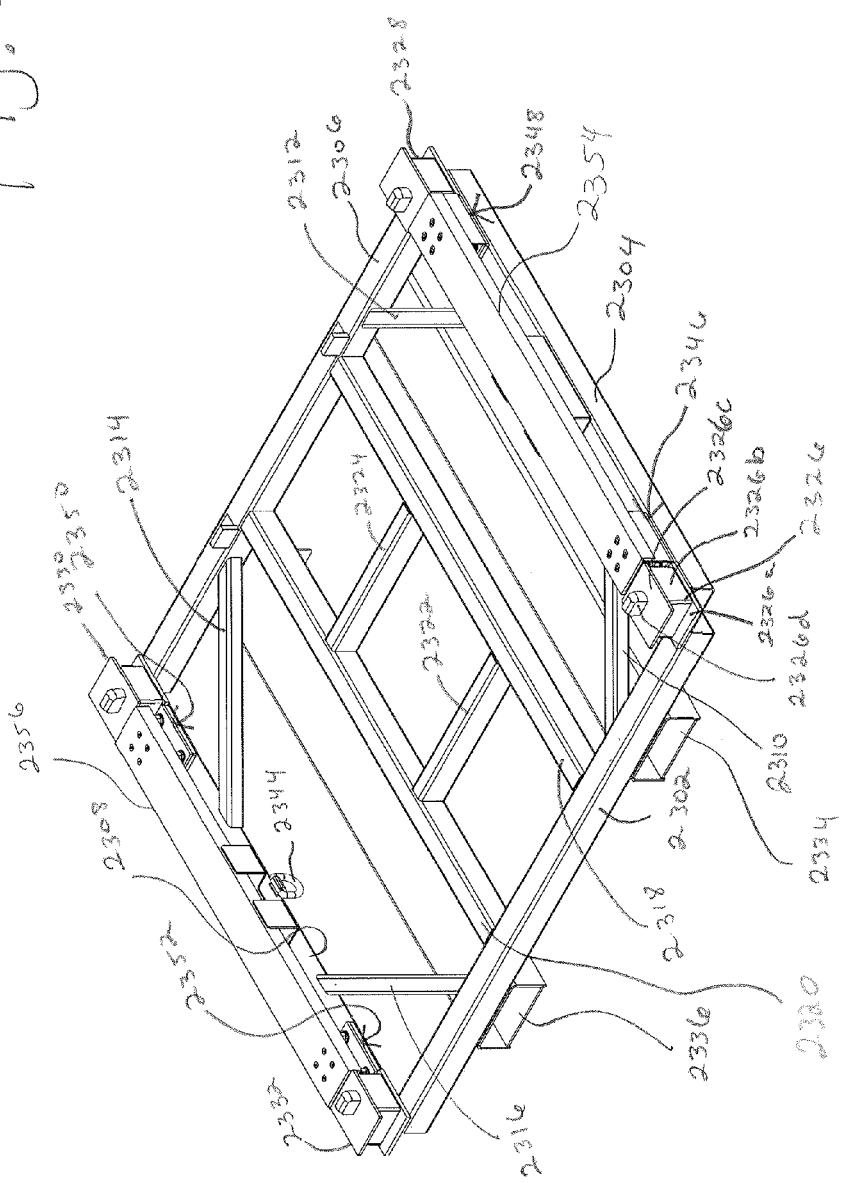

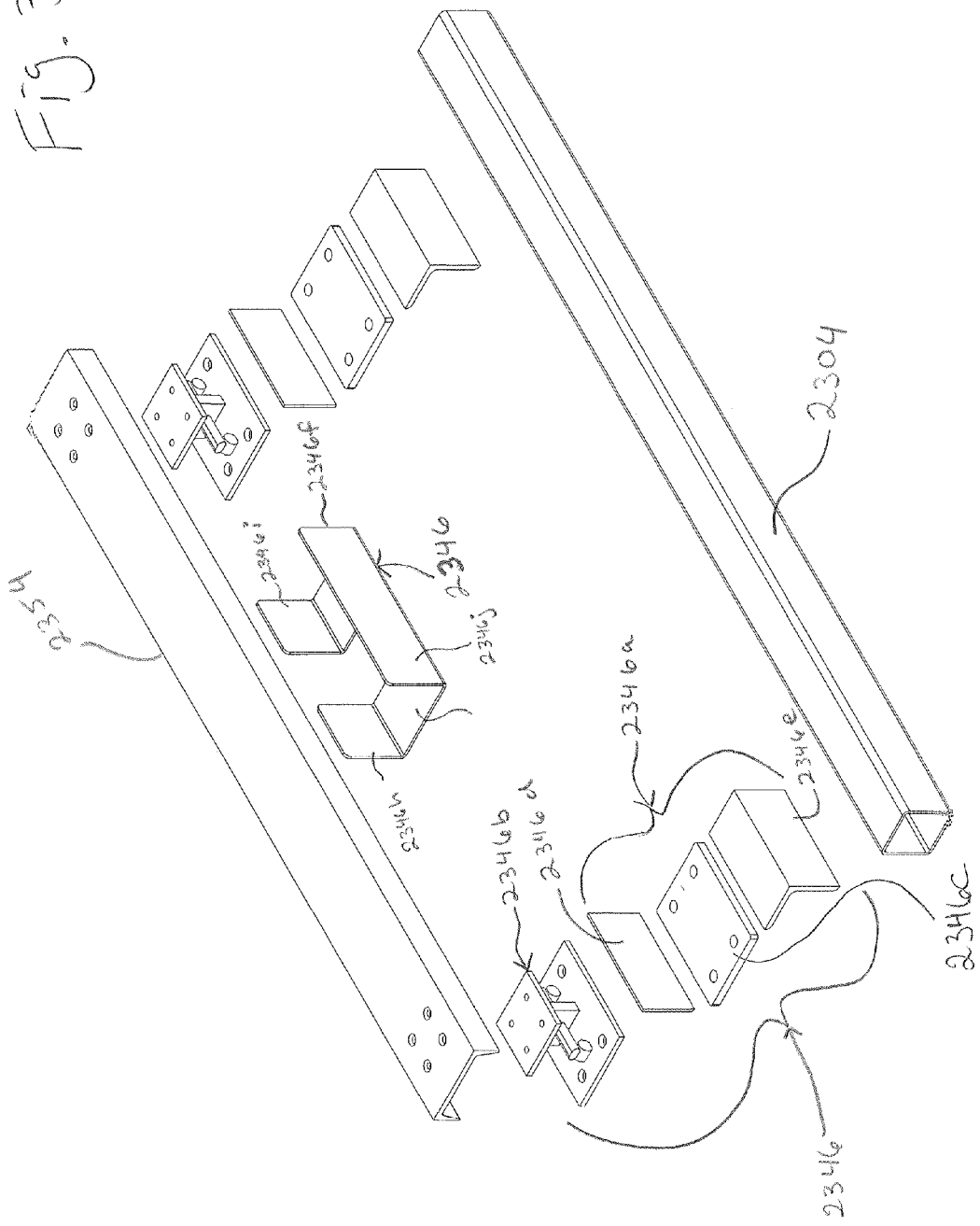

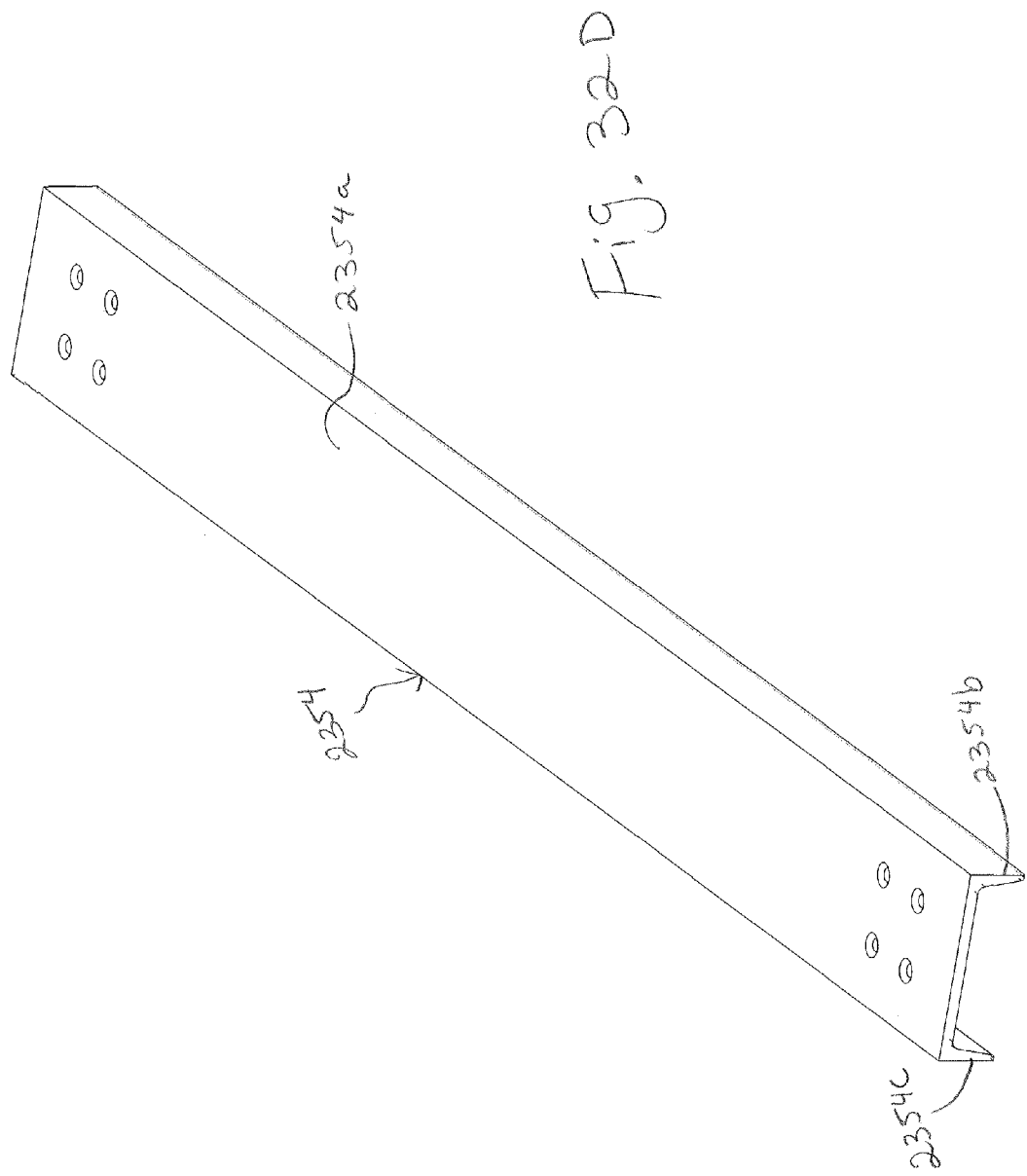

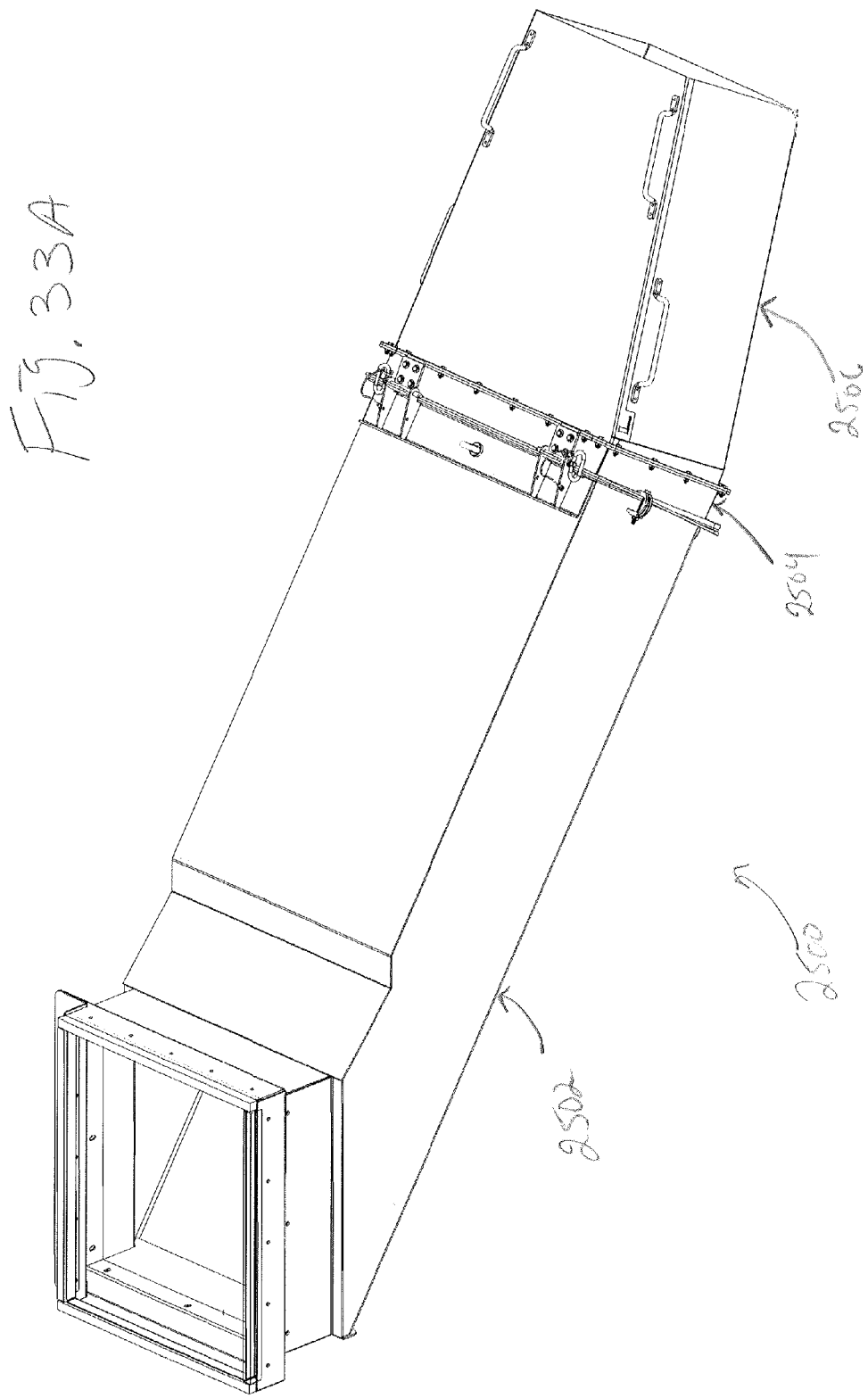

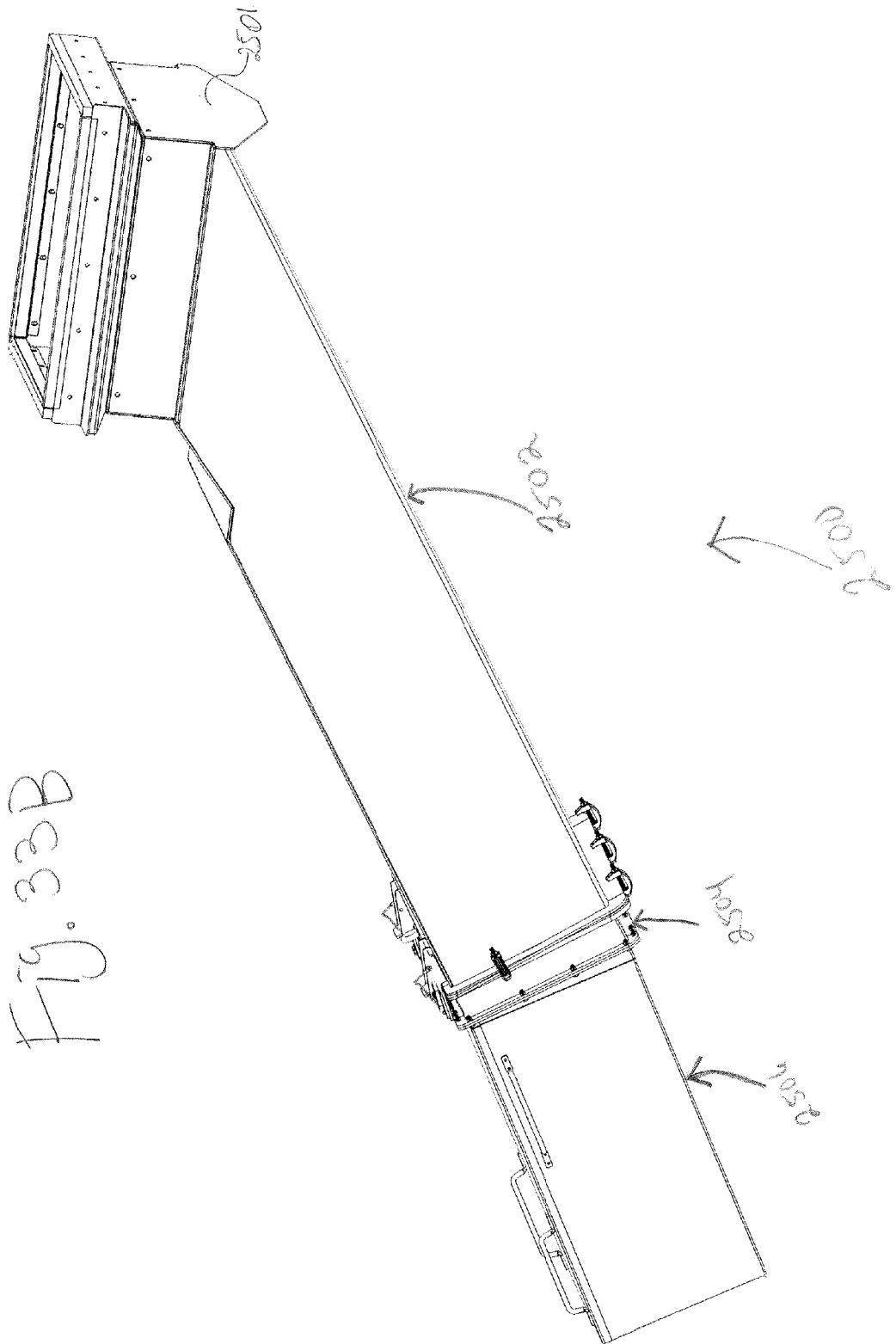

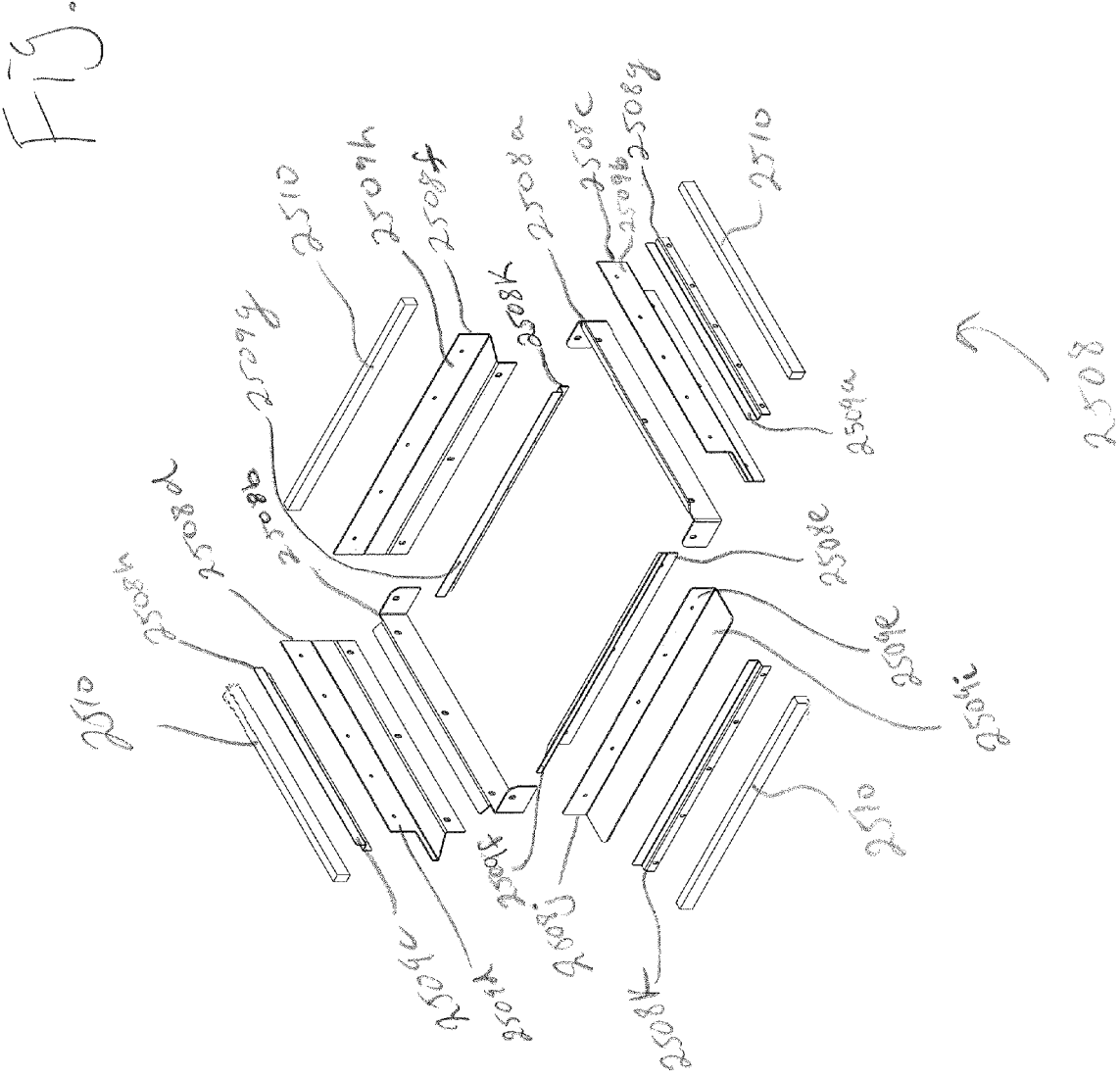

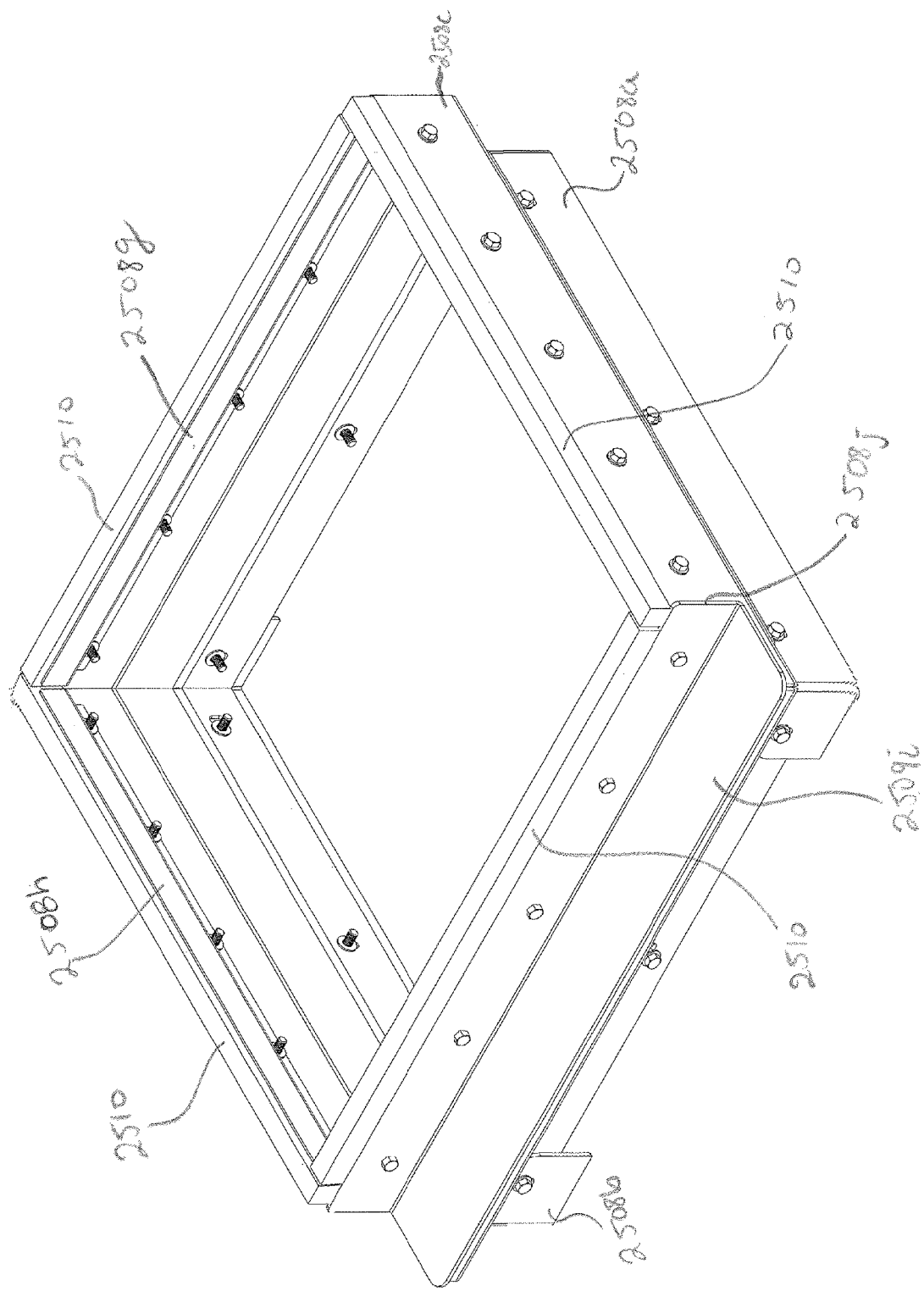

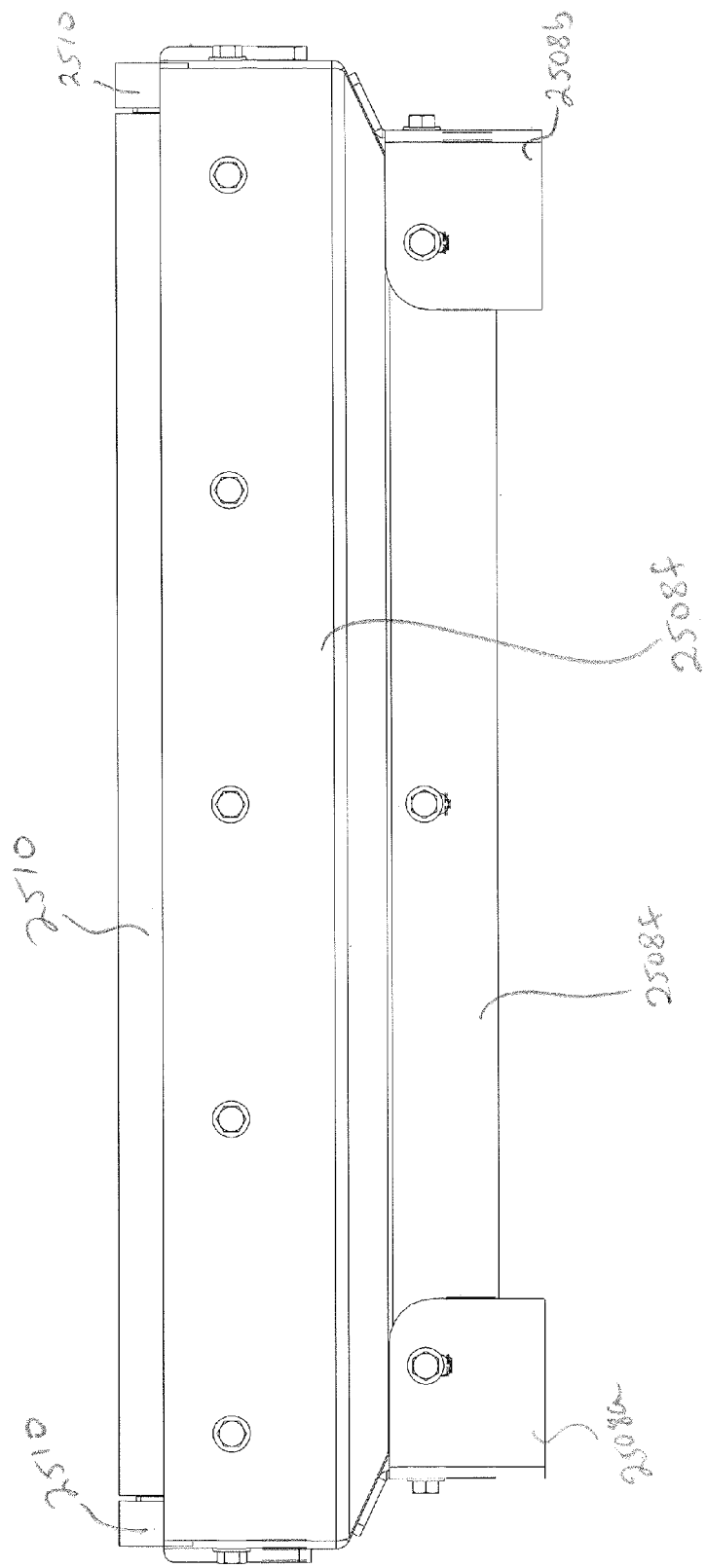

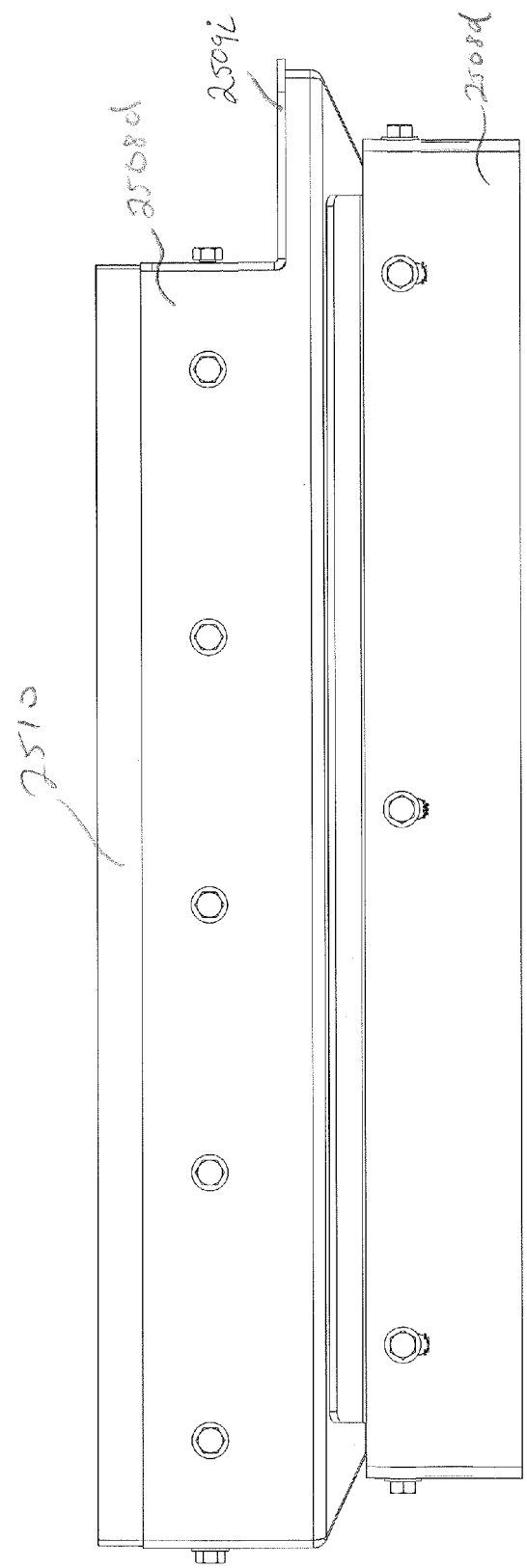

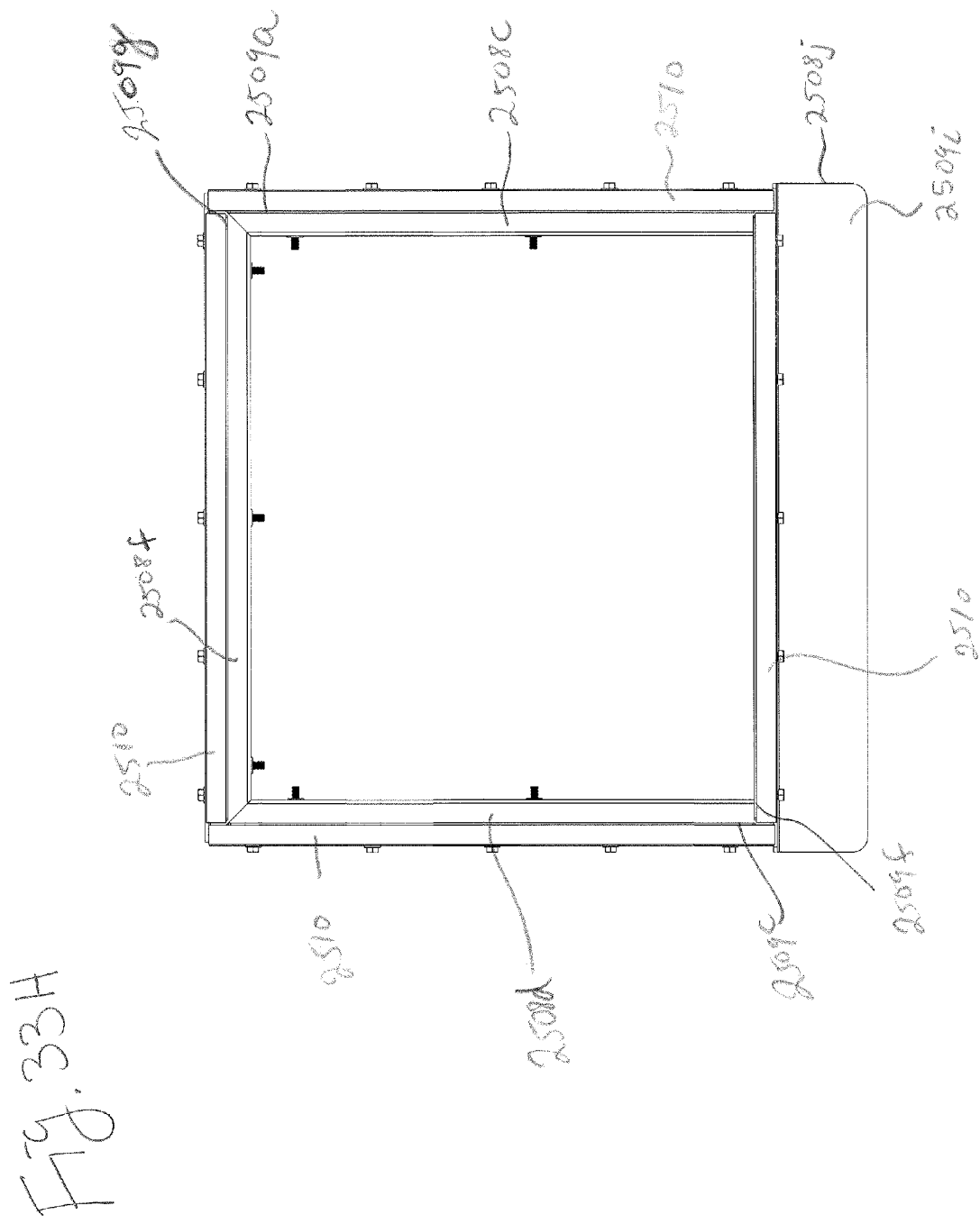

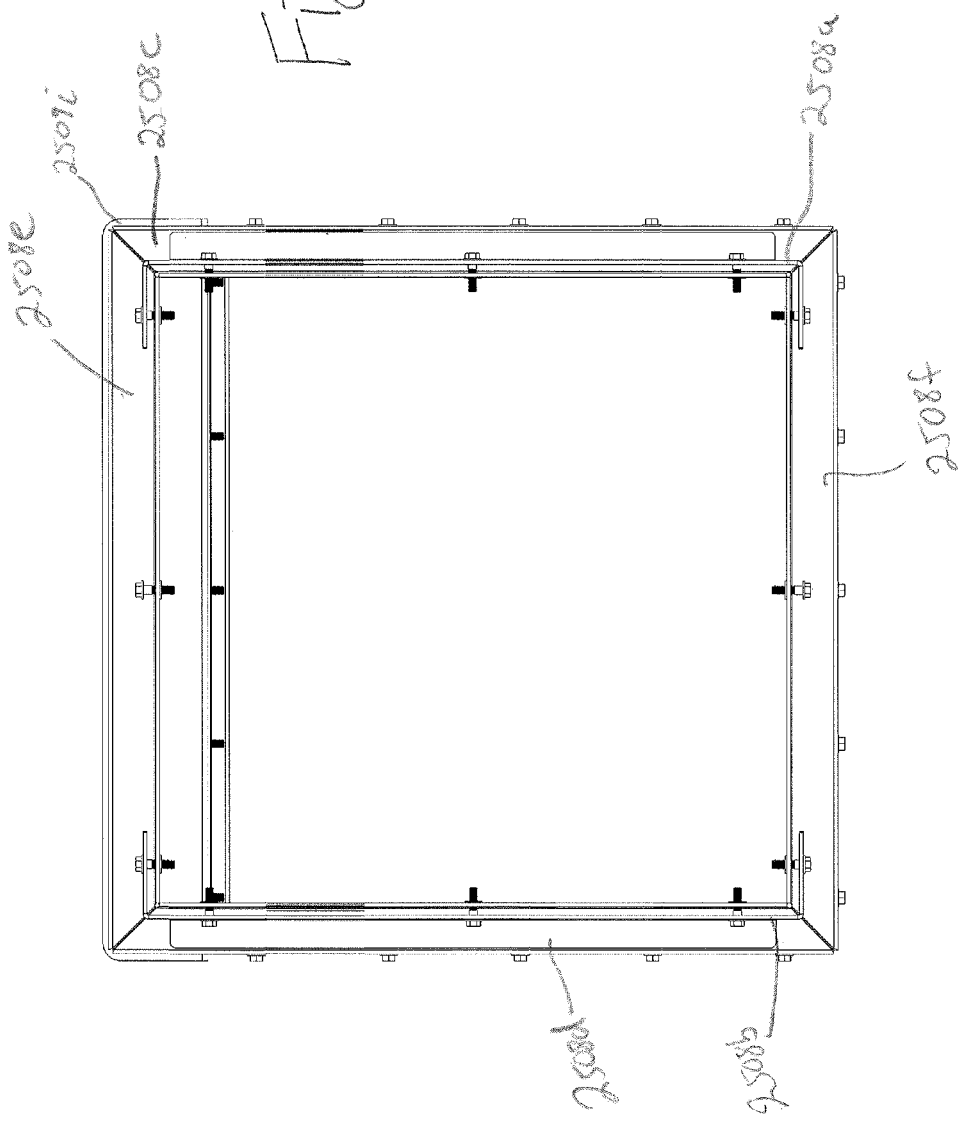

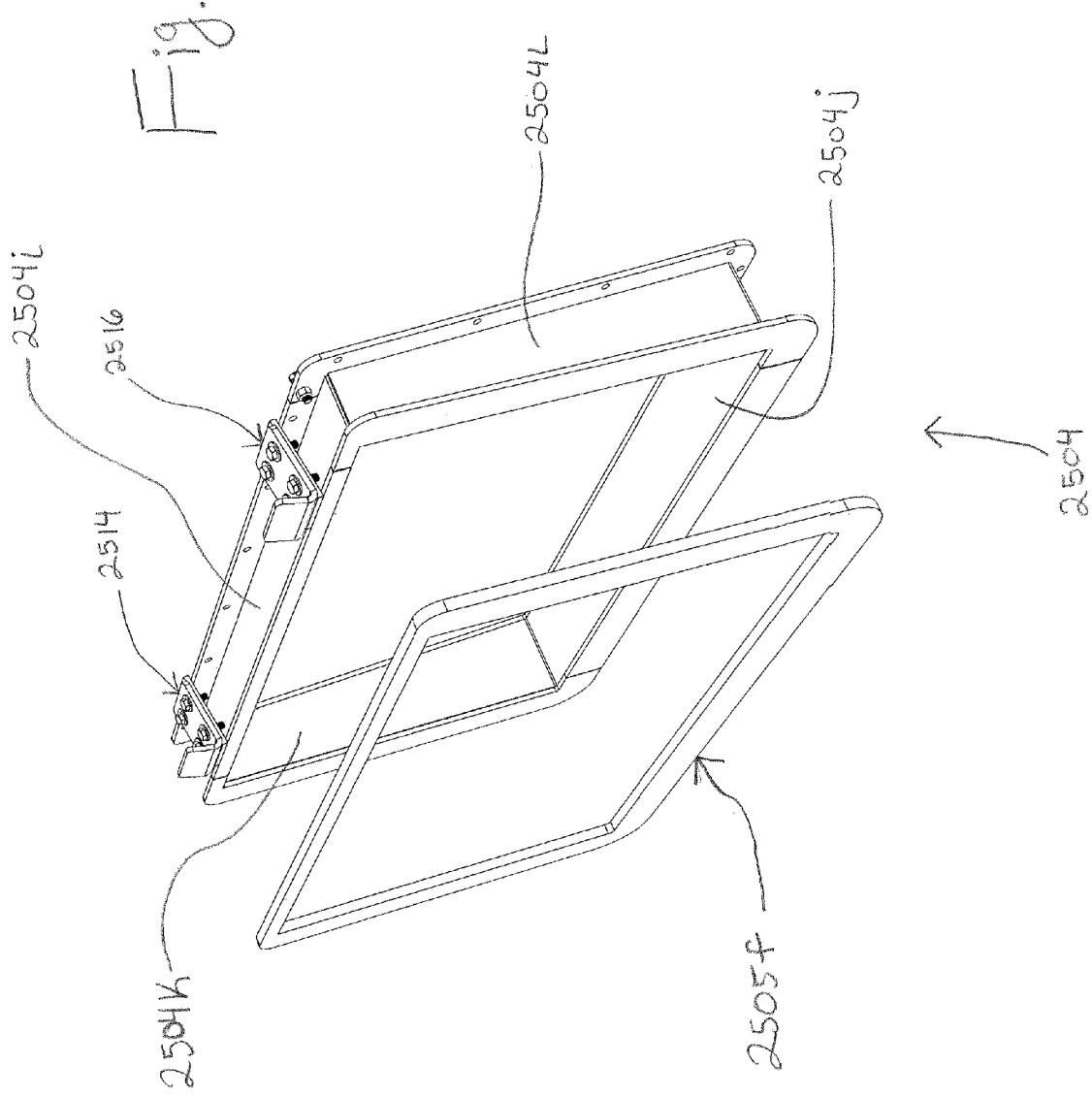

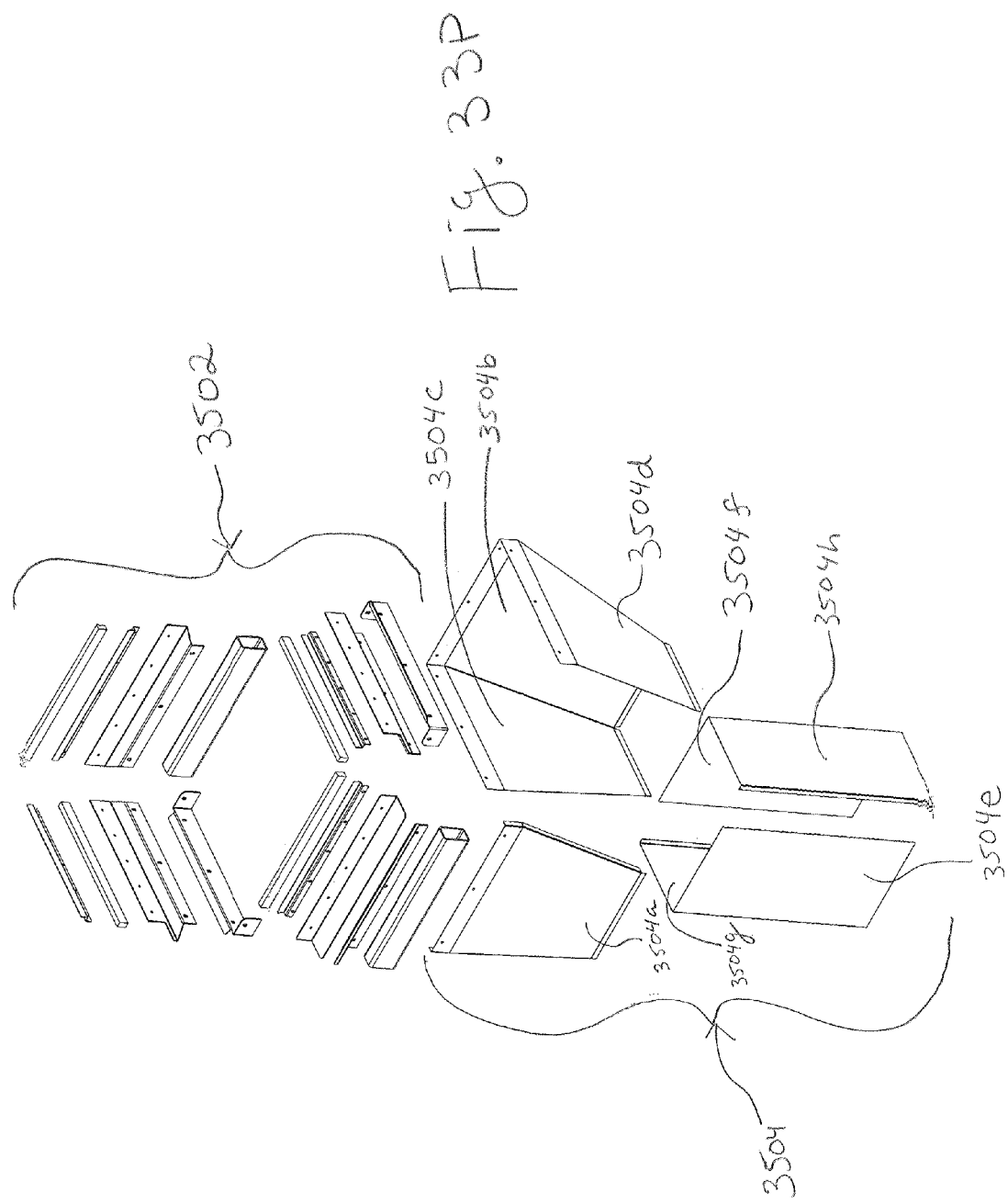

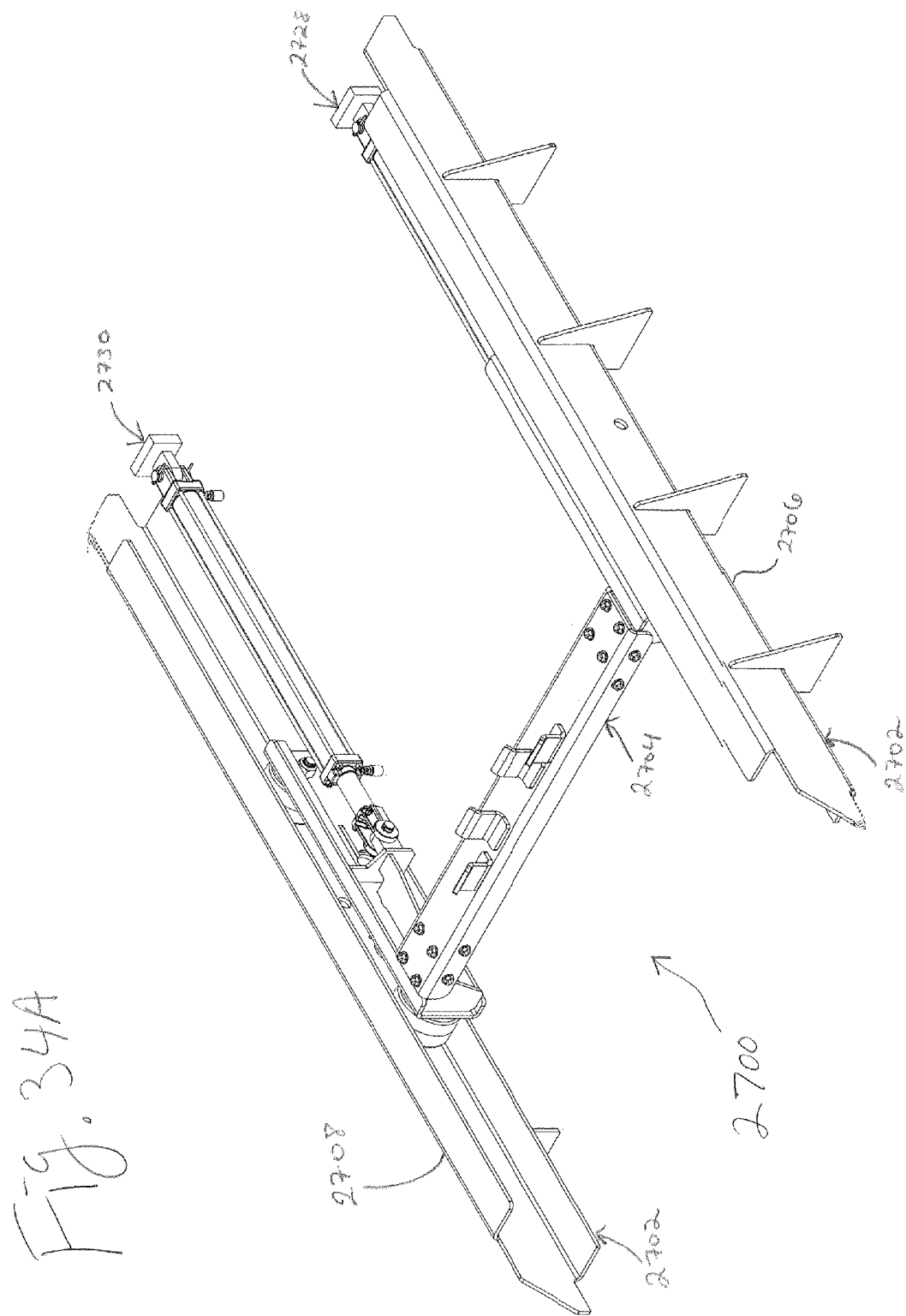

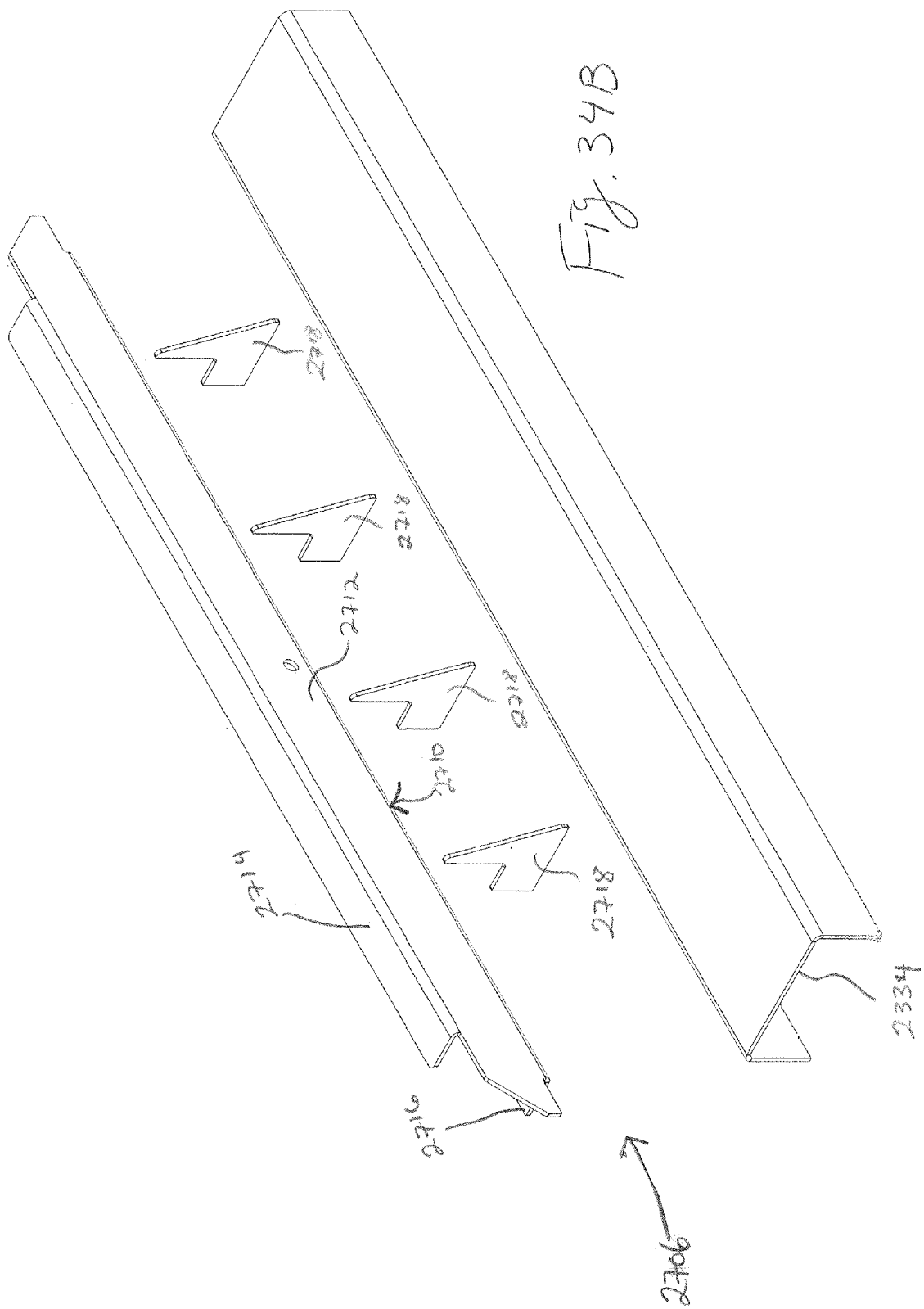

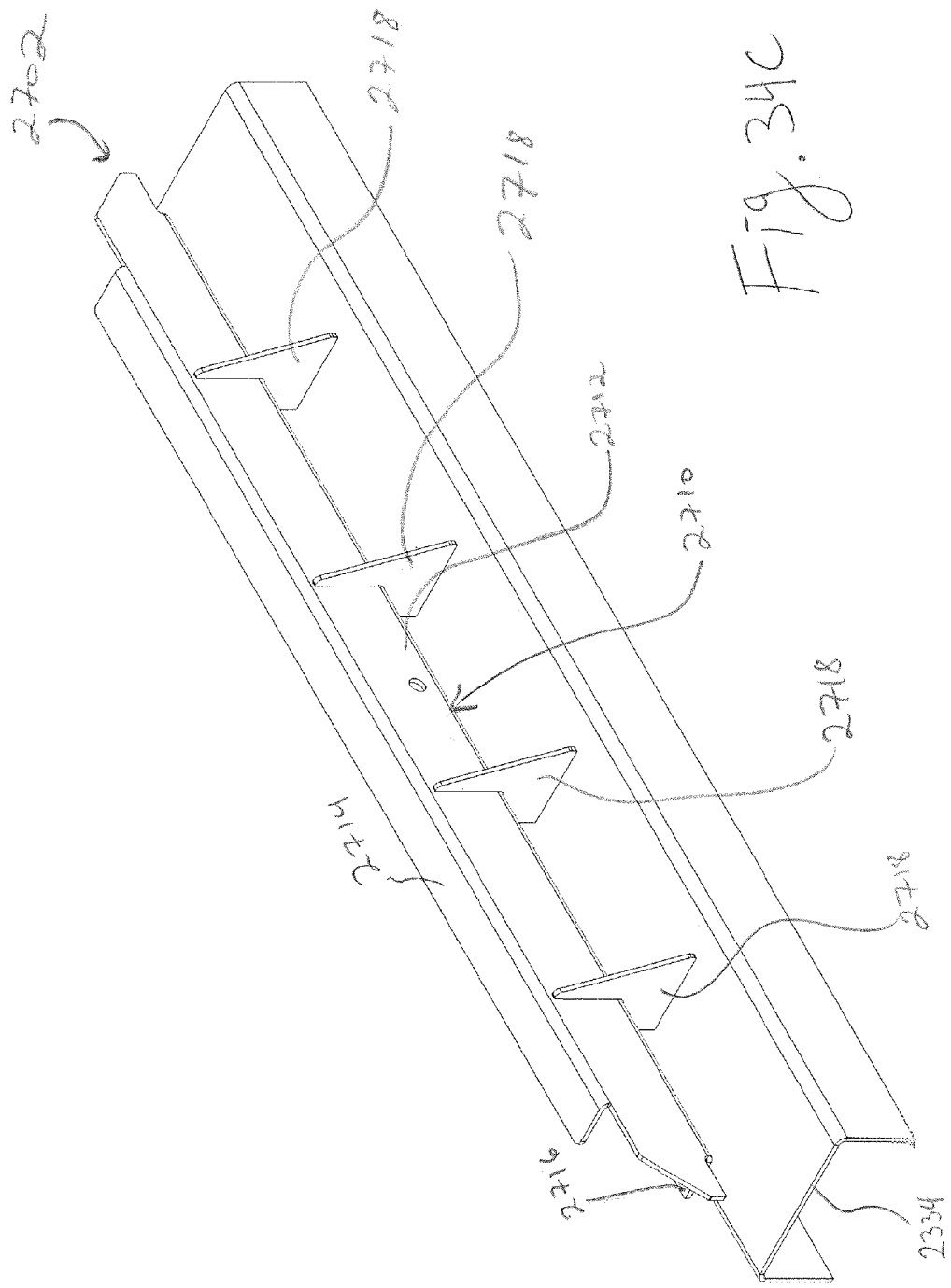

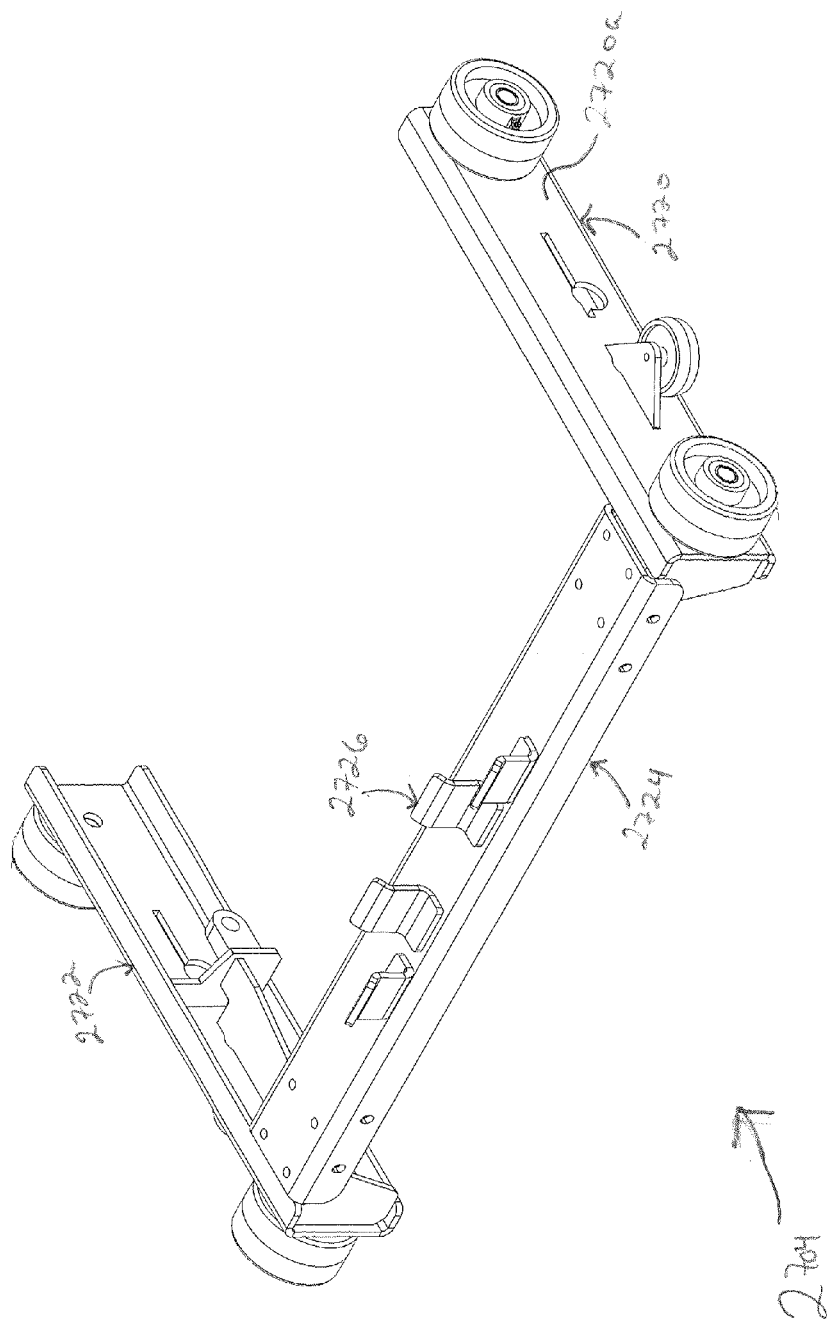

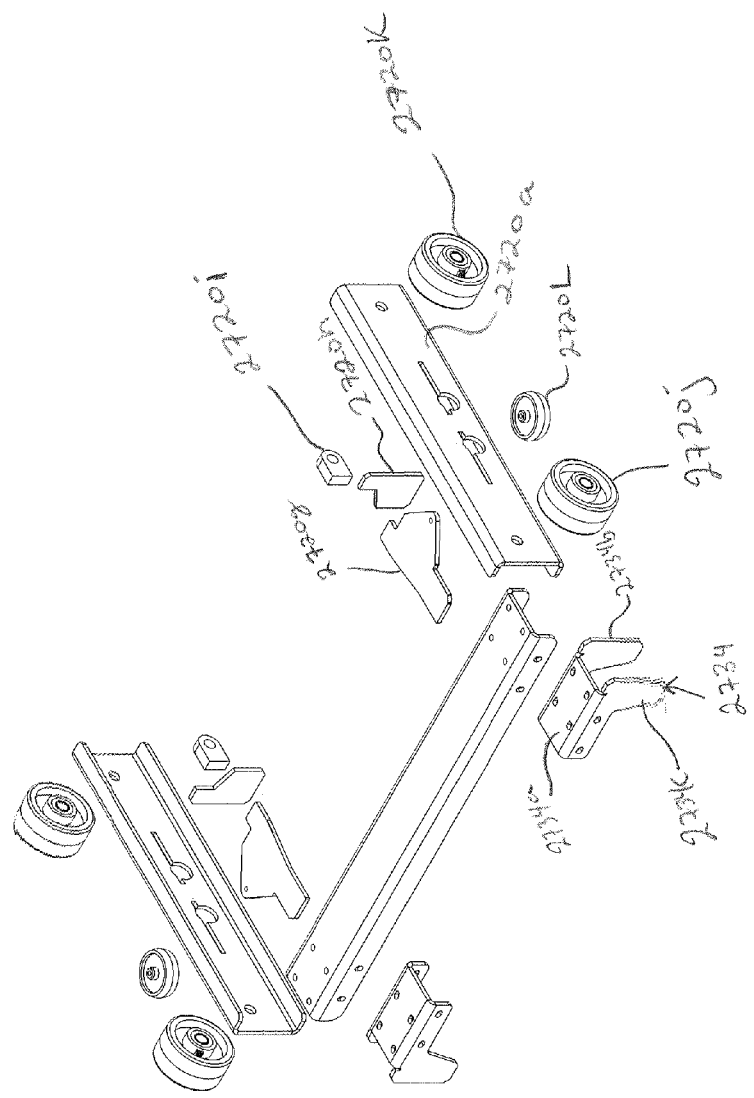

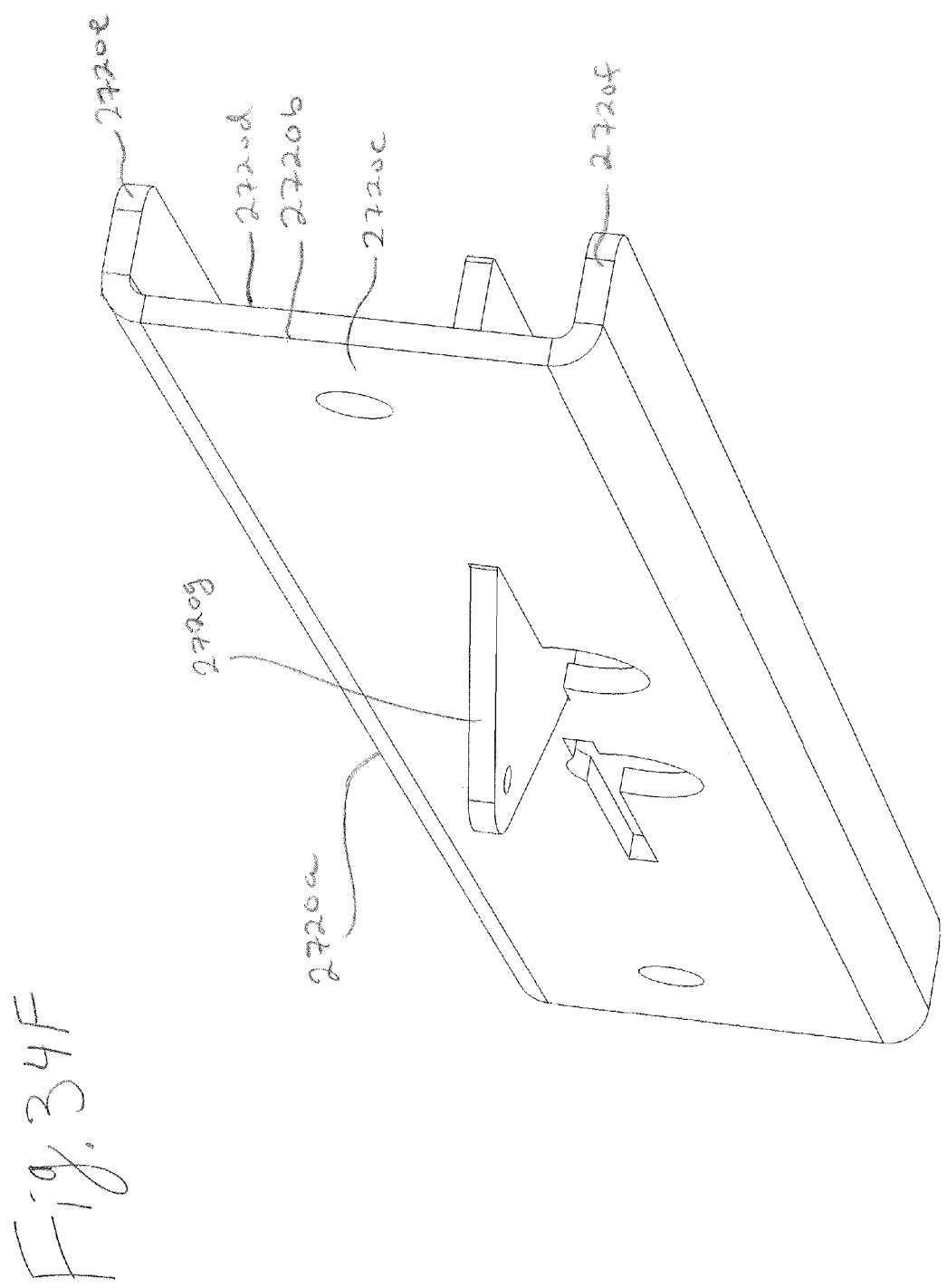

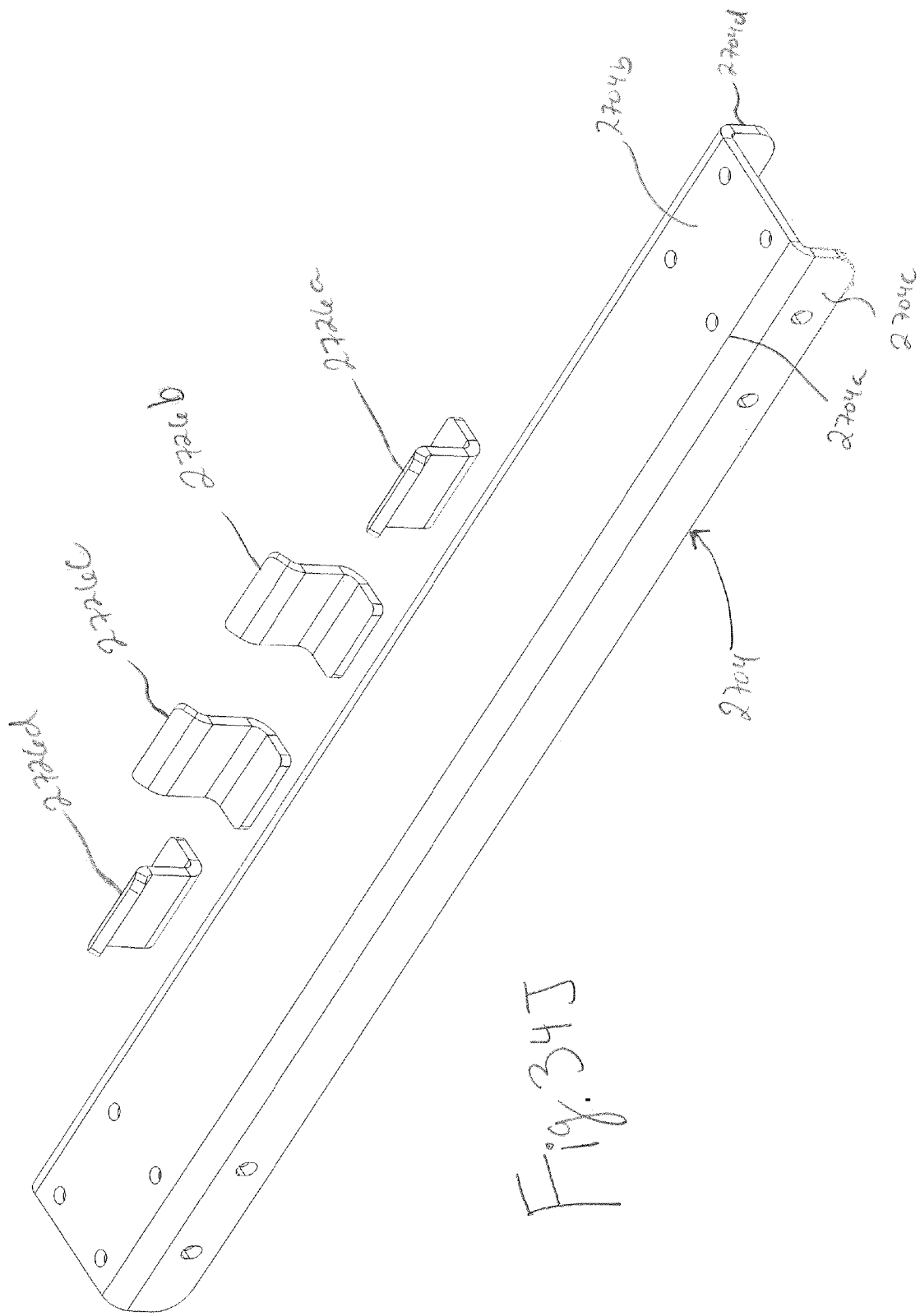

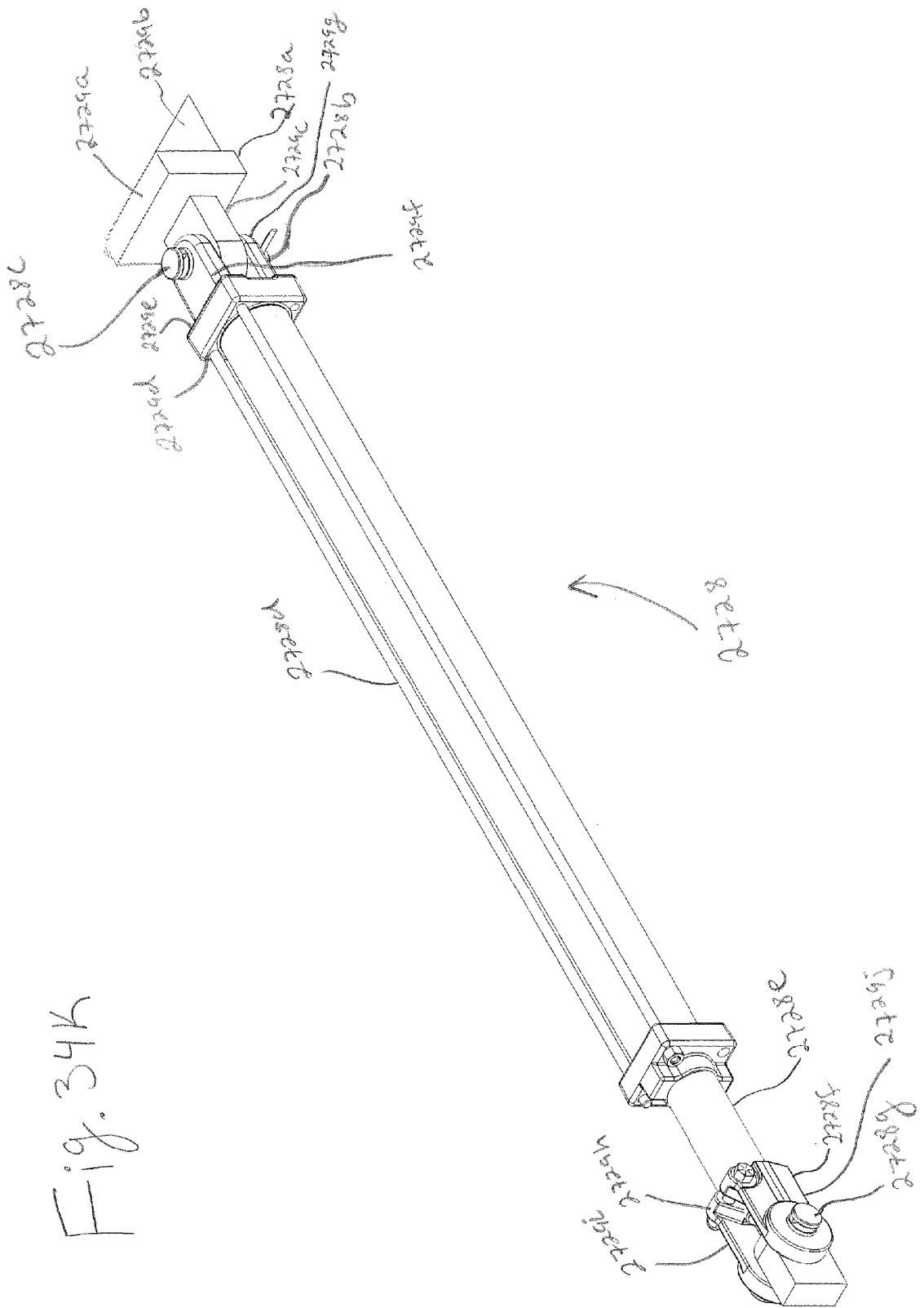

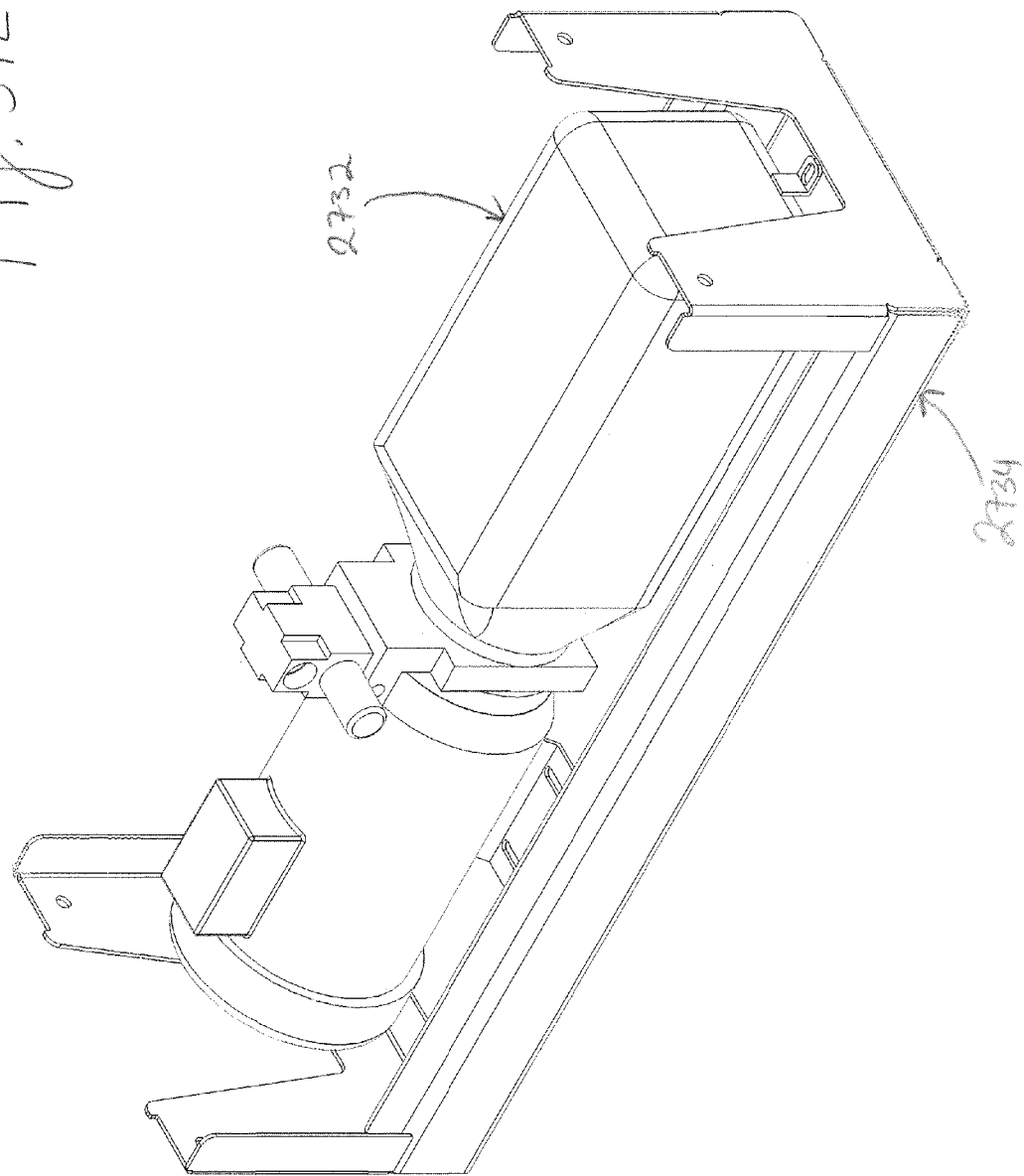

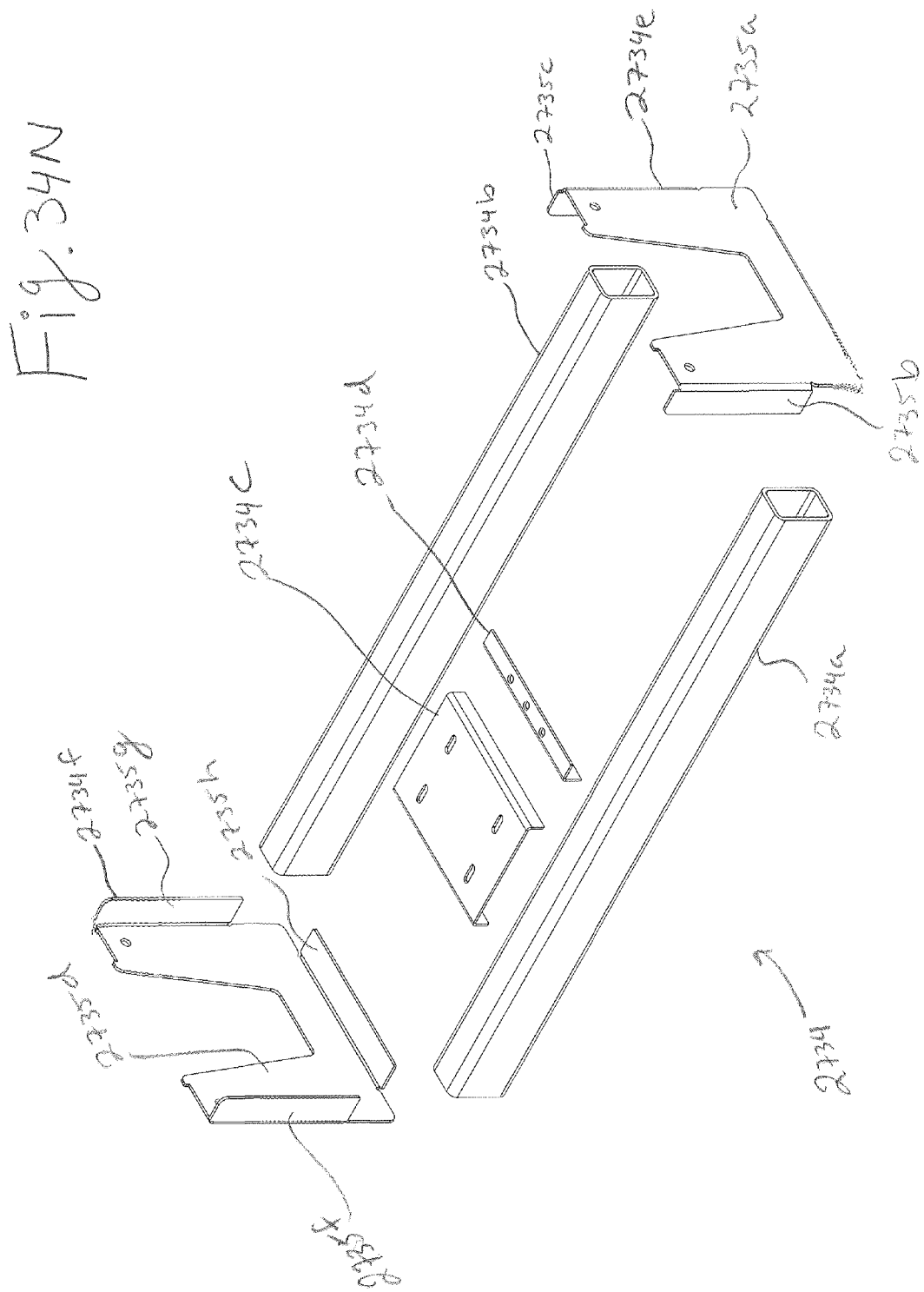

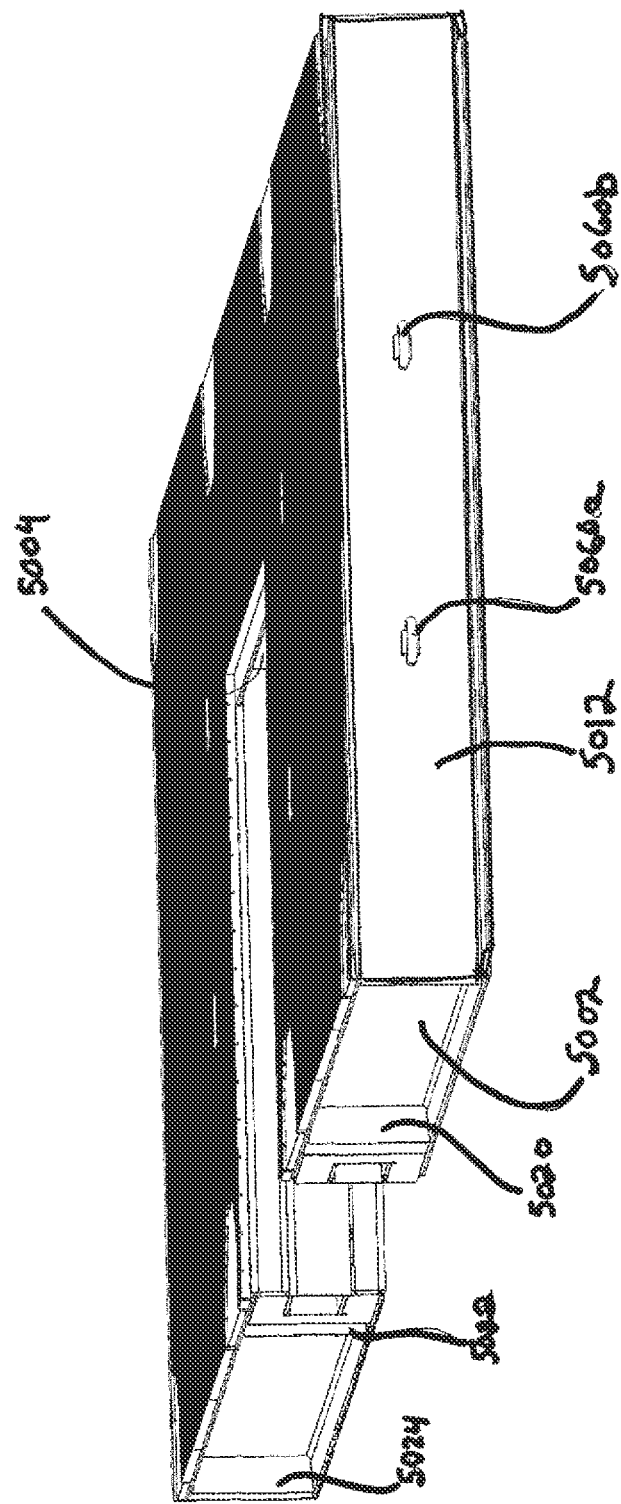

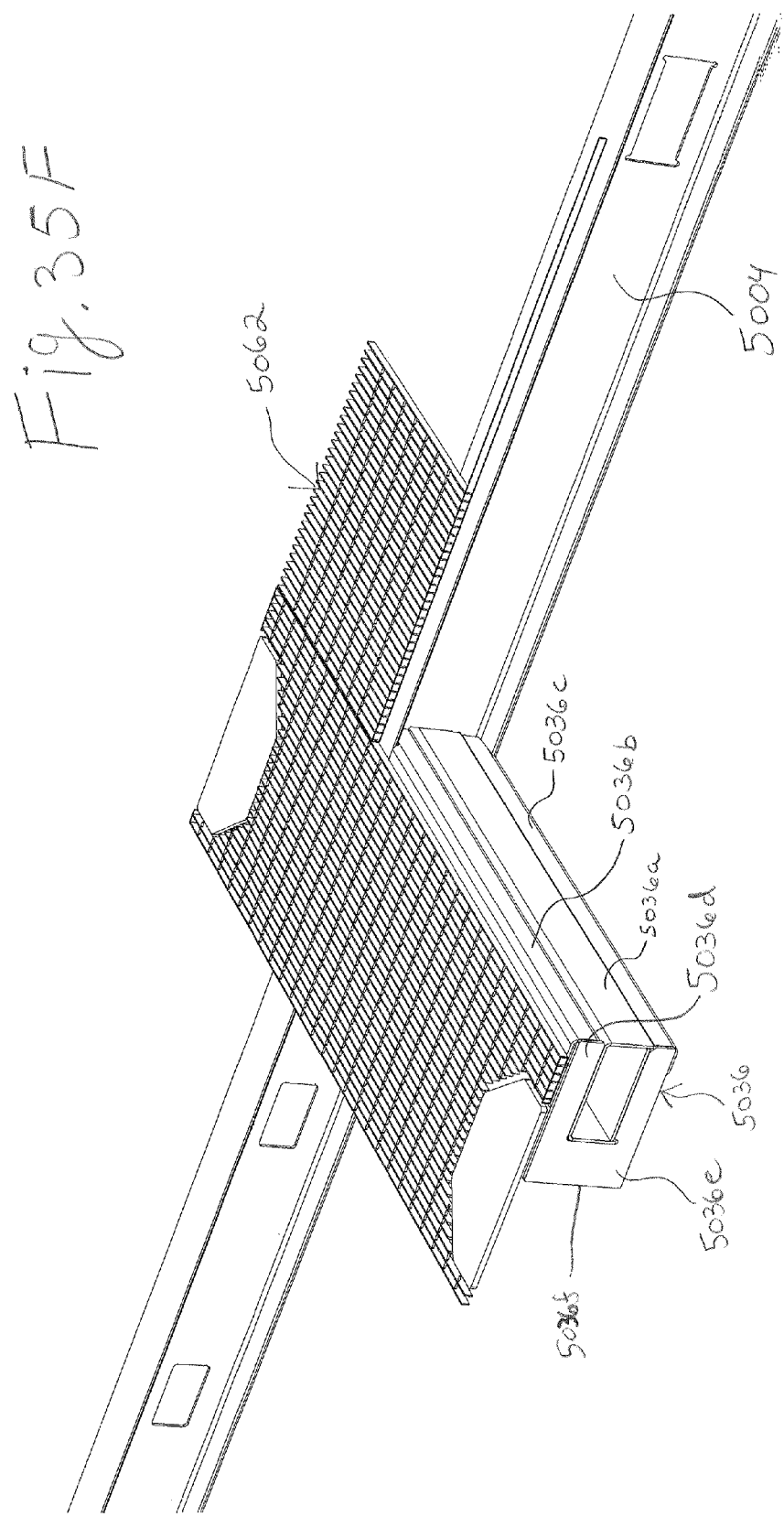

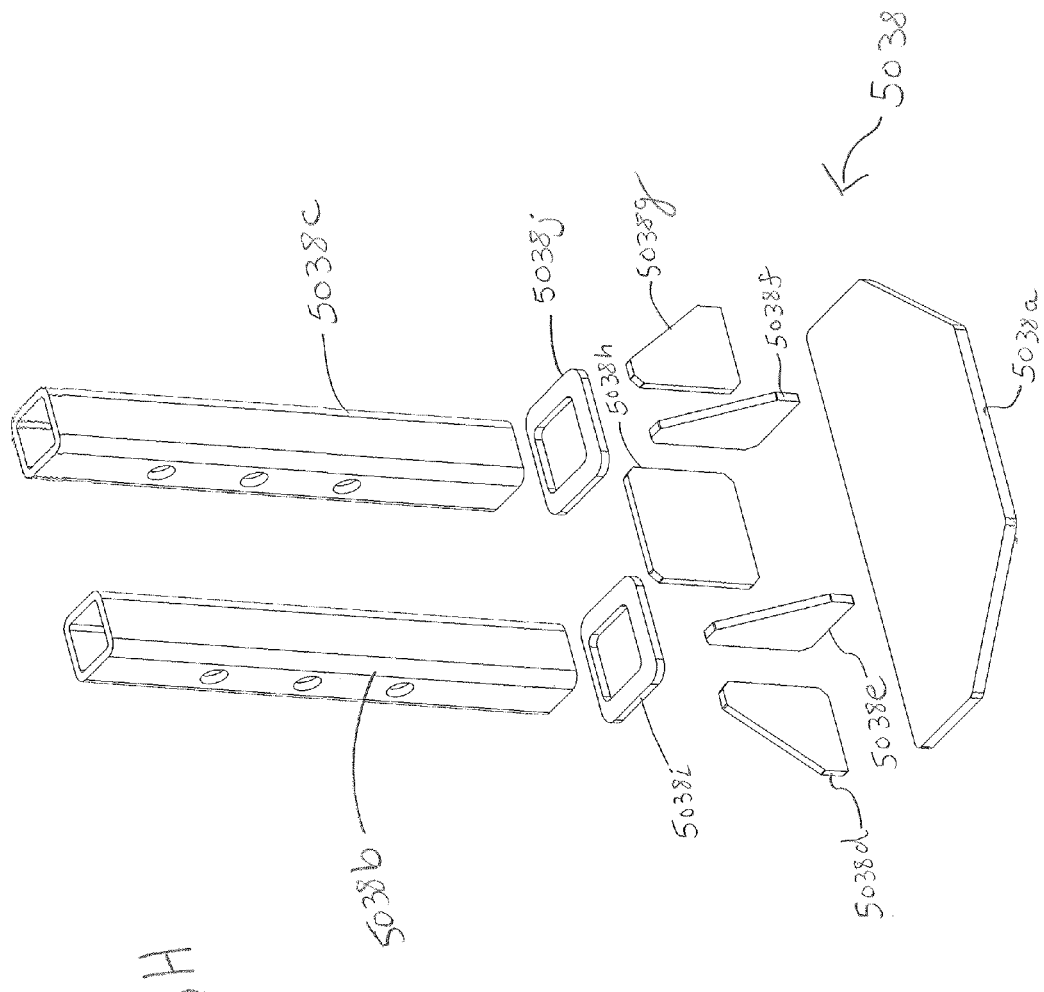

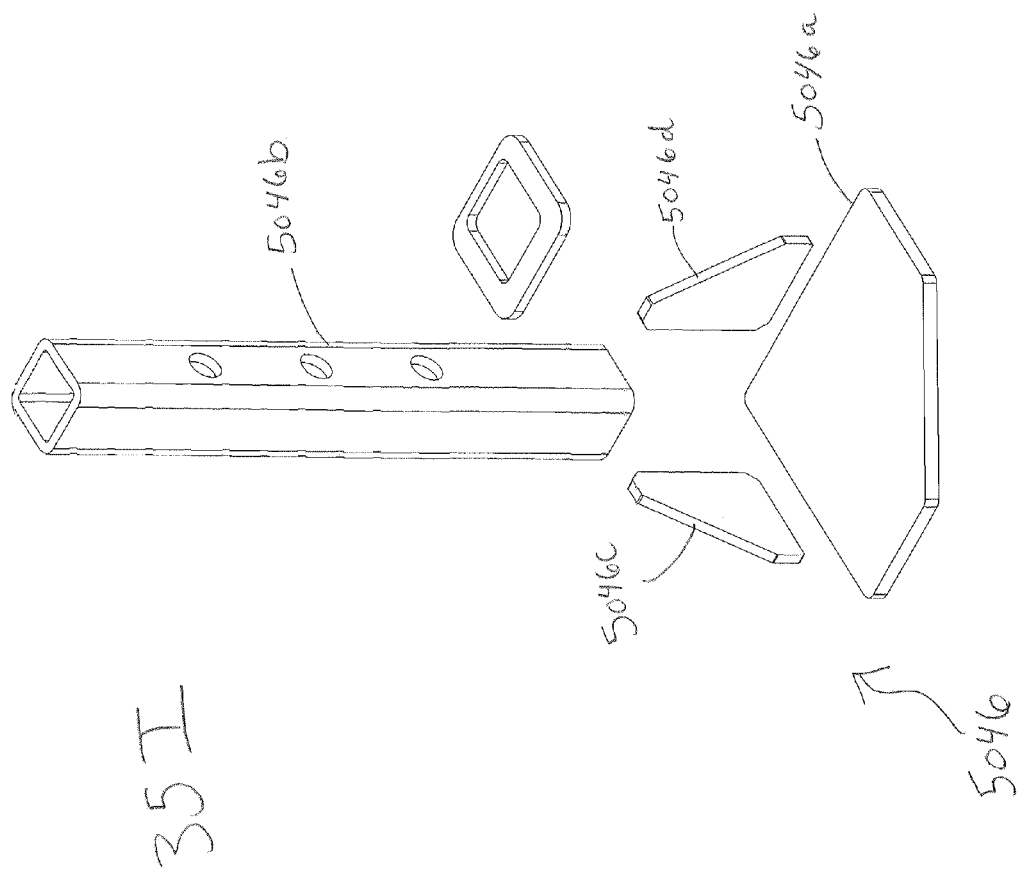

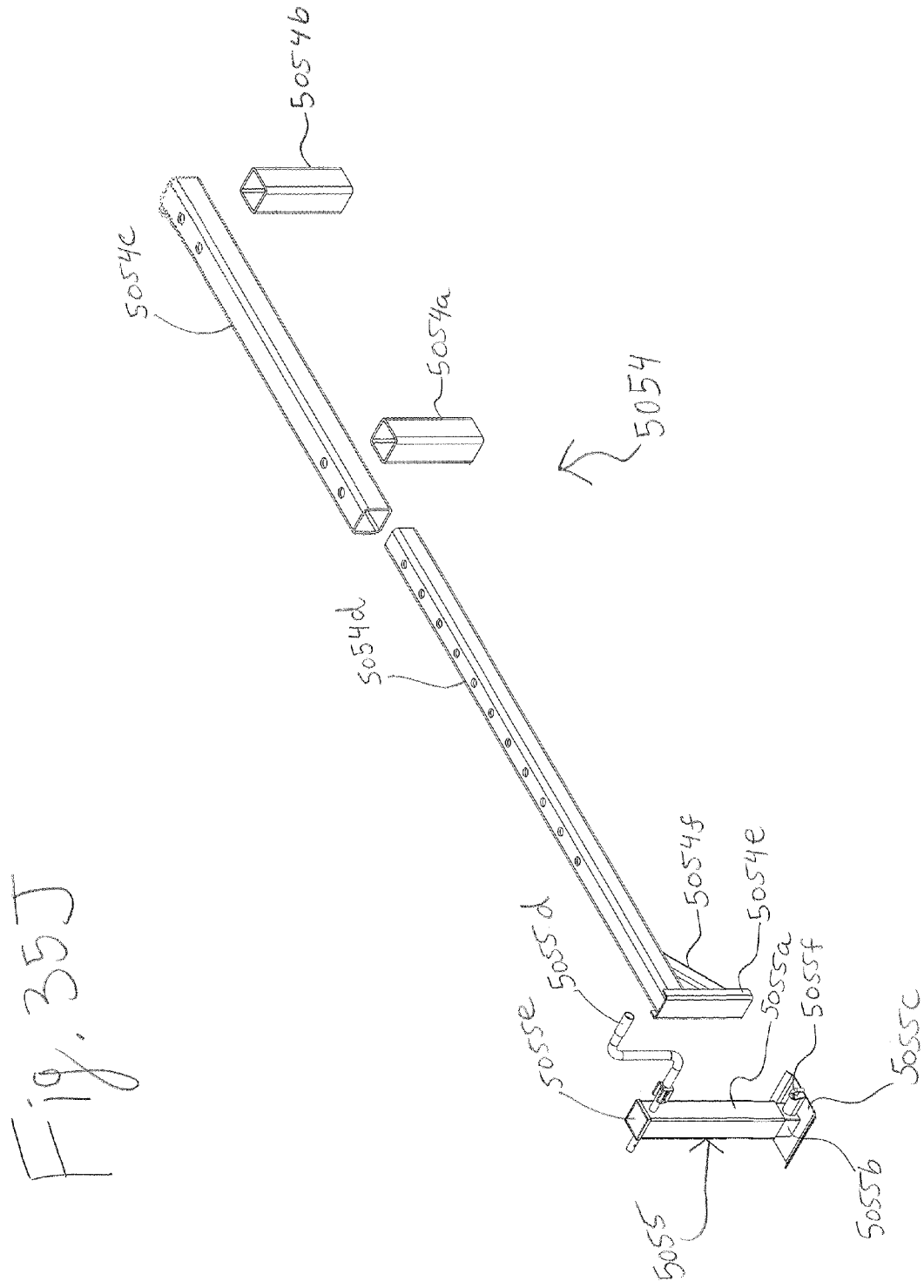

BULK MATERIAL SHIPPING CONTAINER UNLOADER

CROSS-REFERENCE TO RELATED APPLICATIONS

This application is a continuation of U.S. patent application Ser. No. 15/635,850 filed on Jun. 28, 2019, which claims priority to and the benefit of U.S. Provisional Patent Application No. 62/357,023, filed Jun. 30, 2016, and U.S. Provisional Patent Application No. 62/410,089, filed Oct. 19, 2016, the entire contents of which are incorporated herein by reference.

TECHNICAL FIELD

The present disclosure relates a bulk material discharge system for transferring bulk materials from a shipping container, and more particularly relates to an unloader configured to locate one or more bulk material shipping containers in an elevated position, and transfer bulk material from the shipping container(s) to through a material director.

BACKGROUND

Various bulk material shipping containers are known. Such known material bulk shipping containers, sometimes referred to herein for brevity as known containers or as known bulk containers, are used to transport a wide range of products, parts, components, items, and materials such as, but not limited to, seeds, shavings, fasteners, and granular materials (such as sand). These are sometimes called loose materials or materials.

New and improved bulk material shipping containers are continuously being developed. For example, U.S. Pat. No. 10,676,239, which claims priority to U.S. Provisional Patent Application Ser. No. 62/357,023, filed Jun. 30, 2016 and is owned by the assignee of the present application, discloses new bulk material shipping containers.

As these new bulk material shipping containers are developed, there is a continuing need to develop unloading devices that can be used for unloading loose materials from these new bulk material shipping containers.

In various uses, certain of these new bulk material shipping containers need to be supported substantially above the ground to be unloaded.

Accordingly, there is a continuing need for bulk material shipping container unloading apparatus.

SUMMARY

Various embodiments of the present disclosure provide bulk material shipping container unloaders that solve or meet the above needs. The bulk material shipping container unloaders of the present disclosure may sometimes be referred herein for brevity as the shipping container unloader(s), the container unloader(s), the material unloader(s), or the unloader(s).

In various embodiments, the bulk material shipping container unloader of the present disclosure generally includes: (a) a supporter; (b) a pallet receiver supported by the supporter; (c) a material director supported by the pallet receiver; and (d) a bulk material shipping container gate mover.

In various embodiments, the shipping container unloader of the present disclosure is configured to receive, support, and hold a bulk material shipping container that is configured to hold materials in the container.

In various embodiments, the shipping container unloader of the present disclosure is configured to support one shipping container or multiple stacked shipping containers.

In various embodiments of the present disclosure, the height of the pallet receiver and the material director are fixed, and thus they support the bulk material container at a single position or height.

In other various embodiments of the present disclosure, the supporter is extendable or expandable. In these embodiments, the extendable or expandable supporter is movable from a retracted position to one or more extended or expanded positions to change the height of the pallet receiver and the material director, and thus to support the bulk material container at different desired positions or heights.

In various embodiments of the present disclosure, the material director is movable.

In various embodiments of the present disclosure, the material director can be angled in different directions.

In various embodiments of the present disclosure, the material director can be moved to one or more storage or shipment positions.

In various embodiments of the present disclosure, a bottom portion of the material director can be detached from an upper portion of the material director.

In various embodiments of the present disclosure, the material director is configured to work or operate with one or more adjacent unloaders of the present disclosure to unload materials from multiple containers into a common material receiver. In various embodiments of the present disclosure, the material receiver is stationary. In various embodiments of the present disclosure, the material receiver is movable. In various embodiments of the present disclo- sure, the material receiver is connected to a movable vehicle.

In various embodiments of the present disclosure, the bulk material shipping container gate mover is configured to receive and engage a downwardly extending handle of a gate of a material unloading assembly of a bulk material shipping container to open and close the gate.

In various embodiments of the present disclosure, the bulk material shipping container gate mover is configured to automatically open and close a gate of a material unloading assembly of a bulk material shipping container.

In various embodiments of the present disclosure, the bulk material shipping container gate mover is configured to automatically open and close a gate of a material unloading assembly of the bulk material shipping container under control a remote control or controlling device.

Various embodiments of the present disclosure include a rack that supports one or more bulk material shipping container unloaders such as the unloaders of the present disclosure.

Additional features and advantages of the present invention are described in, and will be apparent from, the following Detailed Description of Exemplary Embodiments and the figures.

BRIEF DESCRIPTION OF THE DRAWINGS

FIG. 25 is a top view of the three bulk material shipping container unloaders of FIG. 20, shown being supported by the rack and respectively supporting three adjacent bulk material shipping containers.

FIG. 26 is a right side view of the three bulk material shipping container unloaders of FIG. 20, shown being supported by the rack and respectively supporting three adjacent bulk material shipping containers.

FIG. 27 is a left side view of the three bulk material shipping container unloaders of FIG. 20, shown being supported by the rack and respectively supporting three adjacent bulk material shipping containers.

FIG. 28 is a perspective view of the three bulk material shipping container unloaders of FIG. 20, showing the rack on which the unloaders are positioned, and for each unloader a supporter connected to and supported by the rack, a pallet receiver connected to and supported by the supporter, a material director connected to and supported by the pallet receiver, and an automatic bulk material container gate mover connected to and supported by the pallet receiver.

FIG. 29 is a rear view of one of the three bulk material shipping container unloaders of FIG. 20, showing a portion of the rack, a supporter connected to and supported by the rack, a pallet receiver connected to and supported by the supporter, a material director connected to and supported by the pallet receiver, and an automatic bulk material container gate mover connected to and supported by the pallet receiver.

FIG. 30 is front view of the bulk material shipping container unloader of FIG. 29, showing a portion of the rack, the supporter connected to and supported by the rack, the pallet receiver connected to and supported by the supporter, the material director connected to and supported by the pallet receiver, and the automatic bulk material container gate mover connected to and supported by the pallet receiver.

FIG. 31B is a rear perspective view of the unloader of FIG. 29, showing the supporter, the pallet receiver connected to and supported by the supporter, and the automatic bulk material container gate mover connected to and supported by the pallet receiver of the unloader, and partially showing dual leg stands and single leg stands of the rack supporting the unloader.

FIG. 31C is a perspective view of a leg of the unloader of FIG. 29, showing the supporter, the pallet receiver connected to and supported by the supporter, and the automatic bulk material container gate mover connected to and supported by the pallet receiver of the unloader, and partially showing dual leg stands and single leg stands of the rack supporting the unloader.

FIG. 31E an enlarged perspective view of a leg securing assembly engaging a locking block of one unloader and a locking block of an adjacent unloader.

FIG. 31F is a top view of the leg securing engaging two adjacent locking blocks of FIG. 31E.

FIG. 31G is a perspective view of the leg securing assembly of FIG. 31D engaging and locking securing a leg of one of the unloaders of FIG. 28 and an adjacent leg of an adjacent unloader of FIG. 28.

FIG. 31H is a front view of the leg of the unloader of FIG. 29, showing a first bracket and a second bracket of an operation status light supporting assembly connected to the leg of the unloader and supporting an operation light of the unloader.

FIG. 32A is a top perspective view of the pallet receiver of the unloader of FIG. 29, shown removed from the rest of the unloader.

FIG. 32B is an exploded top perspective view partially showing a weight measuring system of the pallet receiver of the unloader and showing a first weight measuring assembly and a second weight measuring assembly connected by a first bridge.

FIG. 32C is a top perspective view of a load cell of a weight measuring assembly of the pallet receiver of the unloader.

FIG. 32D is a top perspective view of a first bridge of the weight measuring system of the pallet receiver of the unloader.

FIG. 33A is a top perspective view of a material director of the unloader of FIG. 29, showing a fixed chute section, a chute connector section connected to the fixed chute section and a movable and removable chute section, and the movable and removable chute section connected to the chute connector section and shown removed from the rest of the unloader.

FIG. 33B is a rear perspective view of the material director of the unloader of FIG. 29, showing the fixed chute section, the chute connector section connected to the fixed chute section and the movable and removable chute section, and the movable and removable chute section connected to the chute connector section.

FIG. 33D is an enlarged perspective view of the material director opening assembly of the fixed chute section of the unloader of FIG. 29.

FIG. 33E is rear view of the material director opening assembly of the fixed chute section of the unloader of FIG. 29.

FIG. 33F is a left side view of the material director opening assembly of the fixed chute section of the unloader of FIG. 29.

FIG. 33G is a right side view of the material director opening assembly of the fixed chute section of the unloader of FIG. 29.

FIG. 33H is top view of the material director opening assembly of the fixed chute section of the unloader of FIG. 29.

FIG. 33I is a bottom view of the material director opening assembly of the fixed chute section of the unloader of FIG. 29.

FIG. 33N is a perspective view of the chute connector section of the material director of the unloader of FIG. 29, showing certain components of the chute connector section.

FIG. 33O is an exploded view of the movable and removable chute section of the material director of the unloader of FIG. 29.

FIG. 33P is an exploded view of a material director of a middle unloader of FIG. 28.

FIG. 34A is a perspective view of the automatic bulk material container gate mover of the unloader of FIG. 29, showing a track assembly and partially showing a gate mover assembly supported by the track assembly and shown removed from the rest of the unloader.

FIG. 34B is an exploded perspective view of a first track of the track assembly of FIG. 34B and a partial showing of a forklift tine receiver.

FIG. 34C is a perspective view of a first track of the track assembly of FIG. 34B and a partial showing of the forklift tine receiver.

FIG. 34D is perspective view of the gate mover assembly of FIG. 29.

FIG. 34E is an exploded perspective view of the gate mover assembly of FIG. 34A.

FIG. 34F is bottom perspective view of a first trolley of the gate mover assembly of FIG. 34A, showing an outer surface of a C-bracket of the first trolley.

FIG. 34G is a top perspective view of the first trolley of the gate mover assembly of FIG. 34A, showing wheels of the first trolley removed.

FIG. 34J is an exploded perspective view of a trolley connector of the gate mover assembly of FIG. 34A.

FIG. 34K is a perspective view of a first trolley mover assembly of the gate mover assembly of FIG. 34A, showing the first trolley mover connected to a partial showing of the first trolley.

FIG. 34L is a perspective view of a trolley mover assembly controller supported by a trolley mover assembly housing of FIG. 34A.

FIG. 34N is an exploded perspective view of the trolley mover assembly housing of FIG. 34L, showing the trolley mover assembly controller removed.

FIG. 35D is a left perspective view of the rack of FIG. 35A, showing the dual and single leg stands and the unloader stabilizers removed.

FIG. 35F is an enlarged perspective view of a portion of the rack of FIG. 35A, partially showing a grating assembly, a base beam, and a forklift tine receiver assembly partially positioned through an opening of the base beam.

FIG. 35H is an exploded view of one dual leg stand of the rack of FIG. 35A that supports the unloaders of FIG. 28.

FIG. 35I is an exploded view of one single leg stand of the rack of FIG. 35A that supports the unloaders of FIG. 28.

FIG. 35J is an exploded view of one unloader stabilizer of the rack of FIG. 35A that supports the unloaders of FIG. 28.

DETAILED DESCRIPTION

Figure 1:
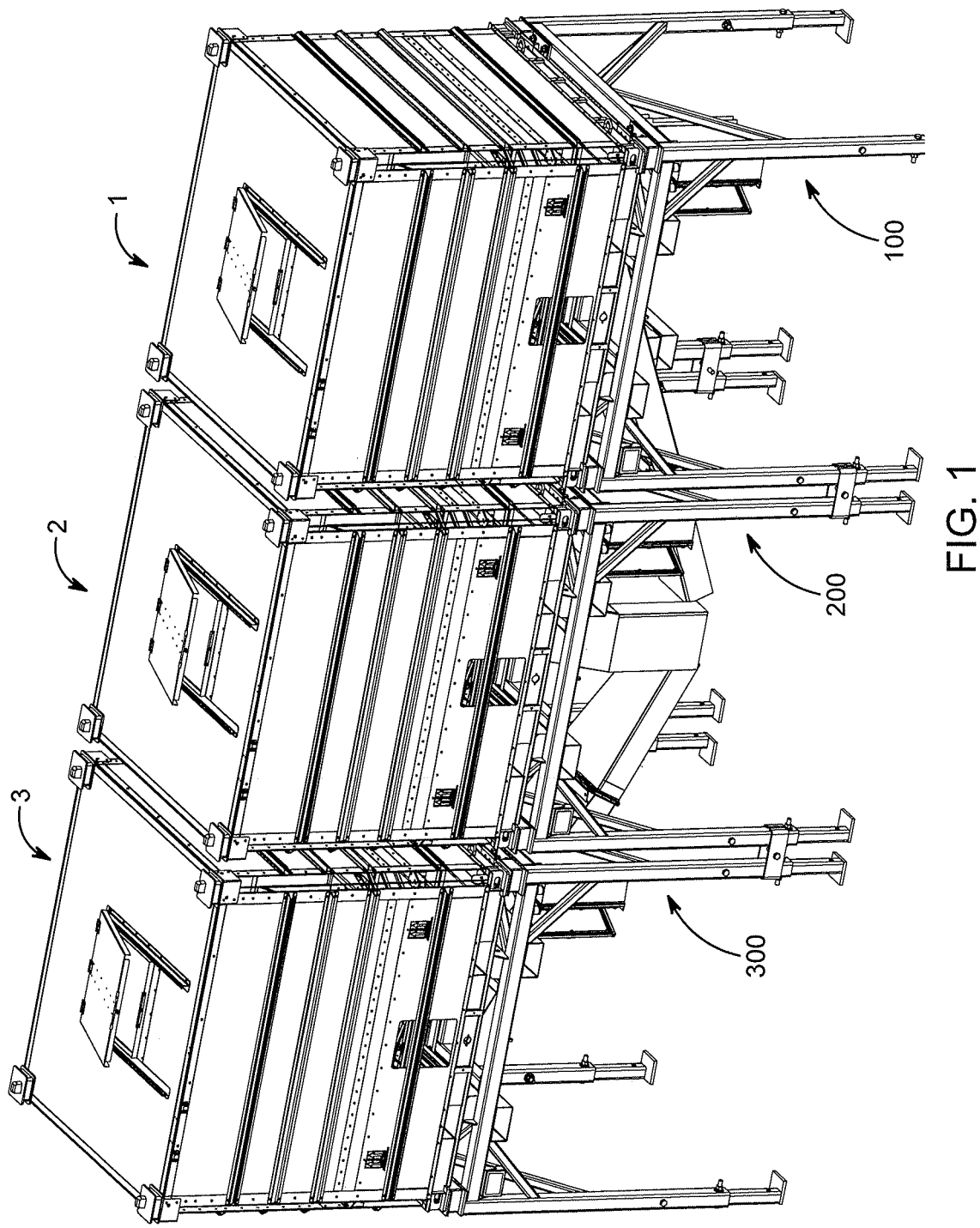
FIG. 1 is a top front perspective view of three adjacently positioned bulk material shipping container unloaders of one example embodiment of the present disclosure, shown respectively supporting three adjacent bulk material shipping containers.
Figure 2:
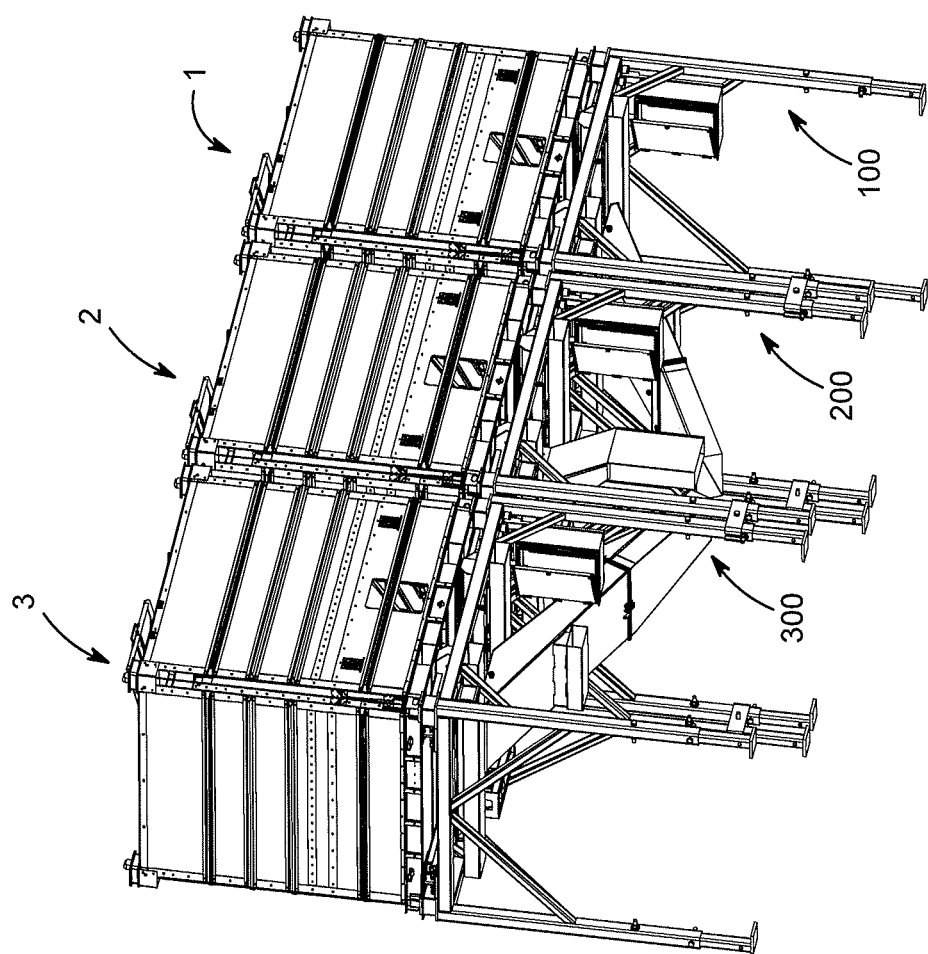
FIG. 2 is a bottom front perspective view of the three bulk material shipping container unloaders of FIG. 1, shown respectively supporting three bulk material shipping containers.
Figure 3:
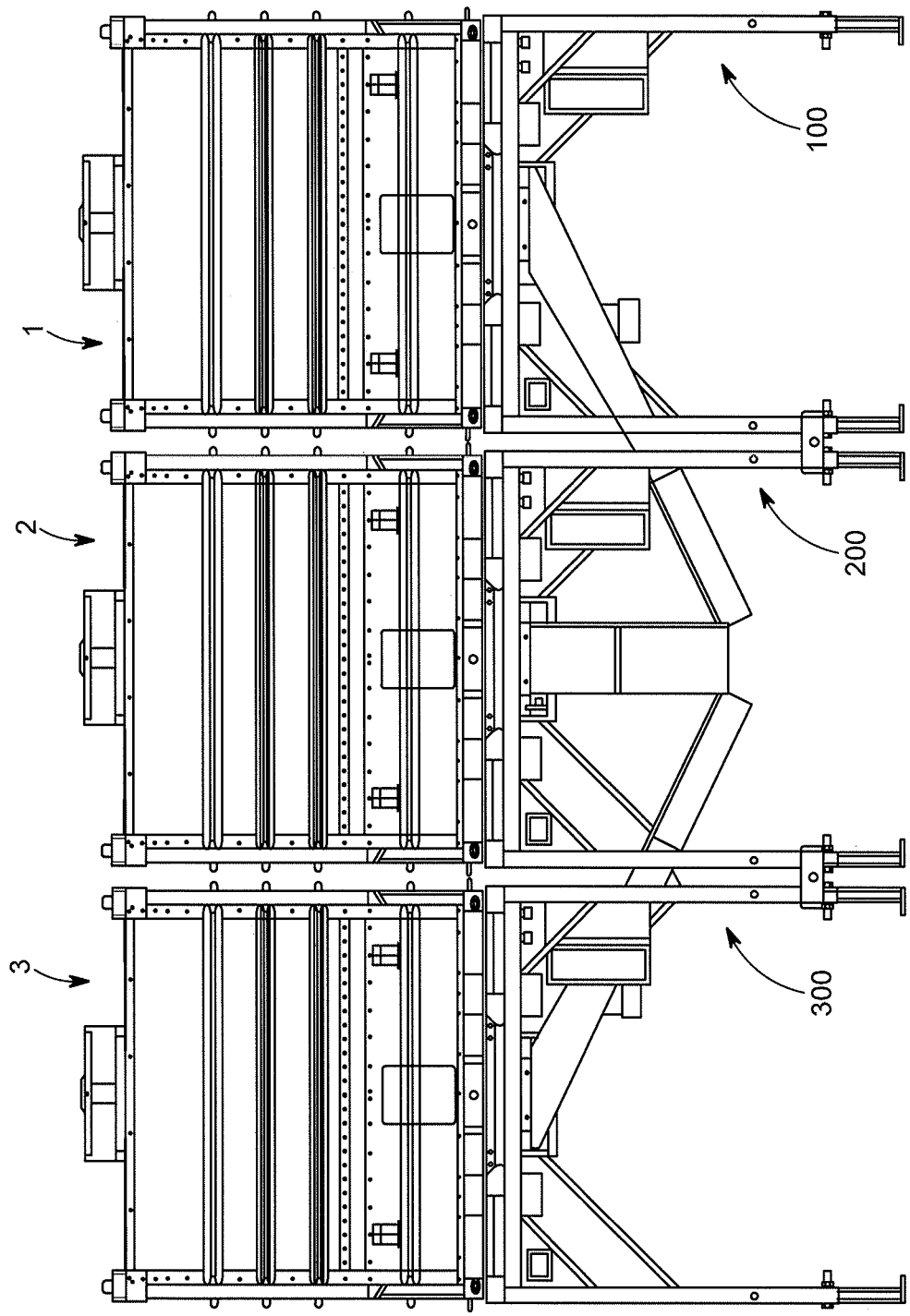
FIG. 3 is a front view of the three bulk material shipping container unloaders of FIG. 1, shown respectively supporting three bulk material shipping containers.
Figure 4:
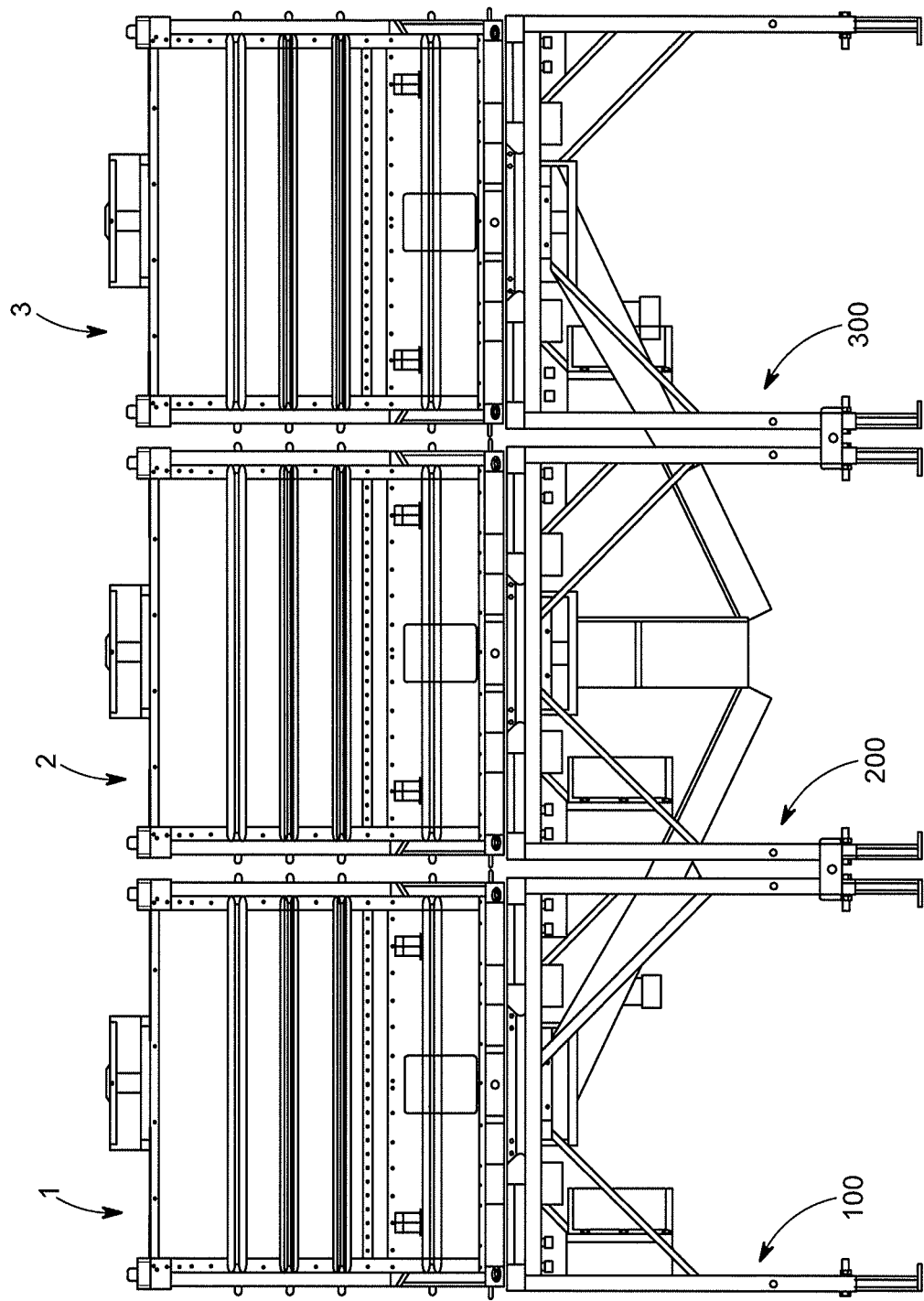
FIG. 4 is a rear view of the three bulk material shipping container unloaders of FIG. 1, shown respectively supporting three bulk material shipping containers.
Figure 5:
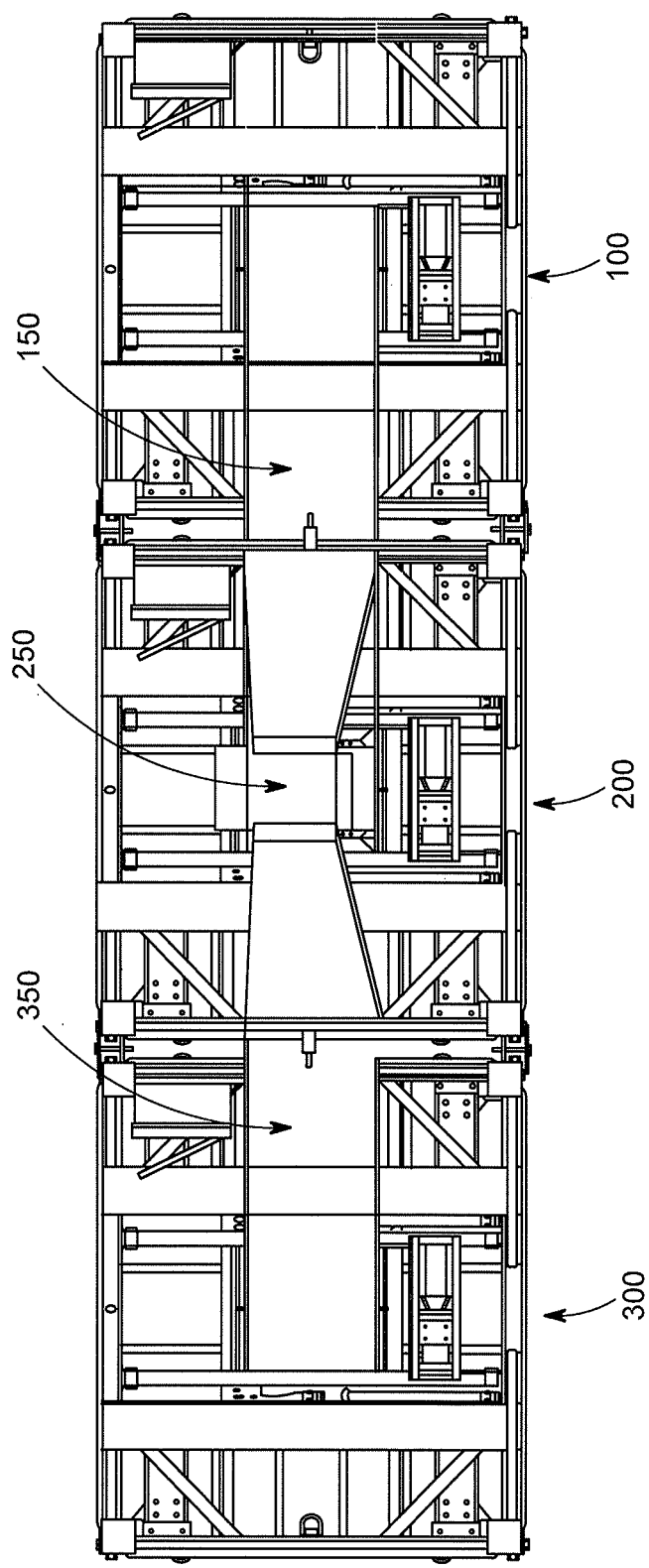
FIG. 5 is a bottom view of the three bulk material shipping container unloaders of FIG. 1, shown respectively supporting three bulk material shipping containers.
Figure 6:
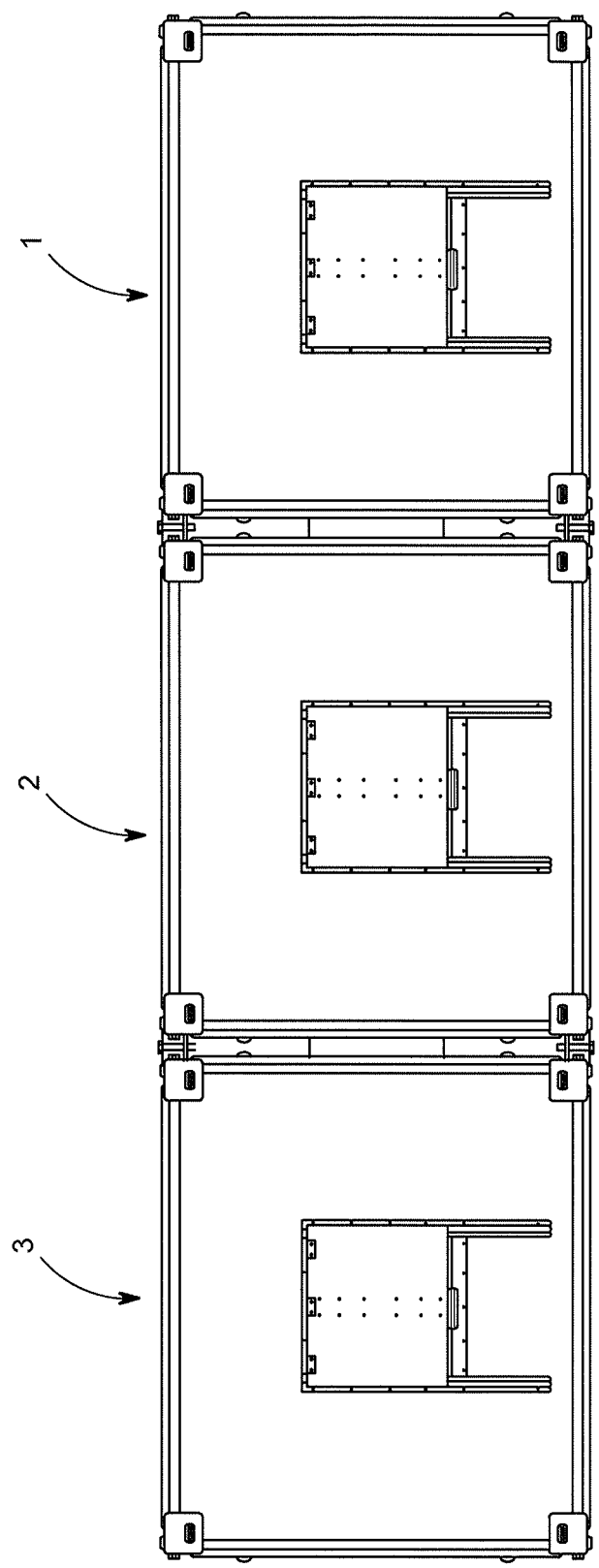
FIG. 6 is a top view of the three bulk material shipping container unloaders of FIG. 1, shown respectively supporting three bulk material shipping containers.
Figure 7:
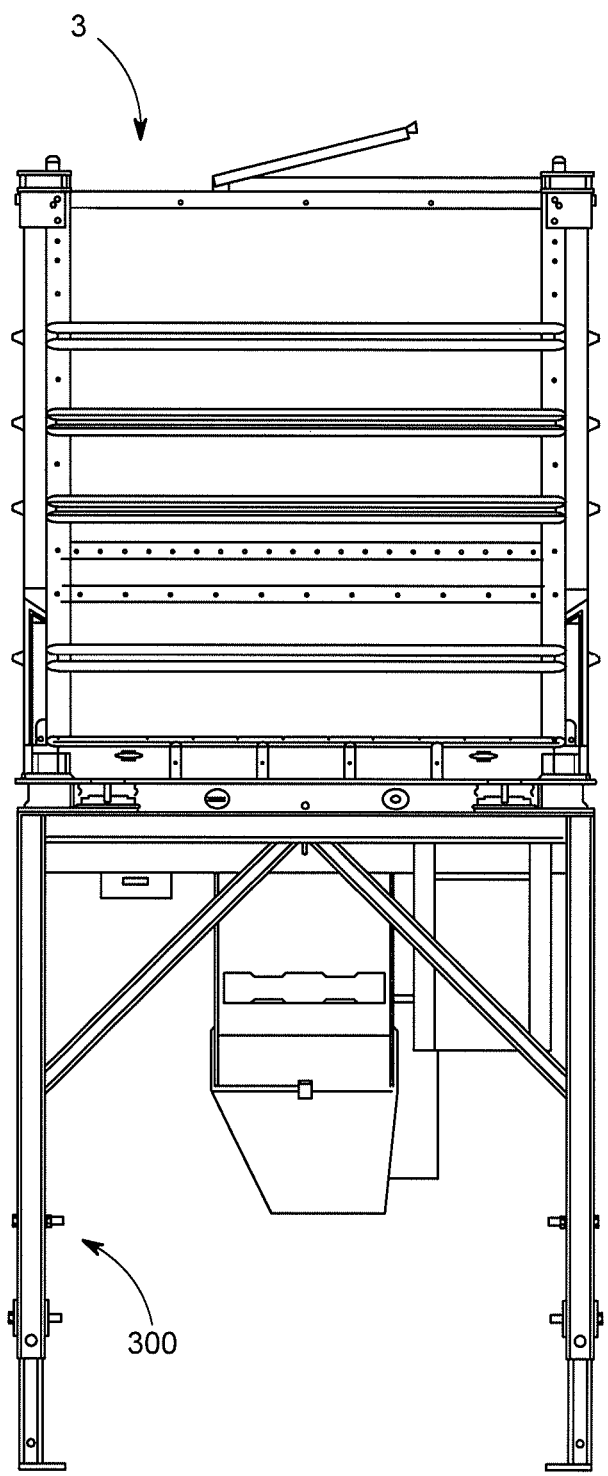
FIG. 7 is a right side view of the three bulk material shipping container unloaders of FIG. 1, shown respectively supporting three bulk material shipping containers.
Figure 8:
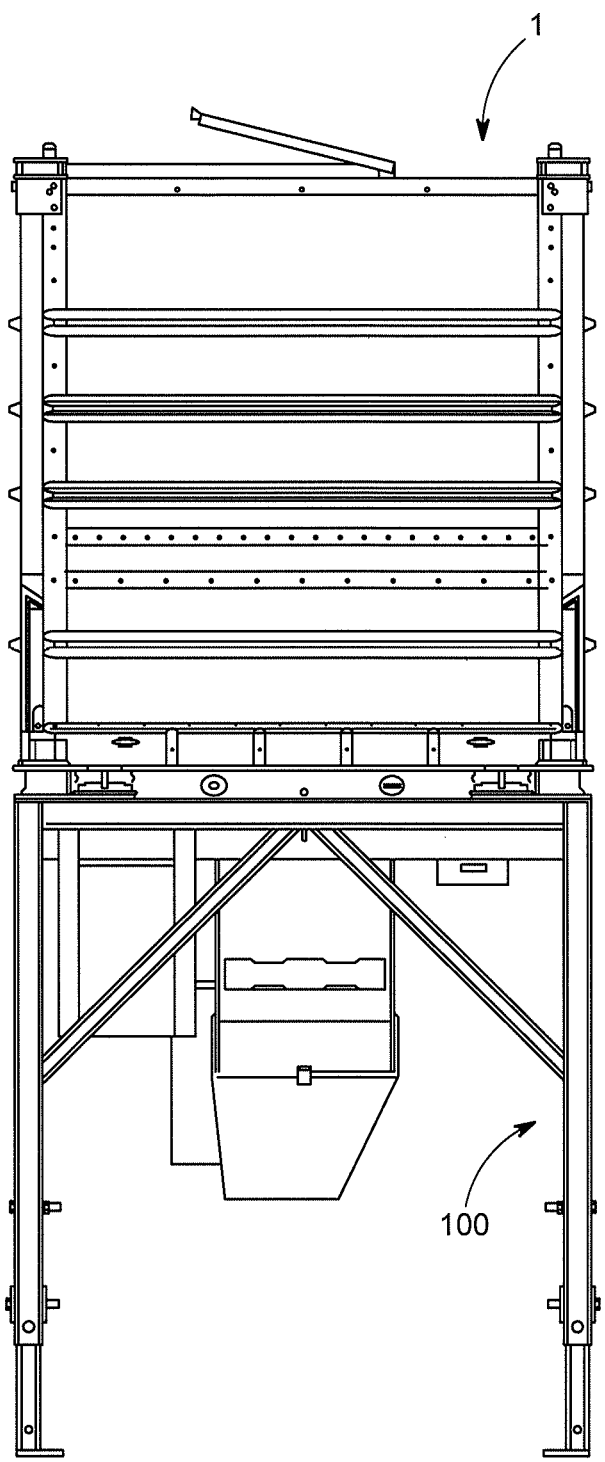
FIG. 8 is a left side view of the three bulk material shipping container unloaders of FIG. 1, shown respectively supporting three bulk material shipping containers.
Figure 9:
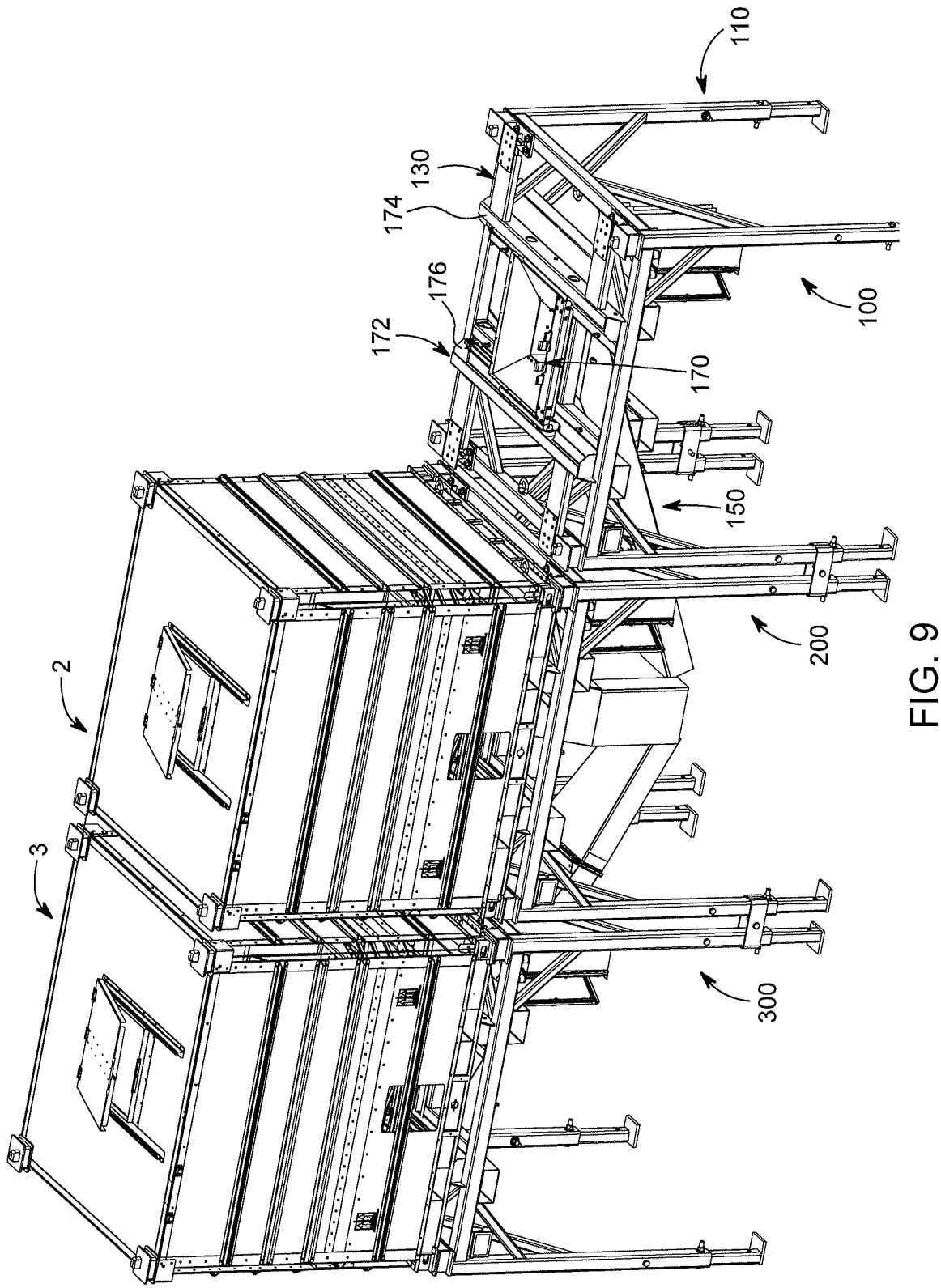
FIG. 9 is a top front perspective view of three bulk material shipping container unloaders of FIG. 1, shown respectively supporting two bulk material shipping containers (i.e., with one of the three bulk material shipping containers removed), and showing part of the automatic gate mover of bulk material shipping container unloader.
Figure 10:
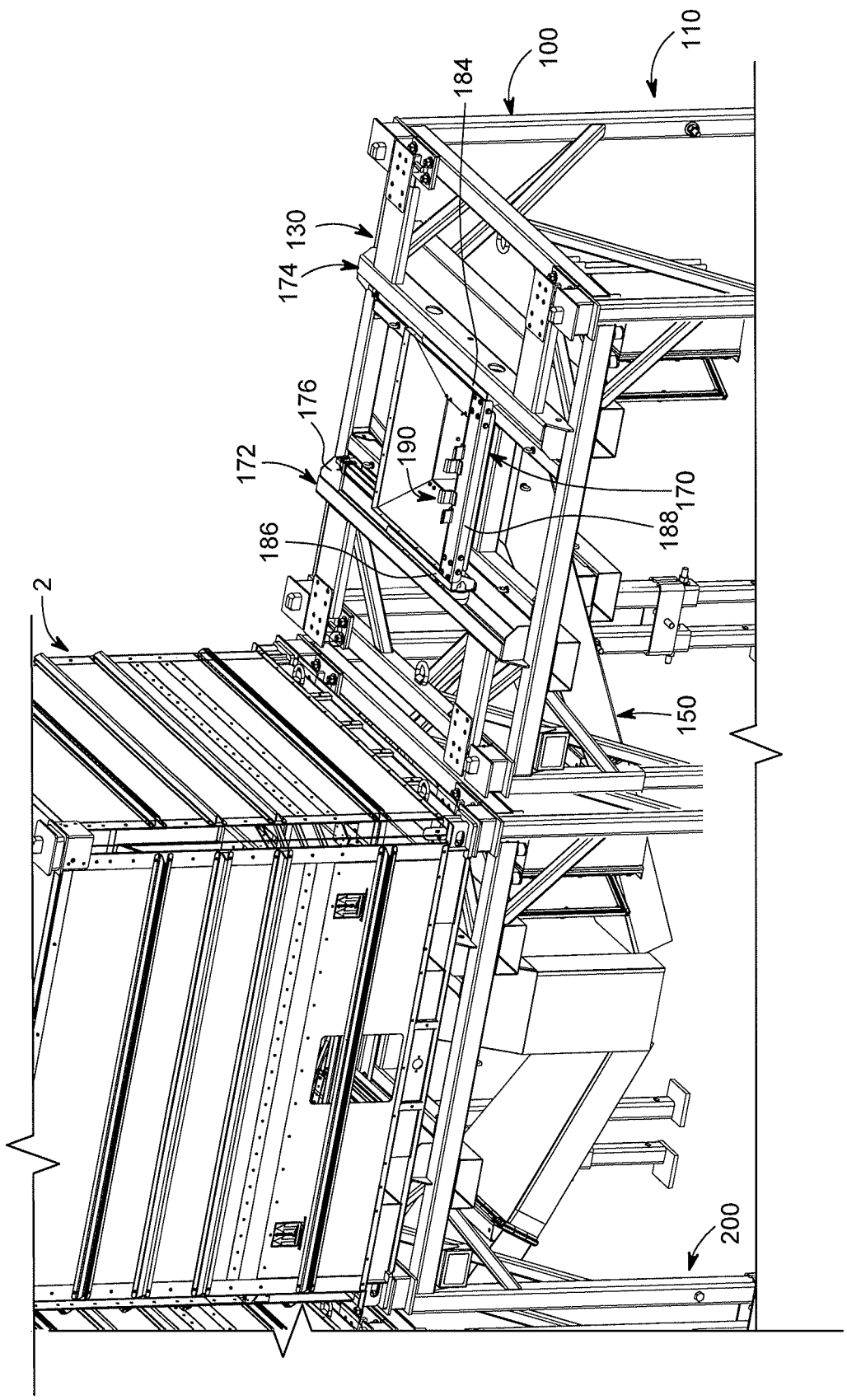
FIG. 10 is an enlarged fragmentary top front perspective view of two of the bulk material shipping container unloaders of FIG. 1, shown respectively supporting one bulk material shipping container, and showing part of the automatic gate mover of bulk material shipping container unloader.
Figure 11:
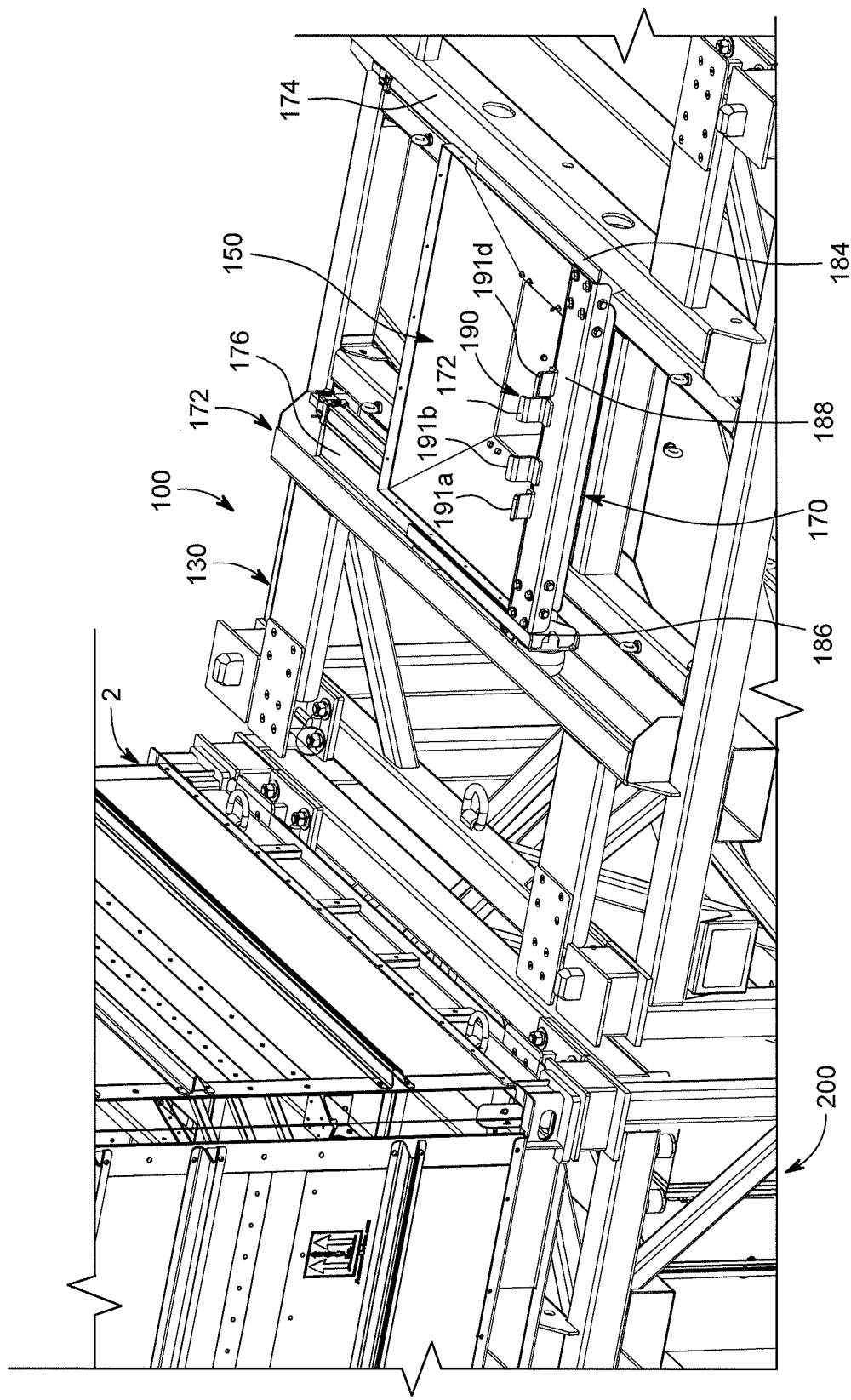
FIG. 11 is a further enlarged fragmentary top front perspective view of two of the bulk material shipping container unloaders of FIG. 1, shown respectively supporting one bulk material shipping container, and showing part of the automatic gate mover of bulk material shipping container unloader.
Figure 12:
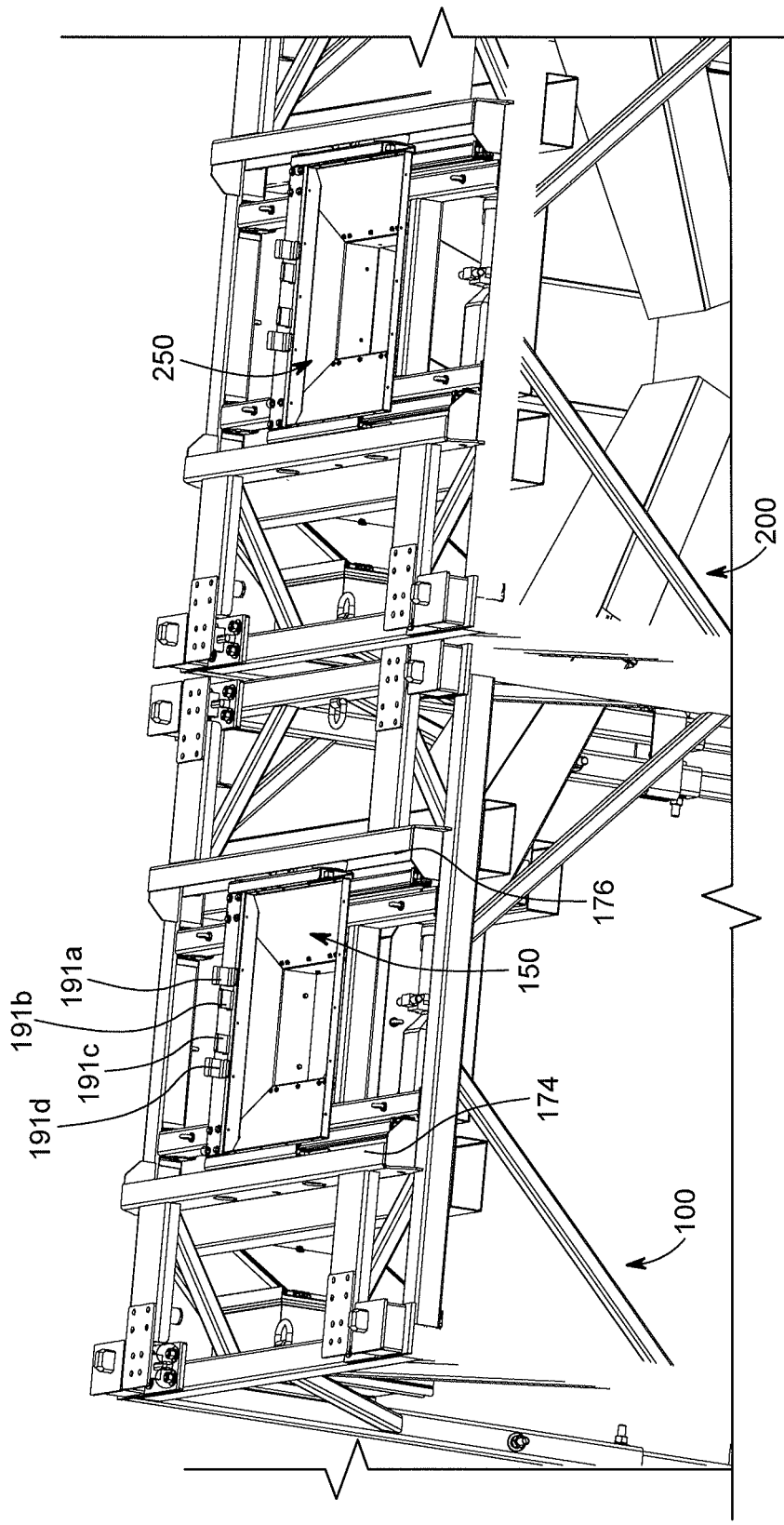
FIG. 12 is a top rear fragmentary perspective view of two of the bulk material shipping container unloaders of FIG. 1, shown with the bulk material shipping containers removed, and showing part of the automatic gate mover of bulk material shipping container unloader.
Figure 13:
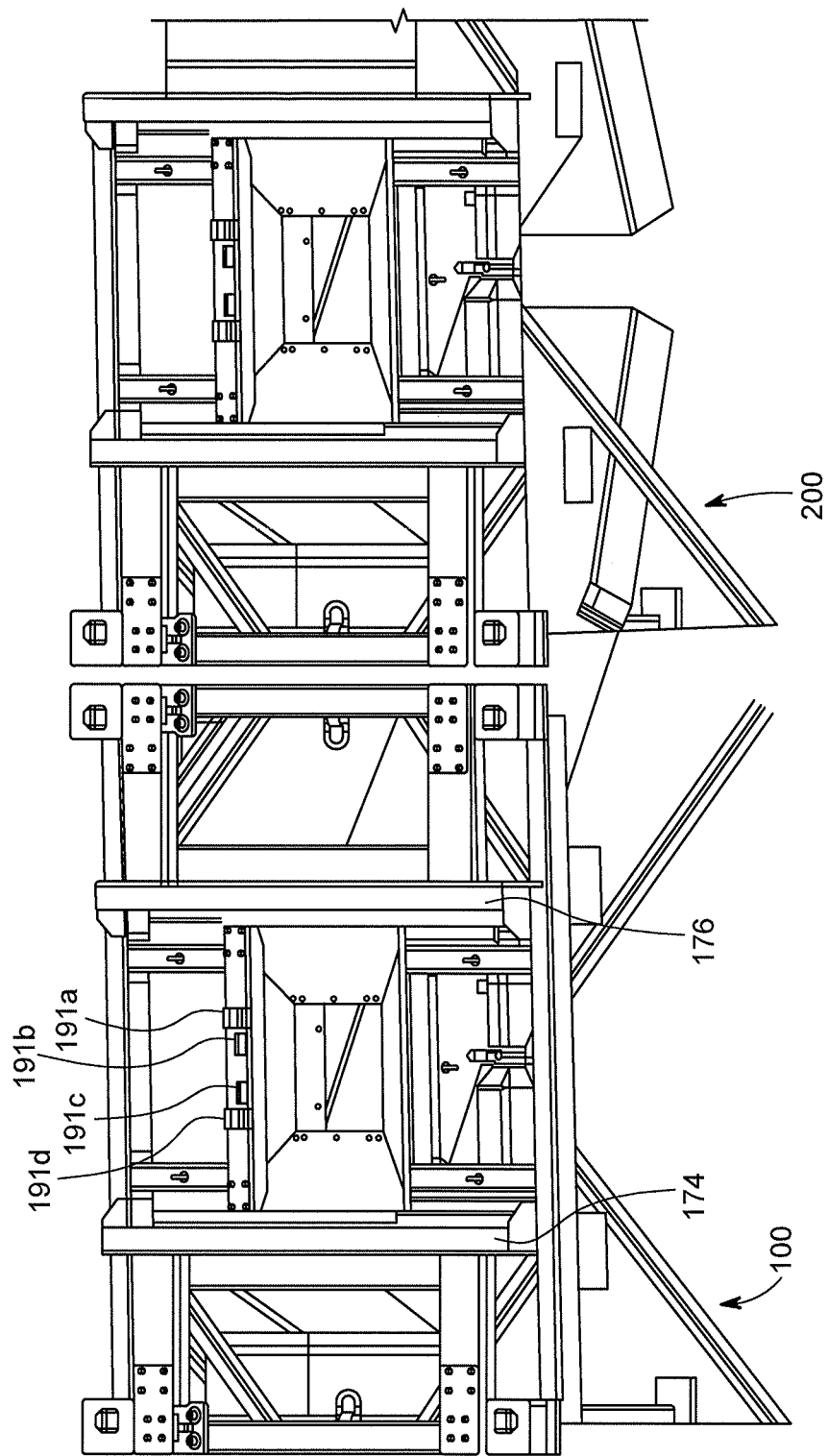
FIG. 13 is a top rear fragmentary perspective view of two of the bulk material shipping container unloaders of FIG. 1, shown with the bulk material shipping containers removed, and showing part of the automatic gate mover of bulk material shipping container unloader.
Figure 14:
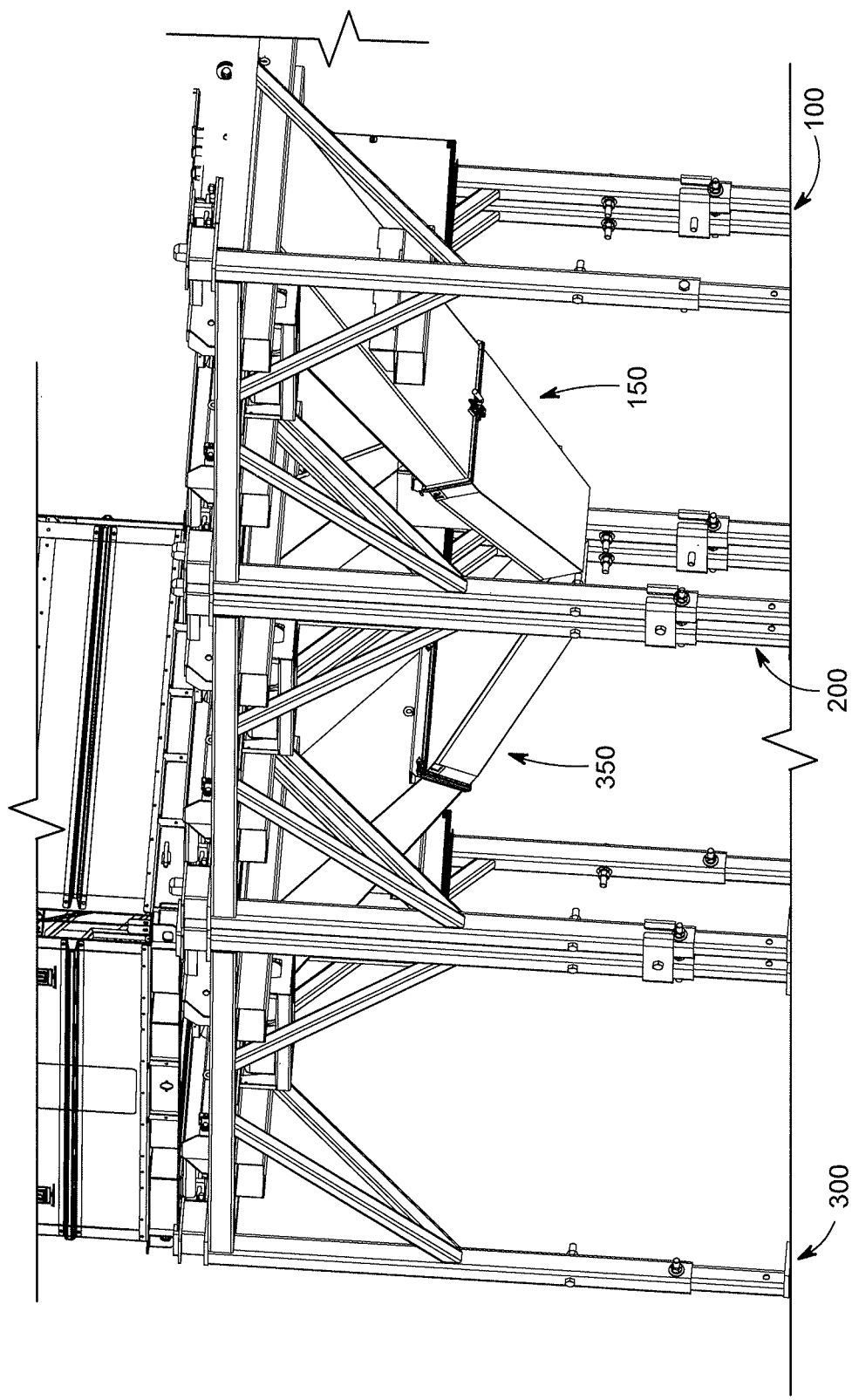
FIG. 14 is an enlarged front fragmentary perspective view of the three bulk material shipping container unloaders of FIG. 1, shown with two of the bulk material shipping containers removed, and showing parts of the material directors of the material shipping container unloaders.
Figure 15:
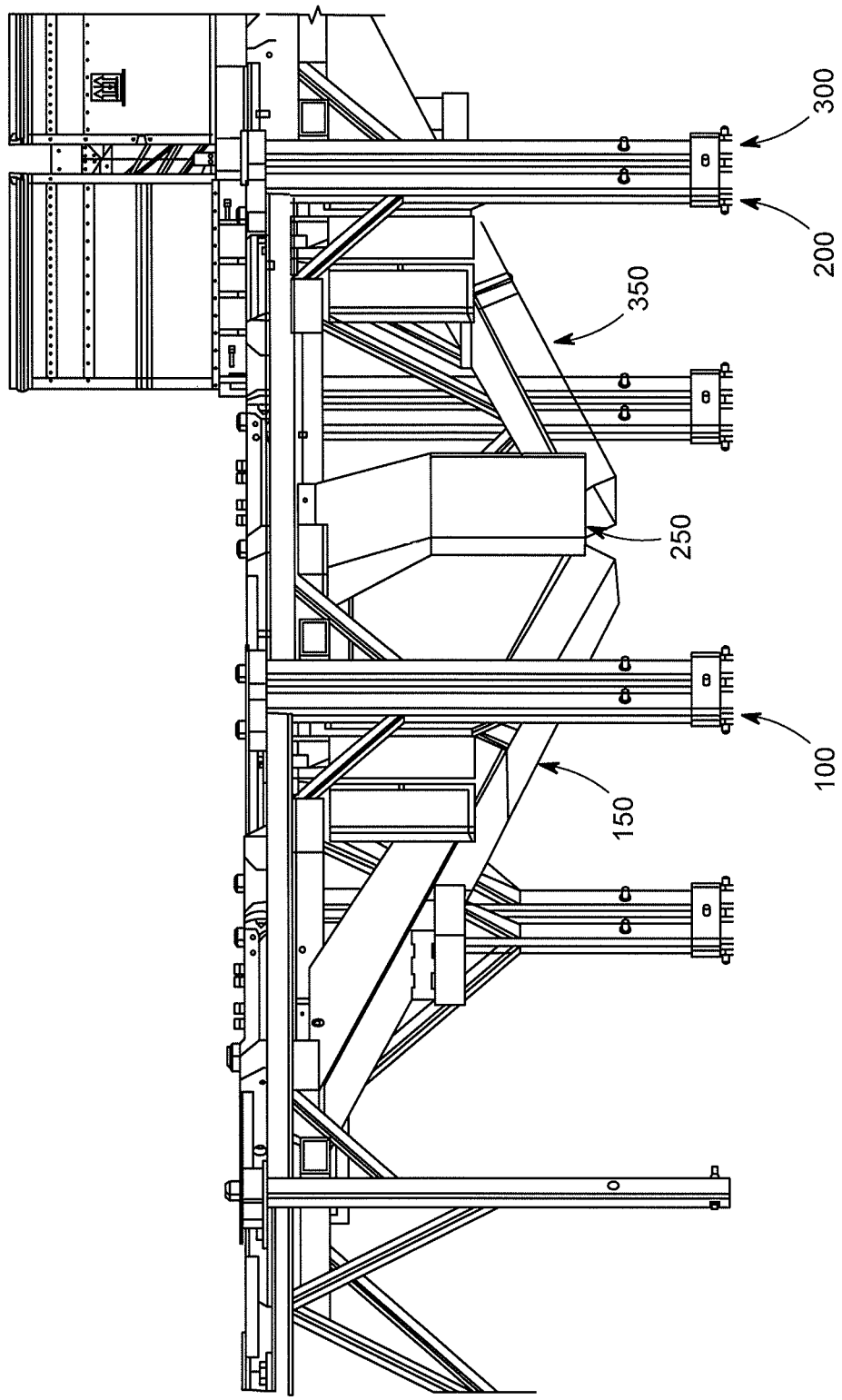
FIG. 15 is an enlarged rear fragmentary perspective view of the three bulk material shipping container unloaders of FIG. 1, shown with two of the bulk material shipping containers removed, and showing parts of the material directors of the material shipping container unloaders.
Figure 16:
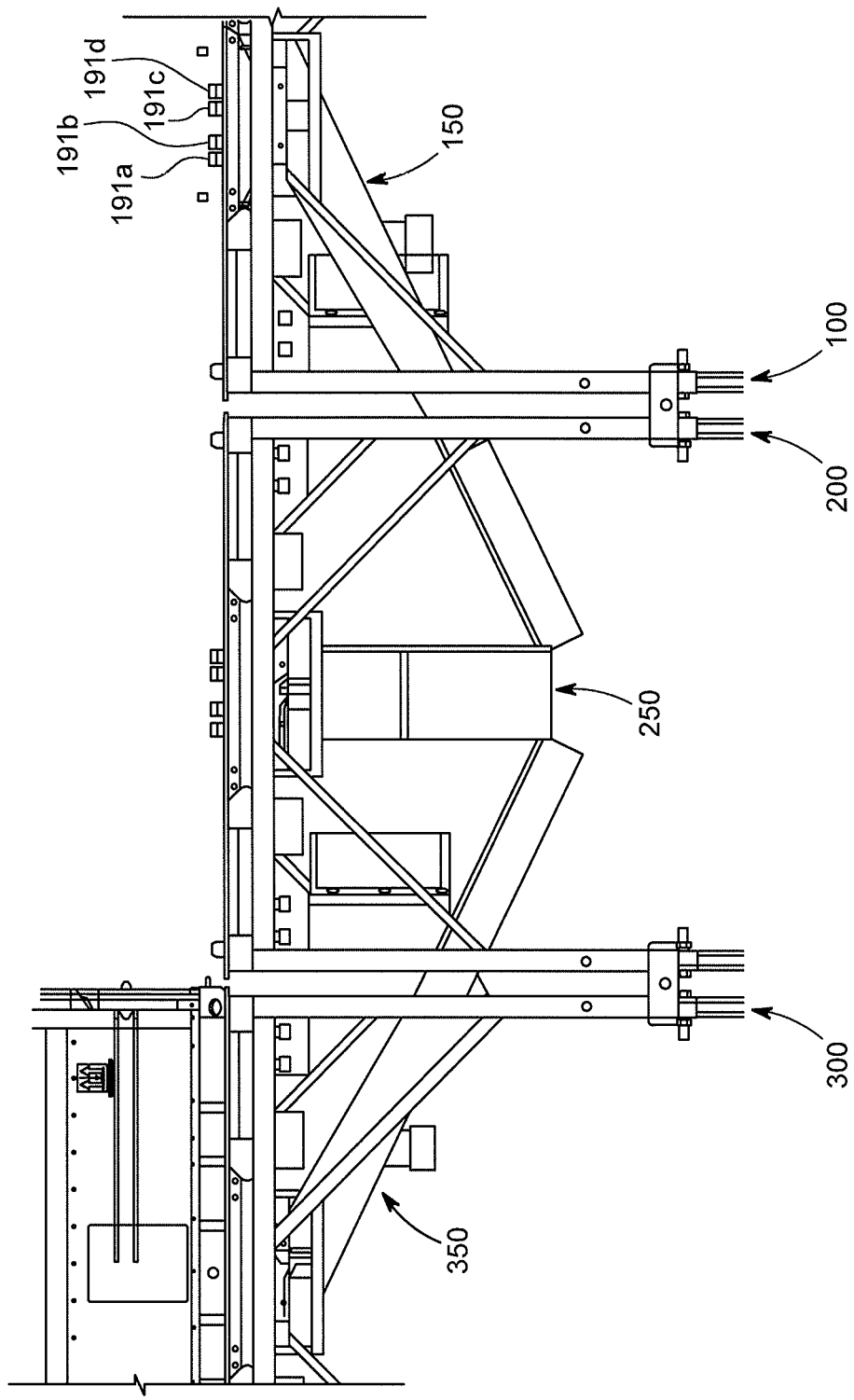
FIG. 16 is an enlarged front fragmentary perspective view of the three bulk material shipping container unloaders of FIG. 1, shown with two of the bulk material shipping containers removed, and showing parts of the material directors of the material shipping container unloaders.

Referring now to the drawings, FIGS. 1 to 19 illustrate three example embodiments of the bulk material shipping container unloader of the present disclosure, which are respectively, indicated by numerals 100, 200, and 300.

These three bulk material shipping container unloaders 100, 200, and 300 are shown respectively supporting three bulk material shipping containers 1, 2, and 3 (that are configured as further described in U.S. Provisional Patent Application No. Ser. No. 62/357,023, filed Jun. 30, 2016). It should be appreciated that in various example embodiments, each unloader of the present disclosure is configured to hold a shipping container that includes a compartment having a bottom portion with a selectively openable and closeable material unloading assembly, and wherein the material unloading assembly includes a gate with a downwardly extending handle. The gate is movable or slidable from a closed position to a plurality of different partially open positions, and then to a fully open position, and back to the closed position.

The bulk material shipping container unloader 100 generally includes: (a) an expandable or extendable supporter; (b) a pallet receiver supported by the expandable or extendable supporter; (c) a first material director supported by the pallet receiver; and (d) an automatic bulk material container gate mover.

The bulk material shipping container unloader 200 generally includes: (a) an expandable or extendable supporter; (b) a pallet receiver supported by the expandable or extendable supporter; (c) a second material director supported by the pallet receiver; and (d) an automatic bulk material container gate mover.

The bulk material shipping container unloader 300 generally includes: (a) an expandable or extendable supporter; (b) a pallet receiver supported by the expandable or extendable supporter; (c) a third material director supported by the pallet receiver; and (d) an automatic bulk material container gate mover.

In these example embodiments, these three bulk material shipping container unloaders 100, 200, and 300 are identical except that they each include a differently configured material director. Thus, for brevity, the expandable or extendable supporter, the pallet receiver, and the automatic bulk material container gate mover of the unloader 100 is primarily described, and it should be appreciated that such description also applies to the unloaders 200 and 300 that are identically configured (except for the material director) in this illustrated example embodiment.

Generally, (a) the expandable supporter 110 of the unloader 100 is configured to support the pallet receiver 130, the material director 150, and the gate mover 170; (b) the pallet receiver 130 is configured to support a bulk material shipping container 1; (c) the material director 150 is configured to receive and direct material exiting the bulk material shipping container to and through a material unloading chute and port; and (d) the gate mover 170 is configured to open and close the gate of the material unloading assembly (not shown) of the container 1.

In this illustrated example embodiment, the expandable supporter 110 is movable from a retracted position to one or more expanded positions to change the height of the pallet receiver 130, the material director 150, and the automatic gate mover 170. The expandable or extendable supporter 110 includes: (a) expandable legs; (b) feet respectively attached to the bottom of the legs; (c) leg stabilizers attached to the legs; and (d) locking members configured to respectively hold or secure the legs in the expanded and retracted positions.

In this illustrated example embodiment, the expandable legs each include telescoping upper and lower sections with alignable openings that provide for the expansion or height adjustment of the pallet receiver 130, the material director 150, and the automatic gate mover 170.

In this illustrated example embodiment, the locking members are configured to extend through the aligned openings to hold the legs in the expanded and retracted positions.

In this illustrated example embodiment, the legs and the leg stabilizers are each made from a steel tubular material.

The leg stabilizers are welded to the upper sections of the legs to provide a suitable support structure for the unloader 100. It should also be appreciated that the feet are also made of steel and welded or otherwise suitably respectively attached to the legs in this illustrated example embodiment.

It should be appreciated that these components are made from steel to: (a) facilitate attachment or connection of these components by welding and/or suitable fasteners; (b) provide structural strength and rigidity; (c) facilitate ease of cleaning; and (d) facilitate ease of repair. However, it should be appreciated that in alternative embodiments, one or more of these components can be made from other suitably strong materials and can be attached in other suitable manners.

The pallet receiver 130 is configured to receive, support, and hold a pallet of a bulk material shipping container 1. More specifically, in this illustrated example embodiment, the pallet receiver 130 includes: (a) a pallet supporting frame including a plurality of pallet supports; and (b) nesting supports connected to and extending upwardly from the pallet supports.

In this illustrated example embodiment, the pallet support frame is made from steel and the nesting supports are each made from steel components and welded to the pallet support frame. It should be appreciated that these components are made from steel to: (a) facilitate attachment or connection of these components by welding and/or suitable fasteners; (b) provide structural strength and rigidity; (c) facilitate ease of cleaning; and (d) facilitate ease of repair. However, it should be appreciated that in alternative embodiments, one or more of these components can be made from other suitably strong materials and can be attached in other suitable manners. It should also be appreciated that the nesting supports can be configured in a similar manner as in U.S. Provisional Patent Application Ser. No. 62/357,023.

The first material director 150 of the unloader 100 is supported by the pallet receiver 130 and is configured to direct material exiting the bulk material shipping container 1 resting on the unloader 100 to an exit area and specifically through a material unloading chute and port. More specifically, first material director 150 includes a partially fixed and movable section connected to and supported by the pallet supporting frame of the pallet receiver. In this illustrated example embodiment, the partially moveable chute is configured to move to a position such that part of the chute extends under the adjacent unloader 200. In this illustrated example embodiment, the material director is primarily made of steel. It should be appreciated that these components are made from steel to: (a) facilitate attachment or connection of these components by welding and/or suitable fasteners; (b) provide structural strength and rigidity; (c) facilitate ease of cleaning; and (d) facilitate ease of repair. However, it should be appreciated that in alternative embodiments, one or more of these components can be made from other suitably strong materials and can be attached in other suitable manners. In this illustrated example embodiment, the first material director 150 of the unloader 100 includes one or more hingedly connected sections which are moveable with respect to one or more other sections of the first material director 150 to facilitate the chute of the material director 150 extending under the adjacent unloader 250.

The second material director 250 of the unloader 200 is supported by the pallet receiver of that unloader 200 and is configured to direct material exiting the bulk material shipping container 2 resting on the unloader 200 to an exit area and specifically through a material unloading chute and port. More specifically, second material director 250 includes a partially fixed and movable section connected to and supported by the pallet supporting frame of the pallet receiver. The partially moveable chute of the second material director 250 is configured to move to a position such that the chute extends under the unloader 200. In an alternative embodiment, this second material director 250 is stationary or not moveable.

The third material director 350 of the unloader 300 is like the first material director 150 of the unloader 100. The third material director 350 of the unloader 300 is supported by the pallet receiver of that unloader 300 and is configured to direct material exiting the bulk material shipping container 3 resting on the unloader 300 to an exit area and specifically through a material unloading chute and port. More specifically, third material director 350 includes a partially fixed and movable section connected to and supported by the pallet supporting frame of the pallet receiver. The partially moveable chute of the third material director 350 is configured to move to a position such that part of the chute extends under the adjacent unloader 200. In this illustrated example embodiment, the third material director 350 of the unloader 300 includes one or more hingedly connected sections which are moveable with respect to one or more other sections of the third material director 350 to facilitate the chute of the material director 350 extending under the adjacent unloader 250.

The automatic bulk material container gate mover 170 of the unloader 100 is configured to automatically open a gate with a downwardly extending handle (not shown) of a bulk material shipping container such as container 1. The automatic bulk material container gate mover 170 of this illustrated example embodiment generally includes: (a) a track assembly 172 connected to and supported by the pallet receiver; and (b) a gate mover assembly 180 supported by track assembly 172 and configured to receive and engage a downwardly extending handle of a gate of a material unloading assembly of the container.

More specifically, the track assembly 172 includes a first track 174 connected to and supported by the pallet receiver and a second track 176 spaced apart from the first track and connected to and supported by the pallet receiver 130.

The gate mover assembly 180 includes: (a) a first trolley 184 configured move along the first track 174; (b) a second trolley 186 configured move along the second track 176; (c) a trolley connector 188 that is connected to the first trolley 184 and the second trolley 186; (d) a gate receiver and engager 190 configured to receive and engage the downwardly extending handle of the gate; (e) a first trolley mover 196 connected to the first trolley; and (f) a second trolley mover 198 connected to the second trolley.

In this illustrated example embodiment, the first trolley mover 196 includes a first hydraulic piston and the second trolley mover 198 includes a second hydraulic piston. The first hydraulic piston and the second hydraulic piston are simultaneously controlled and co-act or operate together to simultaneously move the first and second trolleys 184 and 186 respectively along the first and second tracks 174 and 176 from the first position shown in FIGS. 9, 10, and 11 to a second position (not shown).

The gate receiver and engager 190 includes four spaced apart upwardly extending hands 191a, 191b, 191c, and 191d that are configured to receive and engage the downwardly extending handle of the gate. More specifically, two of the upwardly extending hands 191a and 191d are configured to engage the front side of the downwardly extending handle of the gate and two of the upwardly extending hands 191b and 191c are configured to engage the rear side of the downwardly extending handle of the gate. When the container 1 is placed on or positioned on the unloader 100, the gate of the material unloading assembly of the container 1 is in the closed position and the handle of the gate extends downwardly between the hands.

When the first trolley mover 196 and the second trolley mover 198 cause the first trolley 184 and the second trolley 186 to move forwardly, the hands 191*b* and 191*c* engage the rear side of the downwardly extending handle and cause the gate to move toward one of the partially opened positions or the fully opened position.

After the gate is fully or partially opened, when the first trolley mover 196 and the second trolley mover 198 cause the first trolley 184 and the second trolley 186 to move rearwardly, the hands 191*a* and 191*d* engage the front side of the downwardly extending handle and cause the gate to move back toward or till the fully closed position.

It should be appreciated (as further described below) that the bulk material container unloader of the present disclosure will include a suitable power and control system (not shown) for controlling (such as remotely controlling) the gate mover assembly and specifically the first and second hydraulic pistons.

It should be appreciated (as further described below) that power and control system can include one or more indicators such as lights (not shown) that indicate the positions of the gate mover assembly and thus of the gate of the container positioned on such unloader.

It should be appreciated (as further described below) that power and control system can include one or more sensors and display units (not shown) that are configured to determine the weight of the container positioned on the unloader.

It should be appreciated (as further described below) that while these illustrated example embodiments of the unloader of the present disclosure are extendable or expandable, the bulk material shipping container unloader of the present disclosure does not have to be extendable or expandable.

As mentioned above, various embodiments of the shipping container unloader of the present disclosure are primarily made from steel. In alternative embodiments, the shipping container unloader of the present disclosure or certain parts thereof, can be made from a suitably strong plastic material or other material.

Referring specifically now to FIGS. 20 to 35J, and particularly initially to FIGS. 20 to 30, three co-operating alternative example embodiments of the bulk material shipping container unloader of the present disclosure are illustrated adjacent to each other and respectively indicated by numerals 2000, 3000, and 4000. As mentioned above, for brevity, the bulk material shipping container unloaders 2000, 3000, and 4000 are often referred to herein as unloaders 2000, 3000, and 4000.

The various components of these unloaders 2000, 3000, and 4000 are described in detail below. It should be appreciated that such descriptions sometimes use the phrase "integrally connected" which for this illustrated example embodiment includes connected by welding. It should be appreciated that many of the different components can be connected in different or other suitable manners such as by suitable fasteners (which are typically not shown in the Figures).

As best shown in FIGS. 20 to 28, the example unloaders 2000, 3000, and 4000 are configured to adjacently (or side by side) rest on and be supported by a rack 5000 that is part of the present disclosure and described in more detail below. It should be appreciated that the rack which is part of the present disclosure can be employed with one or more unloaders of the present disclosure or other suitable unloaders.

Figure 17:
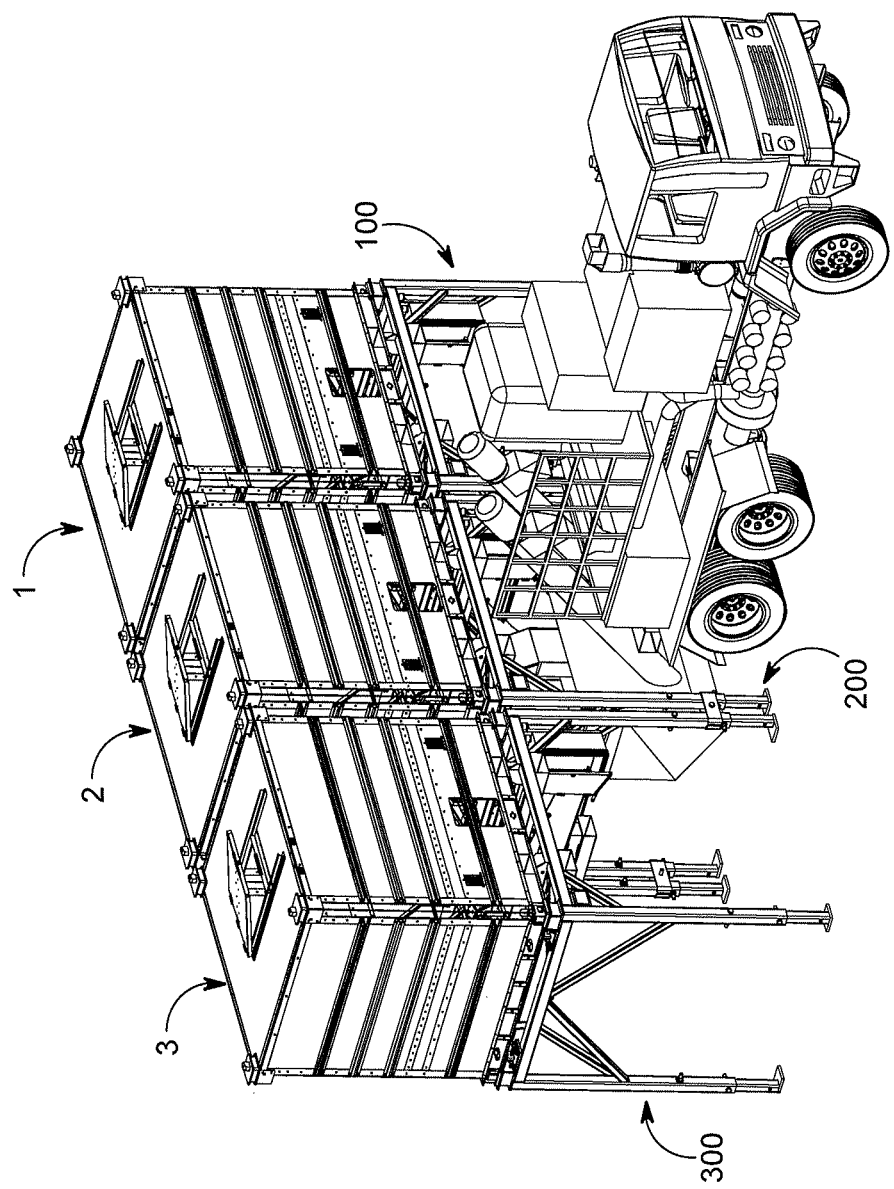
FIG. 17 is a front perspective view of the three bulk material shipping container unloaders of FIG. 1, shown respectively supporting three bulk material shipping containers, and showing a material receiving vehicle positioned partially under the middle loader to receive unloaded materials from the three bulk material shipping containers through the three bulk material shipping container unloaders.
Figure 18:
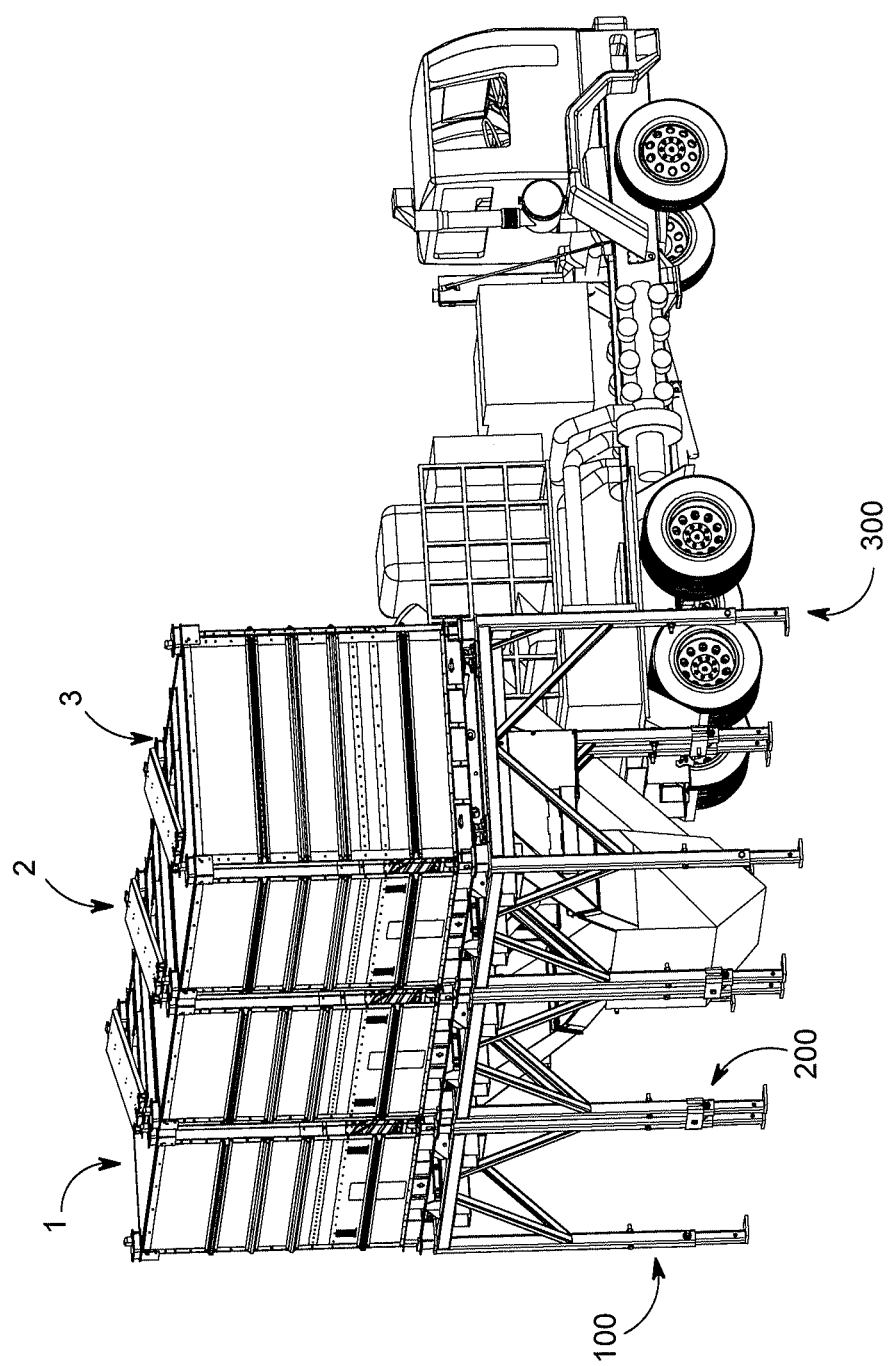
FIG. 18 is a side perspective view of the three bulk material shipping container unloaders of FIG. 1, shown respectively supporting three bulk material shipping containers, and showing a material receiving vehicle positioned partially under the middle loader to receive unloaded materials from the three bulk material shipping containers through the three bulk material shipping container unloaders.
Figure 19:
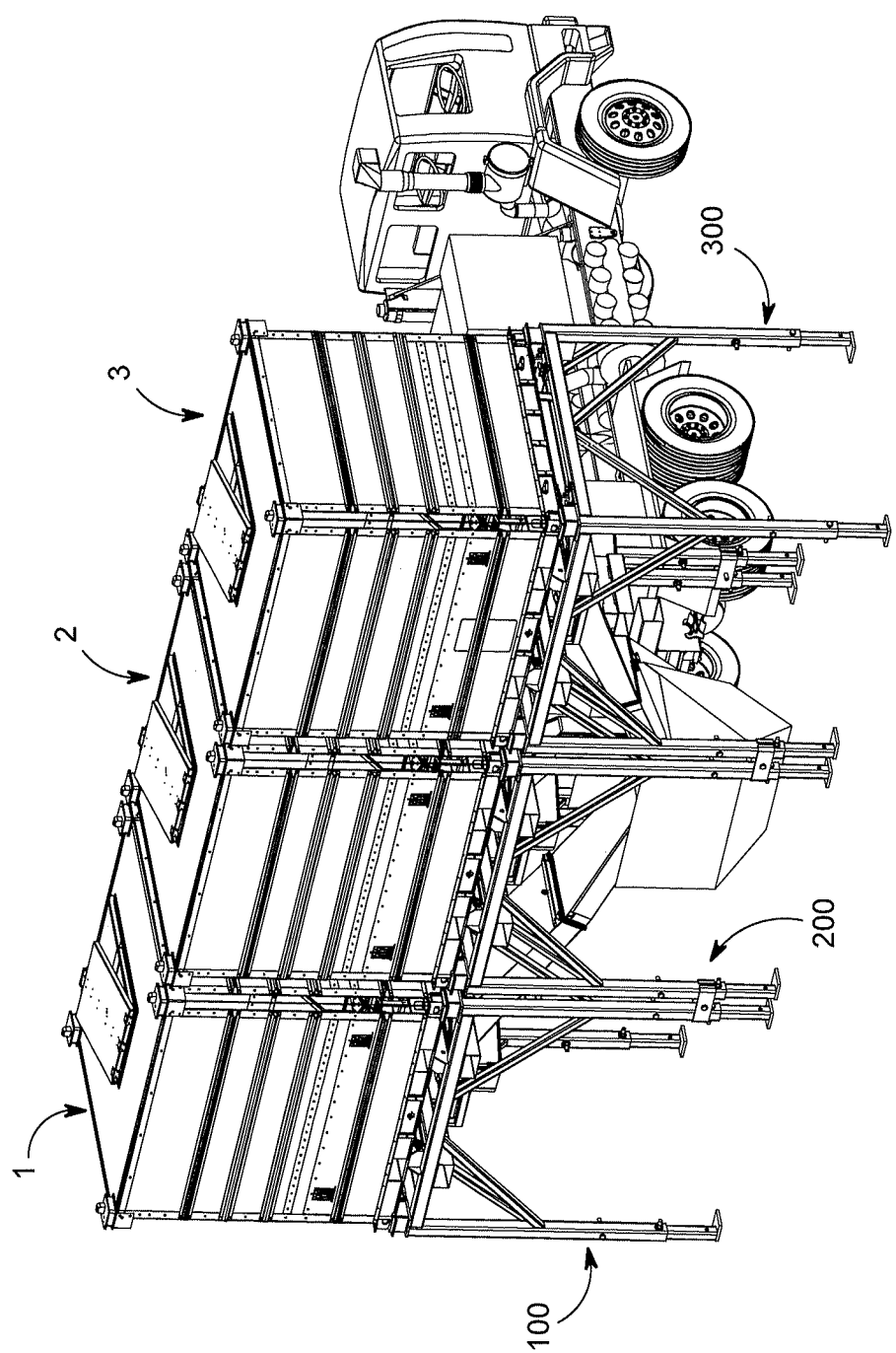
FIG. 19 is a rear perspective view of the three bulk material shipping container unloaders of FIG. 1, shown respectively supporting three bulk material shipping containers, and showing a material receiving vehicle positioned partially under the middle loader to receive unloaded materials from the three bulk material shipping containers through the three bulk material shipping container unloaders.

The three example bulk material shipping container unloaders 2000, 3000, and 4000 are shown respectively supporting three of the same or identical bulk material shipping containers 20, 30, and 40 in FIGS. 20 to 28. It should be appreciated that the unloaders 2000, 3000, and 4000 are each configured to support a shipping container that includes a compartment having a bottom portion with a selectively openable and closeable material unloading assembly, and specifically where: (i) such material unloading assembly includes a gate or closure member with a downwardly extending handle or engagement member; and (ii) the gate is movable or slidable from a closed position to a plurality of different partially open positions, and then to a fully open position, and then back to the closed position. The unloaders 2000, 3000, and 4000 are configured to operate individually and together to open and close the respective gates of the respective material unloading assemblies of the containers (such as containers 20, 30, and 40) respectively positioned on the unloaders 2000, 3000, and 4000 and direct loose materials (such as sand) stored in such containers to a common material receiver (such as a material blender) positioned at a retrieval location under the centrally positioned unloader 3000. It should be appreciated that the material receiver can be stationary or movable, and can be a movable vehicle such as shown in FIGS. 17, 18, and 19.

More specifically, the illustrated example bulk material shipping container unloader 2000 generally includes: (a) a supporter 2100; (b) a pallet receiver 2300 connected to and supported by the supporter; (c) a first material director 2500 connected to and supported by the pallet receiver; (d) an automatic bulk material container gate mover 2700 connected to and supported by the supporter 2100; and (e) one or more power, control, status indication, and lighting systems. As discussed in further detail below: (a) the supporter 2100 of the unloader 2100 is configured to support the pallet receiver 2300, the material director 2500, and the gate mover 2700; (b) the pallet receiver 2300 is configured to support and assist in weighing a bulk material shipping container 20; (c) the material director 2500 is configured to receive and direct loose materials exiting the bulk material shipping container to and through a material unloading port and chute; and (d) the gate mover 2700 is configured to open and close the gate of the material unloading assembly (not shown) of the container 20.

Likewise, the illustrated example bulk material shipping container unloader 3000 generally includes: (a) a supporter 3100; (b) a pallet receiver 3300 connected to and supported by the supporter; (c) a second material director 3500 connected to and supported by the pallet receiver; (d) an automatic bulk material container gate mover 3700 connected to and supported by the supporter 3100; and (e) one or more power, control, status indication, and lighting systems.

Likewise, the illustrated example bulk material shipping container unloader 4000 generally includes: (a) a supporter 4100; (b) a pallet receiver 4300 connected to and supported by the supporter; (c) a third material director 4500 connected to and supported by the pallet receiver; (d) an automatic bulk material container gate mover 4700 connected to and supported by the supporter 4100; and (e) one or more power, control, status indication, and lighting systems.

It should be appreciated that in this example embodiment, these three illustrated example bulk material shipping container unloaders 2000, 3000, and 4000 are substantially similar except that they include certain different components such as differently configured material directors. For brevity, only the supporter, the pallet receiver, and the automatic bulk material container gate mover of the unloader 2000 are primarily described in detail herein; and it should be appreciated that such descriptions also apply to the various corresponding components of the unloaders 3000 and 4000 that are substantially similarly configured (except for parts of the material directors) in this illustrated example embodiment.

The Supporter

In this illustrated example embodiment, the supporter 2100 of the unloader 2000 is configured to support the pallet receiver 2300, the automatic bulk material container gate mover 2700, and a bulk material shipping container, such as the bulk material shipping container 20 shown in FIGS. 20 to 28. The supporter 2100 is also configured to rest on and be supported by dual and single leg stands of the rack 5000 (as further described below) so that the unloader 2000 is raised to a suitable level or height above the rack 5000. Therefore, materials that exit the container 20 can move through the material director and into the material blender (as generally shown in FIGS. 17, 18, and 19).

More specifically, as best shown in FIGS. 31A to 31I, in this illustrated example embodiment, the supporter 2100 of the unloader 2000 includes: (a) legs 2102, 2104, 2106, and 2108; (b) leg stabilizers or braces 2110, 2112, 2114, 2116, 2118, 2120, 2122, and 2124 integrally connected to the legs 2102, 2104, 2106, and 2108, respectively, (and also to various components of the pallet receiver 2300); (c) bumpers or spacers 2126, 2128, 2130, and 2132 integrally connected to the legs 2102, 2104, 2106, and 2108, respectively; (d) locking blocks 2134, 2136, 2138, and 2140 integrally connected to the legs 2102, 2104, 2106, and 2108, respectively; (e) at least one leg securing assembly 2142 connected to and supported by a locking block; and (f) an operation status light supporting assembly 2144 connected to and supported by the leg 2104.

In this illustrated example embodiment, the supporter 2100 is not expandable or movable from a retracted position to one or more expanded positions. However, it should be appreciated that the supporter 2110 can be expandable in alternative embodiments of the present disclosure.

The legs 2102, 2104, 2106, and 2108 are configured to support the various other components of the unloader 2000 and a container positioned on the unloader 2000. In this illustrated example embodiment, the legs 2102, 2104, 2106, and 2108 are also configured rest on and be supported by various components of a rack such as rack 5000 shown in FIGS. 20 to 28. For example, in this illustrated example embodiment, the legs 2102, 2104, 2106, and 2108 are each configured to rest on and be supported by single or dual leg stands that enable the unloader 2000 to stand upright on the rack 5000, as show in FIGS. 20 to 28 and as further described below. The legs 2102, 2104, 2106, and 2108 are also each configured to support various components of the unloader 2000 and the pallet of the container 20, as also further described below. It should be appreciated that other suitably configured legs can be employed in accordance with the present disclosure.

The leg stabilizers or braces 2110, 2112, 2114, 2116, 2118, 2120, 2122, and 2124 are configured to or co-act to support, strengthen, stabilize, and brace the legs 2102, 2104, 2106, and 2108 that extend in the upright positions. It should be appreciated that other suitably configured leg stabilizers or braces can be employed in accordance with the present disclosure. In this illustrated example embodiment and best shown in FIGS. 31A to 31C: (a) one end of the leg stabilizer 2110 is integrally connected to the leg 2102 and an opposing end is integrally connected to a pallet support base 2302 and a forklift tine receiver 2334; (b) one end of the leg stabilizer 2112 is integrally connected to the leg 2110 and an opposing end is integrally connected to a pallet support base 2304; (c) one end of the leg stabilizer 2114 is integrally connected to the leg 2104 and an opposing end is integrally connected to a pallet support base 2304; (d) one end of the leg stabilizer 2116 is integrally connected to the leg 2104 and an opposing end is integrally connected to a pallet support base 2306; (e) one end of the leg stabilizer 2118 is integrally connected to the leg 2106 and an opposing end is integrally connected to a pallet support base 2306; (f) one end of the leg stabilizer 2120 is integrally connected to the leg 2106 and an opposing end is integrally connected to a pallet support base 2308; (g) one end of the leg stabilizer 2122 is integrally connected to the leg 2108 and an opposing end is integrally connected to a pallet support base 2308; and (h) one end of the leg stabilizer 2124 is integrally connected to the leg 2108 and an opposing end is integrally connected to a pallet support base 2302 and the forklift tine receiver 2336. The pallet support bases 2302, 2304, 2306, and 2308 and the forklift tine receivers 2334 and 2336 of the pallet receiver 2300 are further described below.

Figure 31A:
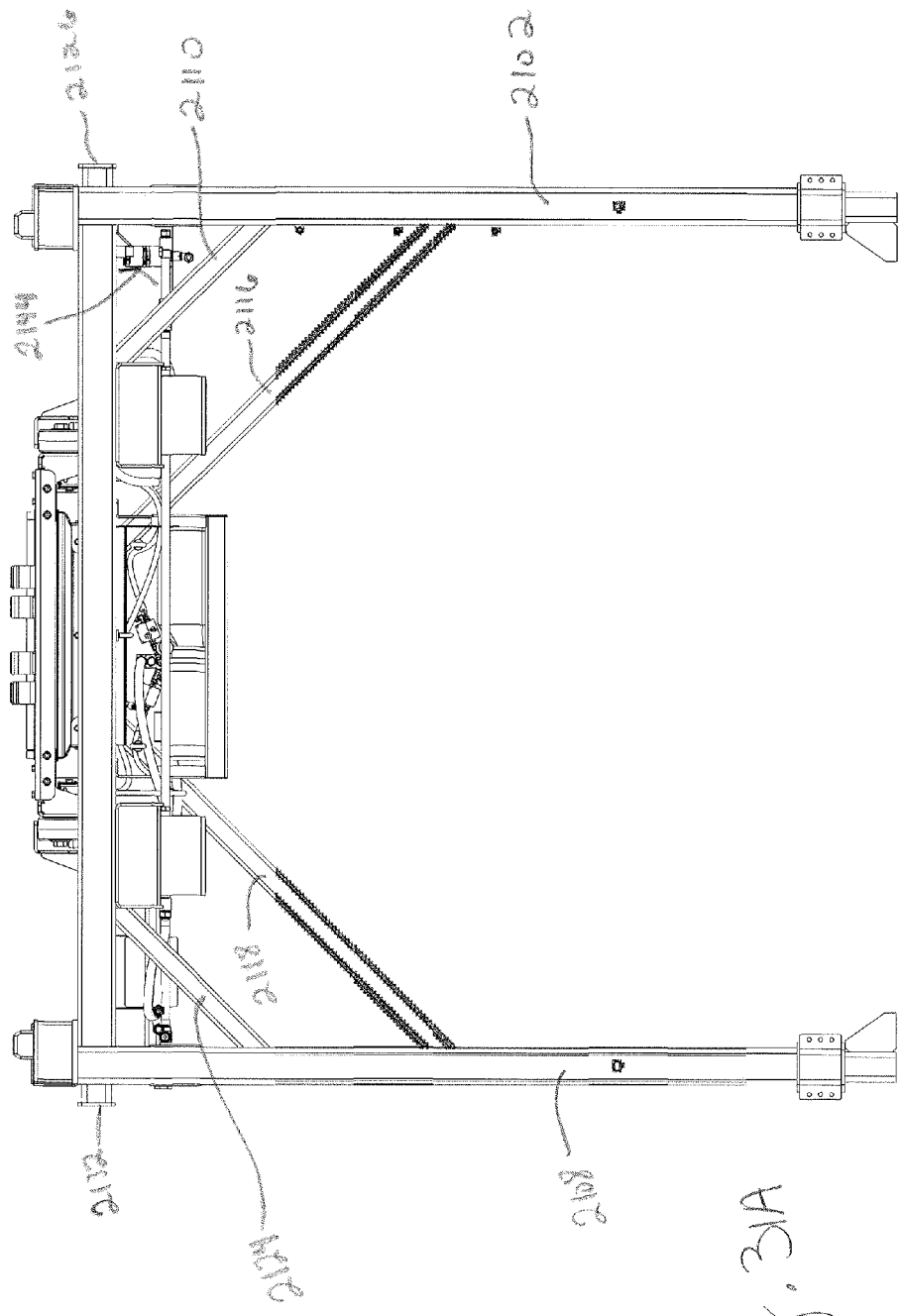
FIG. 31A is a front view of the unloader of FIG. 29, showing the supporter, the pallet receiver connected to and supported by the supporter, and the automatic bulk material container gate mover connected to and supported by the pallet receiver of the unloader, and partially showing dual leg stands and single leg stands of the rack supporting the unloader.

The bumpers or spacers 2126, 2128, 2130, and 2132 of the unloader 2000 are configured to enable adjacent or side by side unloaders to engage each other and to be suitably spaced apart from each other at a desired or certain distance. More specifically, each bumper of an unloader is configured to engage an opposing bumper of an adjacent unloader. For example, as shown in FIG. 28, the bumper 2132 of the unloader 2000 engages an opposing bumper 3126 of the unloader 3000. In this illustrated example embodiment and as best shown in FIGS. 31A, 31B, and 31C: (a) bumper 2126 is integrally connected to, supported by, and extends outwardly from the leg 2102; (b) bumper 2128 is integrally connected to, supported by, and extends outwardly from the leg 2104; (c) bumper 2130 is integrally connected to, supported by, and extends outwardly from the leg 2106 and toward the unloader 3000; and (d) bumper 2132 is integrally connected to, supported by, and extends outwardly from the leg 2108 and toward the unloader 3000. In this illustrated example embodiment, each bumper need not be adjacent to a bumper of an adjacent unloader (i.e., bumpers 2126 and 2128 are each not adjacent to bumpers of an adjacent unloader in this illustrated example embodiment). It should be appreciated that the bumpers 2126, 2128, 2130, and 2132 are structurally substantially similar in this illustrated example embodiment. Thus, for brevity, only the bumper 2126 is further described in more detail.

In this illustrated example embodiment and as shown in FIG. 31C, the example bumper 2126 includes a body 2126a and a lip 2126b. One end of the body 2126a is integrally connected to the leg 2102 as shown in FIG. 31C. The lip 2126b is integrally connected to an opposing end of the body 2126a. The lip of one bumper is configured to engage an opposing lip of an opposing bumper of an opposing unloader, as shown in FIG. 28.

The locking blocks of each unloader are configured to enable or facilitate two adjacent unloaders to be locked together or to each other. For example, the locking blocks 2134, 2136, 2138, and 2140 of the unloader 2000 are each configured to enable unloader 2000 to be locked to an adjacent unloader such as unloader 3000. In this illustrated example embodiment, a leg securing assembly, such as the leg securing assembly 2142m is employed to secure two adjacent locking blocks together. More specifically, in this illustrated example embodiment and as best shown in FIGS. 30A, 30B, and 30C: (a) locking block 2134 is integrally connected to, supported by, and extends inwardly from the leg 2102; (b) locking block 2136 is integrally connected to, supported by, and extends inwardly from the leg 2104; (c) locking block 2138 is integrally connected to, supported by, and extends inwardly from the leg 2106; and (d) locking block 2140 is integrally connected to, supported by, and extends inwardly from the leg 2108. It should be appreciated that the locking blocks 2134, 2136, 2138, and 2140 are substantially similar in this illustrated example embodiment. Thus, for brevity, only locking block 2138 is further described in more detail.

Figure 31D:
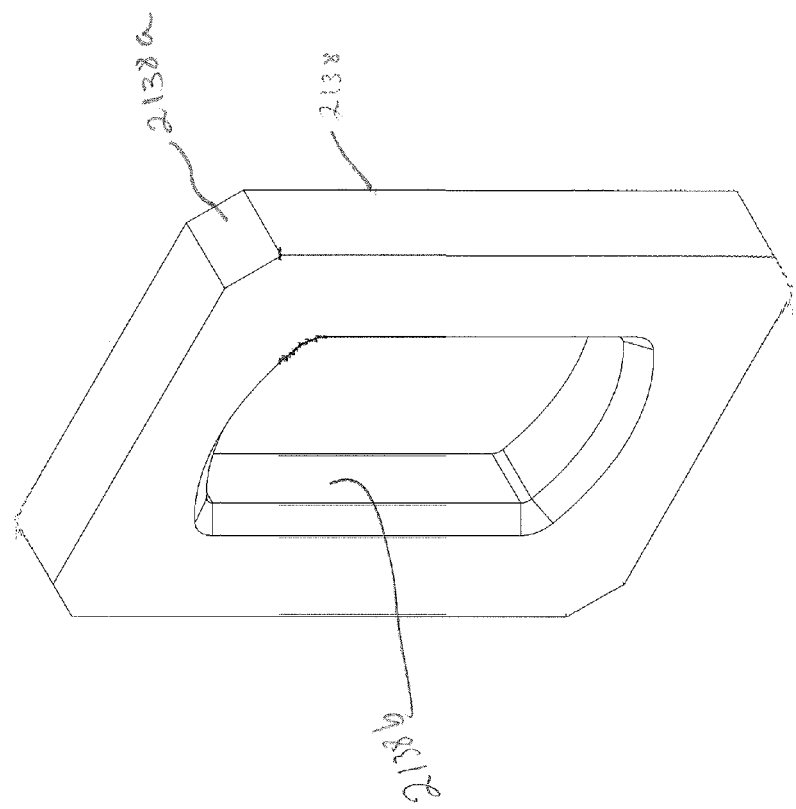
FIG. 31D is an enlarged perspective view of a locking block of the unloader of FIG. 29.

As shown in FIG. 31D, this example locking block 2138 includes a generally tubular body 2138a. An end of the body 2138a is integrally connected to leg 2106 of the supporter 2000 as shown in FIG. 31B. The body 2138a includes an inner surface 2138b that defines an opening. This opening is configured to partially receive a leg securing assembly, such as the leg securing assembly 2142 that is shown in FIG. 31E and further described in more detail below.

This example leg securing assembly 2142 is configured to securely connect adjacent legs of adjacent unloaders, such as one leg of the unloader 2000 and one leg of the unloader 3000. More specifically, the leg securing assembly 2142 is configured to engage a locking block of an unloader and an opposing locking block of an adjacent unloader. For example, as best shown in FIG. 31G, the leg securing assembly 2142 engages the locking block 2138 of the unloader 2000 and an unloader block 3138 of the unloader 3000 to securely connect the leg 2106 of the unloader 2000 and the leg 3104 of the unloader 3000.

As best shown in FIGS. 31E and 31F, the leg securing assembly 2142 of this illustrated embodiment includes: (a) a first arm 2142a; (b) a second arm 2142b; and (b) a first screw 2142c. It should be appreciated that the first arm 2142 and the second arm 2142b of the leg securing assembly 2142 are structurally substantially similar in this illustrated example embodiment. Thus, for brevity, only the first arm 2142a is further described in more detail.

In this illustrated example embodiment, the first arm 2142a includes a body (not labeled). The body includes an inner surface (not labeled), which further includes helical threads (not labeled) that extend from the surface and are configured to threadably engage helical threads (not labeled) of the first screw 2142c. The inner surface defines an opening that is configured to receive one end of the first screw 2142c. The opposing end of the first screw 2142c is configured to be inserted into an opening of the second arm 2142b in a similar manner. The first screw 2142c is thus configured to be rotatable in the opening of the first arm 2142a and the second arm 2142b.

As best shown in FIGS. 31E, 31F, and 31G, the first arm 2142a is configured to engage the inner surface 2138b of the locking block 2138b. The second arm 2142b is configured to engage an opposing locking block in a similar manner. When the first screw 2142c is rotated, the first arm 2142a and the second arm 2142b move closer to each other. Consequently, each arm 2142a and 2142b engages the respective inner surface of the locking block it engages with a greater force. This configuration enables the leg securing assembly 2142 to securely connect the leg of one unloader and an opposing leg of an adjacent unloader. FIG. 31G illustrates the leg securing assembly 2142 connecting the leg 2106 of the unloader and the leg 3106 of the unloader 3000. The first arm 2142a of the leg securing assembly engages the locking block 2138 and the second arm 2142b engages the locking block 3138. It should be appreciated that the leg securing assembly 2142 of the present disclosure can be connected to a member of the unloader 2000 via a chain or another suitable connection device.

The operation status light supporting assembly 2144 is configured to support an operation status light, as further described below. In this illustrated example embodiment, the operation status light supporting assembly 2144 is integrally connected to the supporter 2100 and, specifically the leg 2104. It should be appreciated that the operation status light supporting assembly 2144 can be connected to a different leg or another suitable component of the unloader 2000 in accordance with the present disclosure.

Figure 31I:
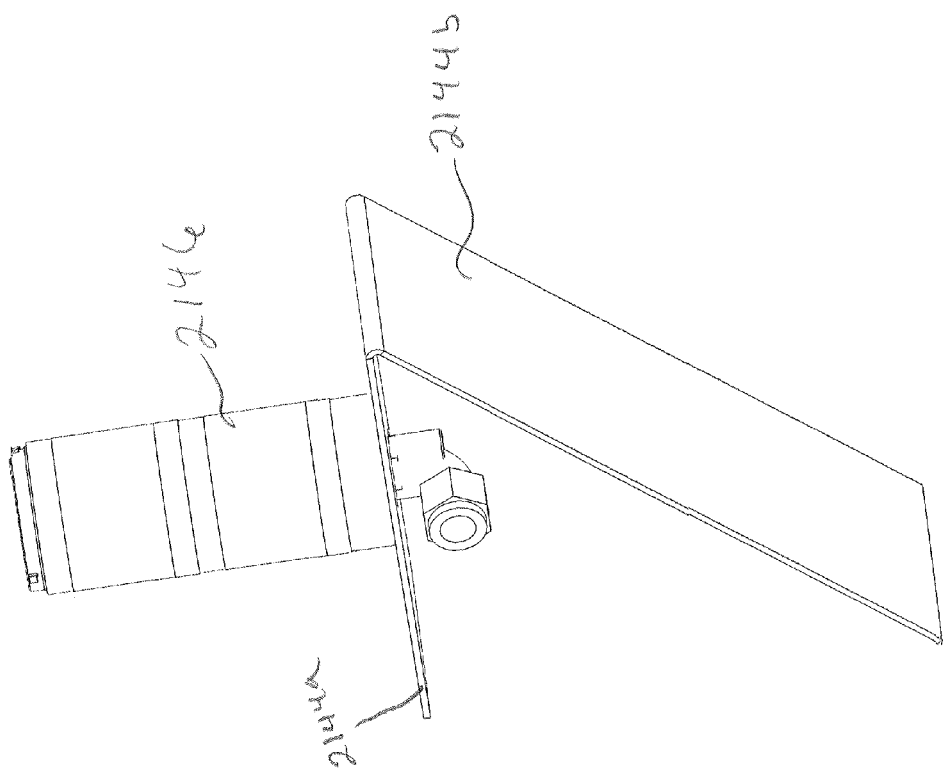
FIG. 31I is an enlarged perspective view of the first bracket and second bracket of the operation status light supporting assembly of FIG. 31H supporting an operation status light of the unloader.
Figure 336:
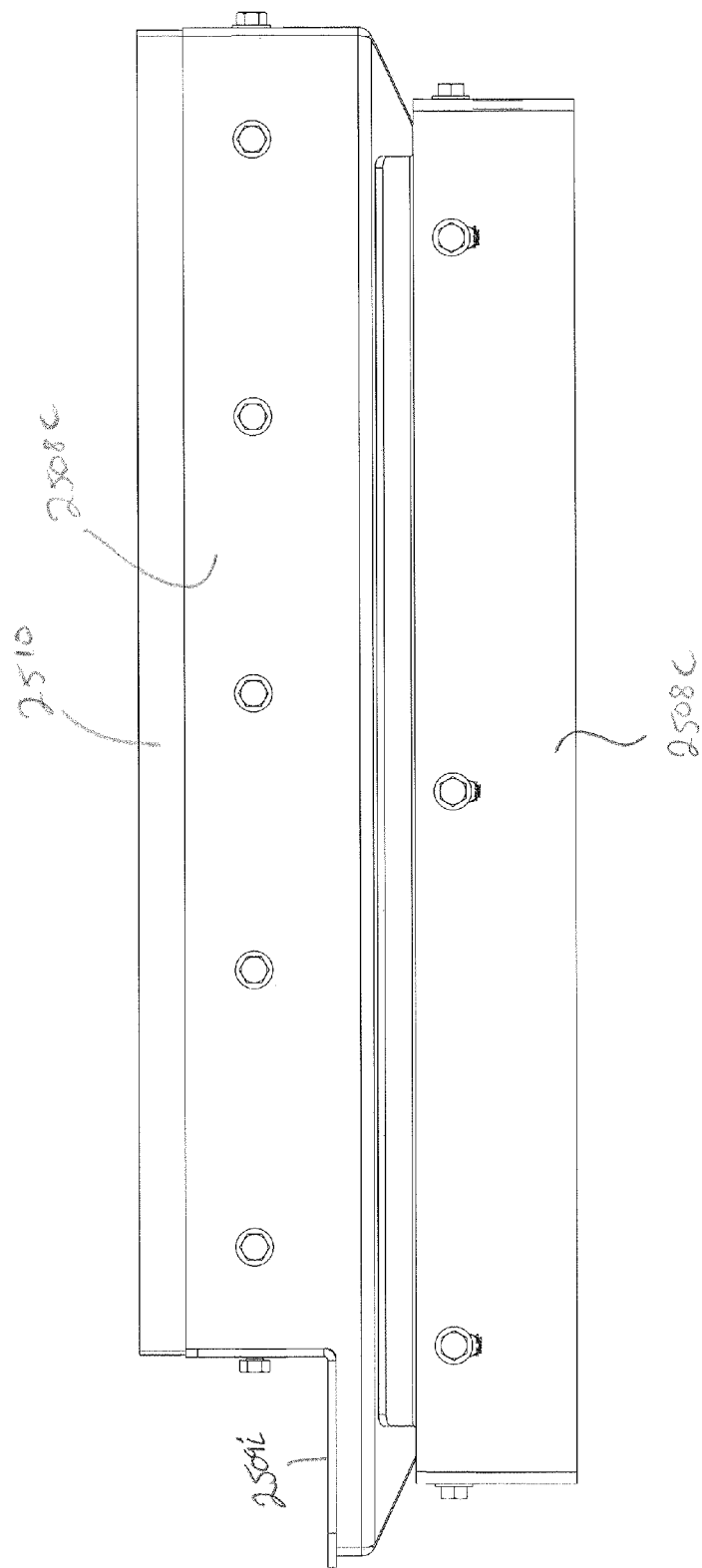

More specifically, as shown in FIGS. 31H and 31I, the operation status light supporting assembly 2144 includes: (a) a first bracket 2144a integrally connected to and extending horizontally from the leg 2104; and (b) a second bracket 2144b, wherein an end of the second bracket 2144b is integrally connected to the first bracket 2144a and an opposing end of the second bracket 2144b is integrally connected to and extends from the leg 2104 at a suitable angle. The first bracket 2144a is configured to support an operation status light, as further described below.

Although not shown, the supporter 2100 can include suitable feet each configured to be connectable to the legs 2102, 2104, 2106, and 2108 to support the legs 2102, 2104, 2106, and 2108 in an upright position in accordance with the present disclosure.

It should be appreciated that in this illustrated example embodiment, the legs 2102, 2104, 2106, and 2108; the leg stabilizers or braces 2110, 2112, 2114, 2116, 2118, 2120, 2122, and 2124; the bumpers 2126, 2128, 2130, and 2132; the locking blocks 2134, 2136, 2138, and 2140; and the operation status light supporting assembly are each made of a suitable material, such as steel. It should further be appreciated that each of the leg securing assemblies such as assembly 2142 can be made of various suitable materials.

The Pallet Receiver

In this illustrated example embodiment, the pallet receiver 2300 is configured to support a container, such as the container 20 shown in FIGS. 20 to 28. The pallet receiver 2300 is also configured to support the material director 2500 and the automatic bulk material gate mover 2700.

In this illustrated example embodiment and shown in FIGS. 32A, 32B, 32C, and 32D, the pallet receiver 2300 of the unloader 2000 includes: (a) pallet support bases 2302, 2304, 2306, and 2308 integrally connected to the legs 2102, 2104, 2106, and 2108, respectively; (b) primary pallet support base braces (or sometimes referred to herein as primary pallet support base stabilizers) 2310, 2312, 2314, and 2316 integrally connected to the pallet support bases 2302, 2304, 2306, and 2308, respectively, and a track assembly 2702 (described below) of the automatic bulk material container gate mover 2700; (c) secondary pallet support base braces (that are sometimes referred to herein as secondary pallet support base stabilizers) 2318 and 2320 integrally connected to the pallet support bases 2302 and 2306, respectively; (d) pallet support base brace connectors (that are sometimes referred to herein as pallet support base stabilizer connectors) 2322 and 2324 integrally connected to the secondary pallet support base stabilizers 2318 and 2320, respectively; (e) corner nesting support assemblies 2326, 2328, 2330, and 2332 integrally connected to and supported by the pallet support bases 2302, 2304, 2306, and 2308, respectively, and the legs 2102, 2104, 2106, and 2108, respectively; (f) forklift tine receivers 2334 and 2336 integrally connected to the pallet support bases 2302, and 2306, respectively; (g) primary weld-on d-rings 2338 and 2340 integrally connected to the pallet support bases 2304 and 2308, respectively; (h) secondary weld-on d-rings 2344 (one is not shown and therefore not labeled) integrally connected to and supported by the pallet support bases 2304 and 2308, respectively; and (i) a container weight measuring system (not labeled) connected to and supported by the pallet support bases 2302, 2304, 2306, and 2308.

More specifically, as best shown in FIG. 32A, the pallet support bases 2302, 2304, 2306, and 2308; the primary pallet support base stabilizers 2310, 2312, 2314, and 2316; the secondary pallet support base stabilizers 2318 and 2320; and the pallet support base stabilizer connectors 2322 and 2324 are each configured to co-act to support the pallet of the container 20.

In this illustrated example embodiment and as best shown in FIG. 32A, (a) the pallet support base 2302 is integrally connected to and extends from the leg 2102 and the leg 2108; (b) the pallet support base 2306 is spaced apart from the pallet support base 2302 and is integrally connected to and extends from the leg 2104 and the leg 2106; (c) the pallet support base 2304 is integrally connected to and extends from the leg 2102 and the leg 2104; and (d) the pallet support base 2308 is spaced apart from the pallet support base 2304 and is integrally connected to and extends from the leg 2106 and the leg 2108.

In this illustrated example embodiment as best shown in FIGS. 28 and 32A: (a) one end of the primary support base stabilizer 2310 is integrally connected to the pallet support base 2304 and an opposing end is integrally connected to the pallet support base 2302 and a bottom surface of a first track 2706; (b) one end of the primary support base stabilizer 2312 is integrally connected to the pallet support base 2304 and an opposing end is integrally connected to the pallet support base 2306 and a bottom surface of the first track 2706; (c) one end of the primary support base stabilizer 2314 is integrally connected to the pallet support base 2308 and an opposing end is integrally connected to the pallet support base 2306 and a bottom surface of a second track 2708; and (d) one end of the primary support base stabilizer 2316 is integrally connected to the pallet support base 2308 and an opposing end is integrally connected to the pallet support base 2302 and a bottom surface of the second track 2708. The first track 2706 and the second track 2708 are each a component of the track assembly 2702 of the automatic bulk material container gate mover 2700 and are each further described below.

In this illustrated example embodiment and as best shown in FIG. 32A: (a) the secondary pallet support base stabilizer 2318 is integrally connected to and extends from the pallet support base 2302 and the pallet support base 2306; and (b) the secondary pallet support base stabilizer 2320 is spaced apart from the secondary pallet support base stabilizer 2318 and is integrally connected to and extends from the pallet support base 2302 and the pallet support base 2306.

In this illustrated example embodiment and as best shown in FIG. 32A: (a) the pallet support base stabilizer connector 2322 is integrally connected to and extends from the secondary pallet support base stabilizer 2318 and the secondary pallet support base stabilizer 2320; and (b) the pallet support base stabilizer connector 2324 is spaced apart from the pallet support base stabilizer connector 2322 and is integrally connected to and extends from the secondary pallet support base stabilizer 2318 and the secondary pallet support base stabilizer 2320.

The corner nesting support assemblies 2326, 2328, 2330, and 2332 are each configured to engage and assist in correctly aligning the pallet of the container 20 on the unloader 2000. It should be appreciated that the corner nesting support assemblies 2326, 2328, 2330, and 2332 are substantially similar in this illustrated example embodiment. Thus, for brevity, only the corner nesting support assembly 2326 is further described in detail.

More specifically, as best shown in FIG. 32A, the corner nesting support assembly 2326 includes: (a) a horizontally extending base 2326a integrally connected to and supported by the pallet support bases 2302 and 2304 and the leg 2102; (b) a vertically extending tubular body 2326b integrally connected to and extending upwardly from the base 2326a; (c) a generally rectangular horizontally extending cap 2326c integrally connected to the top of the horizontally extending tubular body 2326b; and (d) a vertically extending corner pin 2326d integrally connected to and extending upwardly from the cap 2326c. In this illustrated example embodiment, the horizontally extending base 2326a is substantially similar to the cap 2326c and includes a generally rectangular body having a top surface, a bottom surface, a front edge, a rear edge, a first side edge, and a second side edge. The tubular body 2326b includes four integrally connected upwardly extending walls, each having an upper edge, a bottom edge, an inner surface, and an outer surface. The cap 2326c is integrally connected to each upper edge of the upwardly extending walls of the tubular body 2326b. The corner pin 2326d in this illustrated example embodiment is a solid piece of steel configured to partially engage a corner of the pallet of the container 20 for alignment purposes.

As described above, the corner nesting support assemblies 2326, 2328, 2330, and 2332 are substantially similar in this illustrated example embodiment. Therefore, a horizontally extending base of the corner nesting support assembly 2328 is integrally connected to and supported by the pallet support bases 2304 and 2306 and the leg 2104; a horizontally extending base of the corner nesting support assembly 2330 is integrally connected to and supported by the pallet support bases 2306 and 2308 and the leg 2106; and a horizontally extending base of the corner nesting support assembly 2332 is integrally connected to and supported by the pallet support bases 2308 and 2302 and the leg 2108.

The forklift tine receivers 2334 and 2336 are each configured to receive a fork of the forklift to enable a forklift to lift the unloader 2000 from a first position to a second position (such as from the bed of a truck to a sub-grade or onto the dual and single leg stands of the rack 5000 (as further described below)). It should be appreciated that the forklift tine receivers 2334 and 2336 are substantially similar in this illustrated example embodiment. Thus, for brevity, only the forklift tine receiver 2334 is further described in detail.

As best shown in FIG. 32A, the forklift tine receiver 2334 includes a tubular body (not labeled) having four integrally connected horizontally extending walls (each not labeled). Each wall includes an inner surface. The inner surfaces of the four walls define a forklift tine receiving channel configured to receive a fork of the forklift.

The forklift tine receiver 2334 also includes: (a) a first tine deflector (not shown) that is integrally connected and extends downwardly from a bottom wall of one end of the forklift tine receiver 2334; and (b) a second tine deflector (not shown) that is spaced apart from the first tine deflector and integrally connected to the bottom wall at the opposite end of the forklift tine receiver 2334. The first and second tine deflectors are each configured to be engaged by a fork or tine of a forklift to deflect the fork or tine of the forklift and prevent the fork or time of the forklift from engaging and/or damaging other components of the unloader 2000.

As best shown in FIG. 32A, in this illustrated example embodiment, the forklift tine receiver 2334 is integrally connected to a bottom surface of the pallet support base 2302, the end of the leg stabilizer 2310, a bottom surface of the pallet support base 2306, and the end of the leg stabilizer 2312. The forklift tine receiver 2336 is spaced apart from the forklift tine receiver 2334 and is integrally connected to the bottom surface of the pallet support base 2302, the end of the leg stabilizer 2316, the bottom surface of the pallet support base 2306, and the end of the leg stabilizer 2314.

The primary weld-on d-rings 2338 and 2340 are each configured to enable a connecting apparatus (such as a cord or line) to be connected to the primary weld-on d-ring and a portion of the material director 2500 to assist in stabilizing the material director 2500. In this illustrated example embodiment as shown in FIG. 31C, the primary weld-on d-ring 2338 is integrally connected to and extends downwardly from the pallet support base 2304. The primary weld-on d-ring 2340 is integrally connected to and extends downwardly from the bottom of the pallet support base 2308, as best shown in FIG. 31B.

The secondary weld-on d-rings 2344 (one not shown and thus not labeled) are each configured to enable a connecting apparatus (such as a cord or line) to be connected to the secondary weld on d-ring and to another structure to assist in stabilizing or maintaining the position of the unloader 2000. In this illustrated example embodiment as shown in FIG. 32A, one secondary weld-on d-ring is integrally connected to and extends inwardly from the pallet support base 2304. Another secondary weld-on d-ring 2344 is integrally connected to and extends inwardly from the pallet support base 2308.

The container weight measuring system is configured to support the pallet of a container such as the container 20 (and thus the entire weight of the container 20 including its contents). The container weight measuring system is also configured to determine the entire weight of the container 20 and its contents. As shown in FIG. 32A, the container weight measuring system includes weight measuring assemblies 2346, 2348, 2350, and 2352, a first bridge 2354, and a second bridge 2356.

The container weight measuring system also includes one or more controllers (including one or more processors) electrically connected to each of the weight measuring assemblies 2346, 2348, 2350, and 2352. The weight measuring assemblies 2346, 2348, 2350, and 2352 and the controller(s) (not shown) are configured to co-act to determine the weight of the container 20 when the container 20 is placed on the pallet receiver 2300 of the unloader 2000. The weight of the container 20 can be determined at various different points in time such as when the container 20 is filled with loose materials, as the loose materials are released from the container 20, and when the container 20 is almost or completely empty. It should be appreciated that the weight measuring assemblies 2346, 2348, 2350, and 2352 are substantially similar (except for their location) in this illustrated example embodiment. Thus, for brevity, only the weight measuring assembly 2346 is further described in more detail.

As best shown in FIG. 32B, the weight measuring assembly 2346 includes: (a) a housing 2346a integrally connected to and supported by the pallet support base 2304; and (b) a first load cell 2346b suitably connected to and supported by the housing 2346a and electrically connected to the controller (not shown).

As best shown in FIG. 32B, the first housing 2346a is configured to support the first load cell 2346b. The first housing 2346a includes: (a) a horizontally planar base 2346c integrally connected to and supported by the pallet support base 2304; (b) a first horizontally extending wall 2346d integrally connected to and extending upwardly from the base 2346c; (c) a second horizontally extending wall (not shown) spaced apart from the first wall 2346d and integrally connected to and extending upwardly from the base 2346c; (d) an L-shaped bracket 2346e integrally connected to the pallet support base 2304 and the second horizontally extending wall; and (e) a container guiding bracket 2346f that includes a base 2346g, a first upwardly extending wall 2346h, a second upwardly extending wall 2346i, and a third upwardly extending wall 2346j. The walls 2346h, 2346i, and 2346j are each configured to engage a portion of a first track and the container 20 when the container 20 is positioned or rests on the unloader 2000.

It should be appreciated that in this illustrated example embodiment, the base 2346c of the first housing 2346a is integrally connected to the base 2326a of the corner nesting support assembly 2326 such that a top surface of the base 2346c of the first housing 2346a is continuous with the top surface of the base 2326a of the corner nesting support assembly 2326.

The first load cell 2346b is configured to partially support the container 20. The first load cell 2346b is also configured to convert the portion of the weight of the container that it partially supports to an electrical signal. This electrical signal, along with other electrical signals generated by the other weight measuring assemblies 2348, 2350, and 2352, respectively, are further analyzed or used by the processor of the controller to determine the weight of the container 20.

As shown in FIG. 32C, the first load cell 2346b includes a body 2346k and a pivotable horizontally planar bracket 2346l pivotally connected to the body 2346k via an upwardly extending wall (not labeled). The bracket 2346l includes a body 2346k that defines a plurality of fastener openings each configured to receive a suitable fastener to connect a first or second bridge to the bracket 2346l, as further described below. The body 2346k defines a plurality of fastener openings each configured to receive a suitable fastener to connect the body 2346k to the base 2346c of the housing 2346.

The load cells of the weight measuring assemblies 2346, 2348, 2350, and 2352 are commercially available (such as from Rice Lake Weighing Systems). It should be appreciated that in alternative example embodiments, the unloader can include a different number of weight measuring assemblies, housings, and/or load cells in accordance with the present disclosure.

As best shown in FIGS. 32A, 32B, and 32D, as mentioned above, the container weight measuring system includes: (a) the first bridge 2354; and (b) the second bridge 2356. In this illustrated example embodiment the first bridge 2354 and the second bridge 2356 are each configured to partially engage and support the pallet of the container 20. It should be appreciated that the first bridge 2354 and the second bridge 2356 are substantially similar in this illustrated example embodiment. Thus, for brevity, only the first bridge 2354 is further described below.

As best shown in FIG. 32D, the first bridge 2354 includes: (a) a horizontally planar top container engagement wall 2354a that defines a plurality of fastener openings each configured to receive a suitable fastener to connect the first bridge 2354a to the bracket 23461 of the first load cell 2346b and a bracket 23481 of a second load cell 2348b; (b) a first vertically extending wall 2354b integrally connected to and extending downwardly from the wall 2354a; and (c) a second vertically extending wall 2354c integrally connected to and extending downwardly from the wall 2354a.

It should be appreciated from the above, to determine the weight of the contents of the container 20 when the container 20 is placed on the unloader 2000, the processor of the weight measuring system analyzes the electrical signals generated by the load cells 2346b, 2348b, 2350b, and 2352b to determine the total weight of the container and its contents and then subtracts the known weight of the container to determine the weight of the contents of the container at any point in time. In this illustrated embodiment, the weight measuring system also subtracts the known weights of the first bridge 2354 and the second bridge 2356 for this calculation.

It should be appreciated that the first bridge 2354, the second bridge 2356, and the load cells of the weight measuring assemblies 2346, 2348, 2350, and 2352 co-act or work in unison to assist in determining the weight of the container and materials in the container.

It should further be appreciated that the first bridge 2354 and the second bridge 2356 are further configured to stabilize the container 20 when the container 20 is positioned on the pallet receiver 2300 of the unloader 2000.

It should be appreciated that in this illustrated example embodiment, the pallet support bases 2302, 2304, 2306, and 2308; the primary pallet support base braces 2310, 2312, 2314, and 2316; the secondary pallet support base braces 2318 and 2320; the pallet support base brace connectors 2322 and 2324; the corner nesting support assemblies 2326, 2328, 2330, and 2332; the forklift tine receivers 2334 and 2336; the primary weld-on d-rings 2338 and 2340; and the secondary weld-on d-rings 2344 (one is not shown and labeled) are each made of a suitable material, such as steel. It should further be appreciated that the housing of each load cell assembly of the present disclosure is made of a suitable metal material, such as steel. It should further be appreciated that the first bridge 2354 and the second bridge 2356 of the present disclosure are each made of a suitable material, such as aluminum.

The Material Director

In this illustrated example embodiment, the material director 2500 of the unloader 200 is configured to be connected to the pallet receiver 2300 so that the material 2500 extends downwardly and at an angle underneath the pallet receiver 2300. This enables the material director 2500 to direct loose materials from the container 20 to the material blender (as best shown FIGS. 17, 18, and 19). Likewise, the material director 4500 of the unloader 4000 is positioned underneath the pallet receiver 4300 and extends downwardly and at an angle from the pallet receiver 4500 so that the material director 4500 can direct loose materials from the container 40 to the material blender. The material director 3500 of the unloader 3000 extends downwardly substantially straight from the pallet receiver 3300 so that the material director 3500 can direct loose materials from the container 30 to the material blender.

It should be appreciated that in this illustrated example embodiment, the material directors 2500, 3500, and 4500 are configured in such a manner so that they co-act or cooperate with each other to direct loose materials from the containers that are positioned on the unloaders 2000, 3000, and 4000 to the material blender positioned underneath the pallet receiver 3300 of the unloader 3000 at a desired times (such as at the same time).

In this illustrated example embodiment, the unloader 2000 and the unloader 4000 each have similar or substantially similar material directors 2500 and 4500, respectively that are mirror images of each other. For brevity, only the material director 2500 is thus discussed in further detail. It should be appreciated that the material director 3500 is configured differently than the material directors 2500 and 4500. Thus, after the discussion regarding the material director 2500, a discussion regarding the material director 3500 is provided.

As shown in FIGS. 33A to 33O, in this illustrated example embodiment, the material director 2500 of the unloader 2000 includes: (a) a fixed chute section 2502 connected to and supported by the pallet support base stabilizer connectors 2322 and 2324 of the pallet supporter 2300; (b) a chute connector section 2504 hingedly connectable to the partially fixed chute section 2502 and connected to a movable and removable chute section 2506 via suitable fasteners; and (c) a movable and removable chute section 2506.

More specifically, the fixed chute section 2502 is configured to direct material that exits the gate assembly (not shown) of the container 20 on the unloader 2000. The fixed chute section 2502 is also configured to extend downwardly at an angle to and underneath the pallet receiver 2300 of the unloader 2000.

As best shown in FIGS. 33A to 33J, the fixed chute section 2502 includes: (a) a material directing opening assembly 2508 connected to and supported the pallet support base stabilizer connectors 2322 and 2324 of the pallet supporter 2300 (as best shown in FIGS. 28, 29 and 30); and (b) a shaft 2510 connected to the material directing opening assembly 2508 and the chute connector section 2504.

More specifically, as best shown in FIGS. 33C to 33I, the material directing opening assembly 2508 includes: (a) a first pallet receiver stabilizer connector bracket 2508a connected to the pallet receiver stabilizer connector 2322; (b) a second pallet receiver stabilizer connector bracket 2508b spaced apart from the first pallet receiver stabilizer connector bracket 2508a and integrally connected to the pallet receiver stabilizer connector 2324; (c) a first material directing bracket 2508c connected via suitable fasteners to the first pallet receiver stabilizer connector bracket 2508a; (d) a second material directing bracket 2508d spaced apart from the first material directing bracket 2508c and connected via suitable fasteners to the second pallet receiver stabilizer connector bracket 2508b; (e) a third material directing bracket 2508e integrally connected to the first material direction bracket 2508c and the second material direction bracket 2508d; and (f) a fourth material directing bracket 2508f spaced apart from the third material directing bracket 2508e and integrally connected to the first material direction bracket 2508c and the second material direction bracket 2508d.

As best shown in FIGS. 33C to 33I, the material directing opening assembly 2508 further includes: (a) a first S-shaped bracket 2508g connected via suitable fasteners to the first material directing bracket 2508c; (b) a second S-shaped bracket 2508h spaced apart from the first S-shaped bracket 2508g and connected via suitable fasteners to the second material directing bracket 2508d; (c) a third S-shaped bracket 2508i connected via suitable fasteners to an L-shaped bracket 2508j; and (d) a fourth S-shaped bracket 2508*k* spaced apart from the third S-shaped bracket 2508*i* and connected via suitable fasteners to the fourth material directing bracket 2508*f*.

More specifically, the first material directing bracket 2508*c* includes a material directing surface (not labeled); the second material directing bracket 2508*d* includes a material directing surface (not labeled); the third material directing bracket 2508*e* includes a material directing surface (not labeled); and the fourth material directing bracket 2508*f* includes a material directing surface (not labeled). The respective material directing surface of each material directing bracket is configured to be engaged by and direct loose materials (such as sand) that exit the gate assembly of the container 20 through the material directing opening assembly 2508 and the other members of the material director 2500, as further described below.

Additionally, an upwardly extending wall 2509*a* of the first S-shaped bracket 2508*g*, an upwardly extending wall 2509*b* of the first material directing bracket 2508*c*, an upwardly extending wall 2509*c* of the second S-shaped bracket 2508*h*, and upwardly extending wall 2509*d* of the second material directing bracket 2508*d*, an upwardly extending wall 2509*e* of the L-shaped bracket 2508*j*, an upwardly extending wall 2509*f* of the third material directing bracket 2508*e*, an upwardly extending wall 2509*g* of the fourth S-shaped bracket 2508*k*, and an upwardly extending wall 2509*h* of the fourth material directing bracket 2508*f* together define a contiguous channel. This channel is configured to receive one or more suitable compressible sealing strip(s) or gasket(s) 2510 (such as a foam material) that is/are positioned in this channel. When positioned in this channel, each sealing strip 2510 extends upwardly. Each sealing strip 2510 is configured to form a tight seal between the gate opening of the gate opening assembly of the container 20 and the material directing opening assembly 2508 of the material director 2500 so that loose materials that exit the gate assembly of the container 20 and move through the material directing opening assembly 2508 of the material director 2500 do not leak out from the material directing opening assembly.

As shown in FIGS. 33C, 33D, 33F, 33G, 33H, and 33I, the L-shaped bracket 2508*j* further includes a horizontally extending trolley access wall 2509*i* that is integrally connected to the upwardly extending wall 2509*e*. The trolley access wall 2509*i* and the upwardly extending wall 2509*e* define a trolley access area (not labeled) above the trolley access wall 2509*i* and adjacent to the upwardly extending wall 2509*e*. The trolley access area is configured to enable the gate mover assembly 2704, and particularly either the first trolley 2720 or the second trolley 2722, to be positioned in the trolley access area, and particularly adjacent to the upwardly extending wall 2509*e* of and above the trolley access wall 2509*i*, without the first trolley 2720 or the second trolley 2722 engaging and/or damaging any components of the material director 2500 when the gate mover assembly 2704 is in a resting position and the gate of the container 20 is in a fully closed position.

It should be appreciated that the fixed chute section 2502 can include a downwardly extending plate 2501 that is integrally connected to the first pallet receiver stabilizer connector bracket 2508*a*, as best shown in FIG. 33B. The downwardly extending plate 2501 is configured to provide the material director 2500, and particularly the material directing opening assembly 2508 with more structural integrity.

Figure 33C:
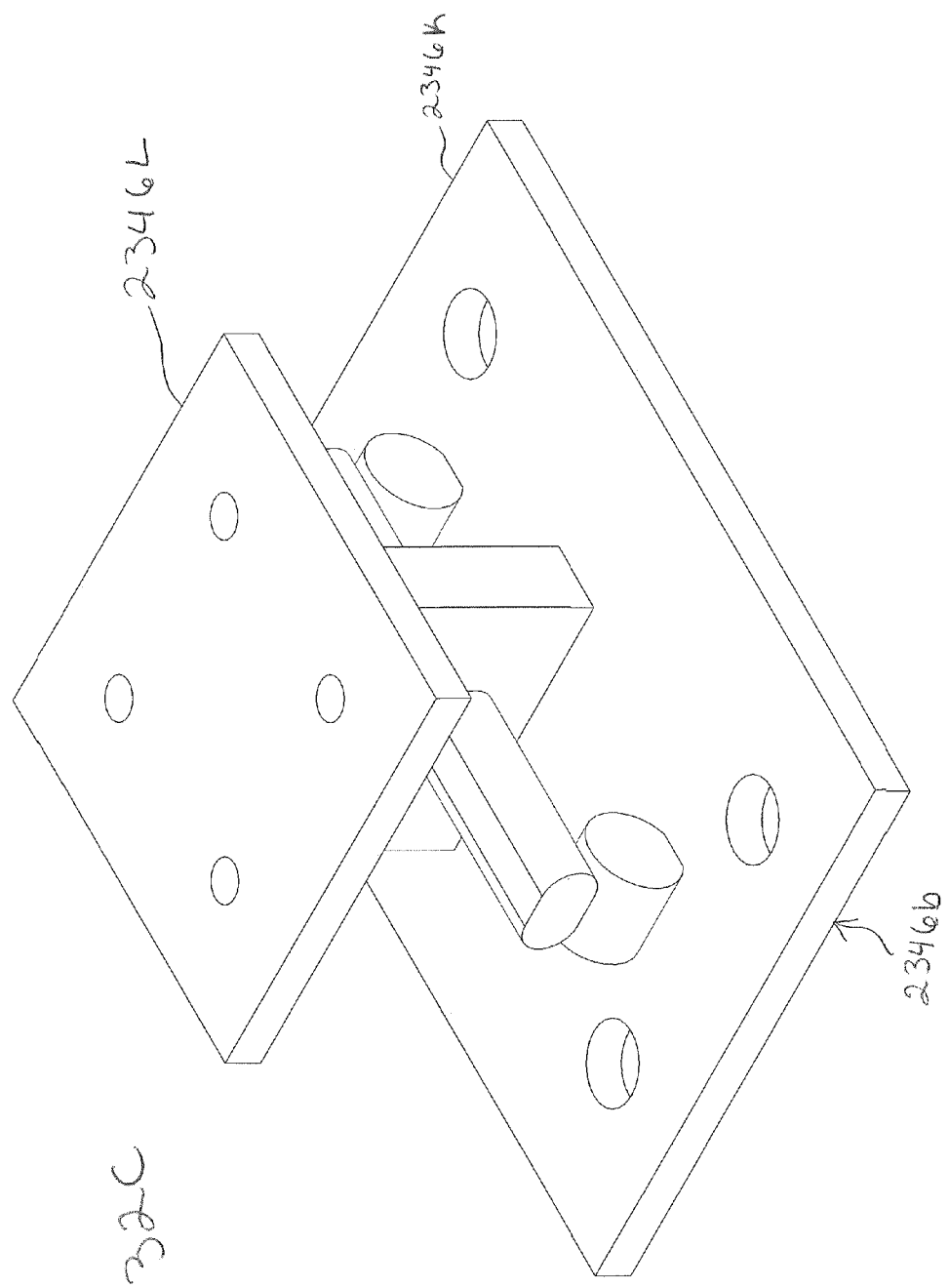
FIG. 33C is an enlarged exploded view of a material director opening assembly of the fixed chute section of the unloader of FIG. 29.
Figure 33J:
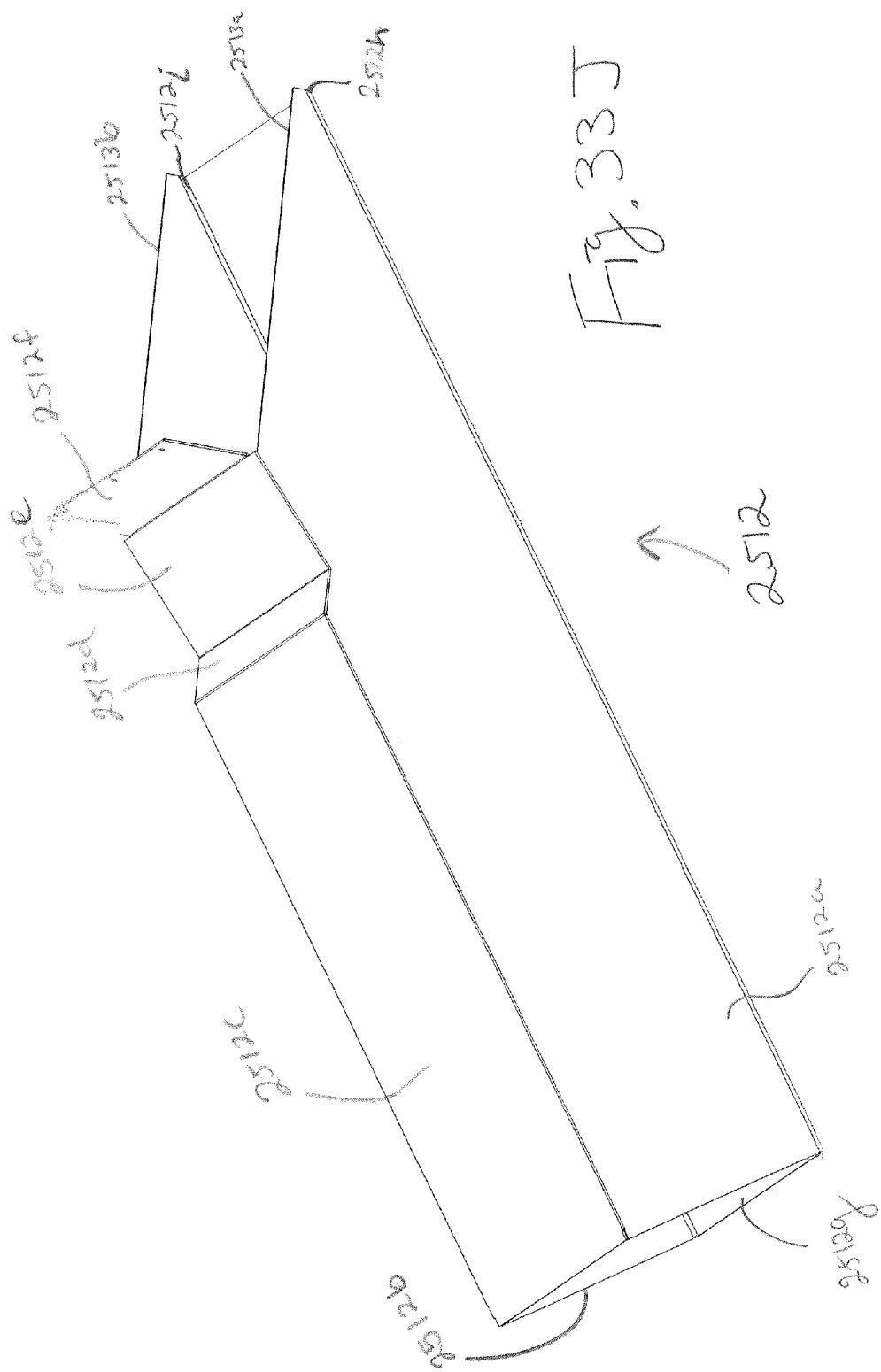
FIG. 33J is a perspective view of a shaft of the fixed chute section of the material director of the unloader of FIG. 29.
Figure 33K:
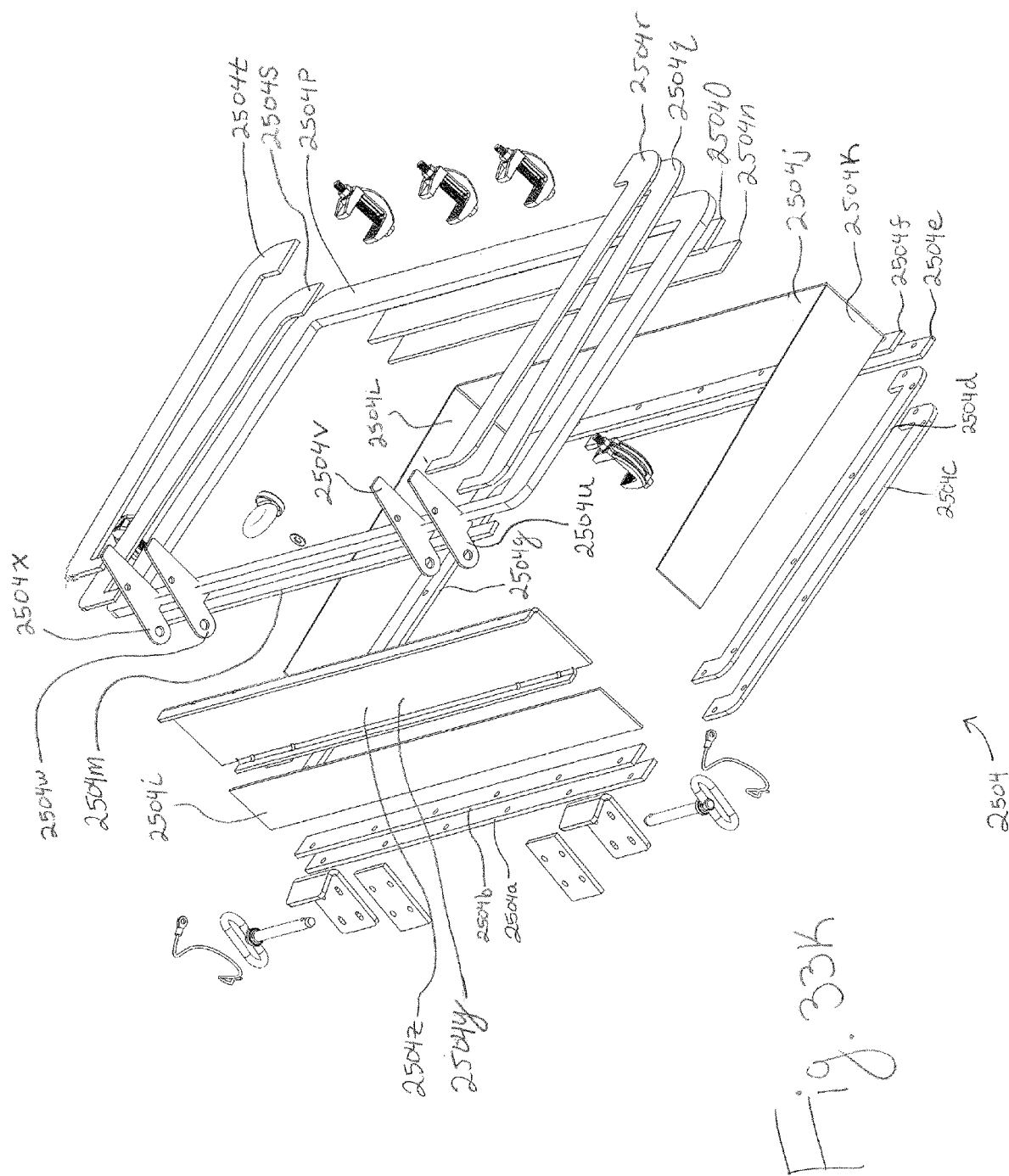
FIG. 33K is a front exploded perspective view of the chute connector section of the material director of the unloader of FIG. 29.

As shown in FIG. 33J, the shaft 2512 of the fixed chute 2502 section includes: (a) a first side 2512*a*, wherein one end of the first side 2512*a* includes an angled edge 2513*a*; (b) a second side 2512*b* spaced apart from the first side 2512*a*, wherein one end of the second side 2512*b* includes an angled edge 2513*b*; (c) a third side 2512*c* integrally connected to the first side 2512*a* and the second side 2512*b*; (d) a fourth side 2512*d* integrally connected to the first side 2512*a*, the second side 2512*b*, and the third side 2512*c*; (e) a fifth side 2512*e* integrally connected to the first side 2512*a*, the second side 2512*b*, and the fourth side 2512*d*; (f) a sixth side 2512*f* integrally connected to the first side 2512*a*, the second side 2512*b*, and the fifth side 2512*e* and angled upwardly relative to the fifth side 2512*e*, wherein the sixth side 2512*f* includes a body that defines a plurality of fastener openings each configured to receive a suitable fastener; and (g) a seventh side 2512*g* spaced apart from the third, fourth, and fifth sides 2512*c*, 2512*d*, and 2512*e*, respectively, and integrally connected to the first side 2512*a* and the second side 2512*b*, wherein the seventh side 2512*g* includes a first upwardly extending wall 2512*h* integrally connected to the first side 2512*a* and a second upwardly extending wall 2512*i* spaced apart from the first upwardly extending wall 2512*h* and integrally connected to the second side 2512*b*;

One end of the fixed chute section 2502 is configured to be integrally connected (by welding and by suitable fasteners) to the material directing opening assembly 2508 (as best shown in FIGS. 33A and 33B). More specifically, the angled edge 2513*a* of the first side 2512*a*, the angled edge 2513*b* of the second side 2512*b*, and an end of the seventh side 2512*g* are welded to a bottom portion of the third material directing bracket 2508*e*, a bottom portion of the fourth material directing bracket 2508*f*, and a bottom portion of the first material directing bracket 2508*c*, respectively. Additionally, the sixth side 2512*f* is connected to the second material directing bracket 2508*d* via suitable fasteners.

In this illustrated example embodiment inner surfaces of the first side 2508*a*, the second side 2508*b*, the third side 2508*c*, the fourth side 2508*d*, the fifth side 2508*e*, the sixth side 2508*f*, and the seventh side 2508*g* together define a material directing channel, which is configured to direct materials through the fixed chute section 2502.

As best shown in FIGS. 33K, 33L, 33M, and 33N, the chute connector section 2504 includes: (a) a first base bracket 2504*a*; (b) a second base bracket 2504*b*; (c) a third base bracket 2504*c*; (e) a fourth base bracket 2504*d*; (f) a fifth base bracket 2504*e*; (g) a sixth base bracket 2504*f*; (h) a seventh base bracket 2504*g*; and (i) an eighth base bracket 2504*h*. These base brackets 2504*a*, 2504*b*, 2504*c*, 2504*d*, 2504*e*, 2504*f*, 2504*g*, and 2504*h* each include a body that defines fastener openings configured to receive suitable fasteners. Thus, the first base bracket 2504*a* and the second base 2504*b* bracket are connected via suitable fasteners; the third base bracket 2504*c* and the fourth base 2504*d* bracket are connected via suitable fasteners; fifth base bracket 2504*e* and the sixth base bracket 2504*f* are connected via suitable fasteners; and seventh base bracket 2504*g* and the eighth base bracket 2504*h* are connected via suitable fasteners.

As best shown in FIGS. 33K, 33L, 33M, and 33N, the chute connector section 2504 further includes: (a) a first body wall 2504*i* integrally connected to the second base bracket 2504*b*; (b) a second body wall 2504*j* spaced apart from the first body wall 2504*i* and integrally connected to the sixth base bracket 2504*f*; (c) a third body wall 2504*k* integrally connected to the first and second body walls 2504*i* and 2504*j* and the fourth base bracket 2504*d*; and (d) a fourth body wall 2504l spaced apart from the third body wall 2504k and integrally connected to the first and second body walls 2504i and 2504j and the eighth base bracket 2504h.

It should be appreciated that in this illustrated example embodiment, the third body wall 2504k and the fourth body wall 2504l taper toward the first body wall 2504i so that the chute connector section 2504 directs the loose materials in the desired direction. It should further be appreciated that in this illustrated example embodiment, the chute connector section 2504 can include one or more suitable gaskets, such as gasket 2505f shown in FIG. 33N, configured to create a tight seal between the chute connector section 2504 and the fixed chute section 2502 and/or the chute connector section 2504 and the movable and removable chute section 2506.

As best shown in FIGS. 33K, 33L, 33M, and 33N, the chute connector section 2504 further includes: (a) a first elongated top bracket 2504m integrally connected to the first, third and fourth body walls 2504i, 2504k, and 2504L, respectively; (b) a second elongated top bracket 2504n spaced apart from the first elongated top bracket 2504m and integrally connected to the second, third, and fourth body walls 2504j, 2504k, and 2504L, respectively; (c) a third elongated top bracket 2504o adjacent to the second elongated top bracket 2504n and integrally connected to the second elongated top bracket 2504n; (d) a generally tubular top bracket 2504p integrally connected to the first elongated top bracket 2504m, the third elongated top bracket 2504o, the third body wall 2504k, and the fourth body wall 2504l; (e) a first C-shaped top bracket 2504q integrally connected to the top generally tubular top bracket 2504p; (f) a second C-shaped top bracket 2504r adjacent to the first C-shaped top bracket 2504q and integrally connected to the first C-shaped top bracket 2504q; (g) a third C-shaped top bracket 2504s spaced apart from the first C-shaped top bracket 2504q and integrally connected to the generally tubular top bracket 2504p; and (h) a fourth C-shaped top bracket 2504t adjacent to the third C-shaped top bracket 2504s and integrally connected to the third C-shaped top bracket 2504s.

The chute connector section 2504 further includes: (a) a first hinge connector bracket 2504u integrally connected to the generally tubular top bracket 2504p; (b) a second hinge connector bracket 2504v spaced apart from the first hinge connector bracket 2504u and integrally connected to the generally tubular top bracket 2504p; (c) a third hinge connector bracket 2504w integrally connected to the generally tubular top bracket 2504p; (d) a fourth hinge connector bracket 2504x spaced apart from the third hinge connector bracket 2504w and integrally connected to the generally tubular top bracket 2504p; and (e) a front wall 2504y that includes an elongated vertically extending wall 2504z, a horizontally extending top wall (not labeled), and a horizontally extending bottom wall (not labeled), wherein the top and bottom walls define a plurality of hinge connector bracket grooves each configured to direct or guide where the hinge connector brackets 2504u, 2504v, 2504w, and 2504x connect to the front wall 2504y. The bottom wall is integrally connected to the generally tubular top bracket 2504p. The front wall also includes a ring base (not labeled) integrally connected to the front wall. The ring base is integrally connected to a ring (not labeled), which includes a washer (not labeled) positioned between the ring and the ring base. One end of a connecting apparatus (such as a cord or line) can be connected to the ring, and another opposing end of the connecting apparatus can be connected to one of the primary D-rings of the pallet receiver 2300 to assist in stabilizing the material director 2500.

The front wall 2504y is also configured to engage a side of the fixed chute section 2502 when the chute connector section 2504 is hingedly connected to the fixed chute section 2502. This enables the chute connector section 2504 to properly connect to the fixed chute section 2502.

The first, second, third, and fourth hinge connector brackets 2504u, 2504v, 2504w, and 2504x each include a body that defines a plurality of fastener openings configured to each receive a suitable fastener to connect a hinge of the chute connector section to a respective hinge connector bracket, as best shown in FIG. 33N and further described below.

In this illustrated example embodiment, an inner surface of the first body wall 2504i, the second body wall 2504j, the third body wall 2504k, and the fourth body wall 2504l together define a material directing channel that is configured to direct materials through the chute connector section 2504.

Figure 33L:
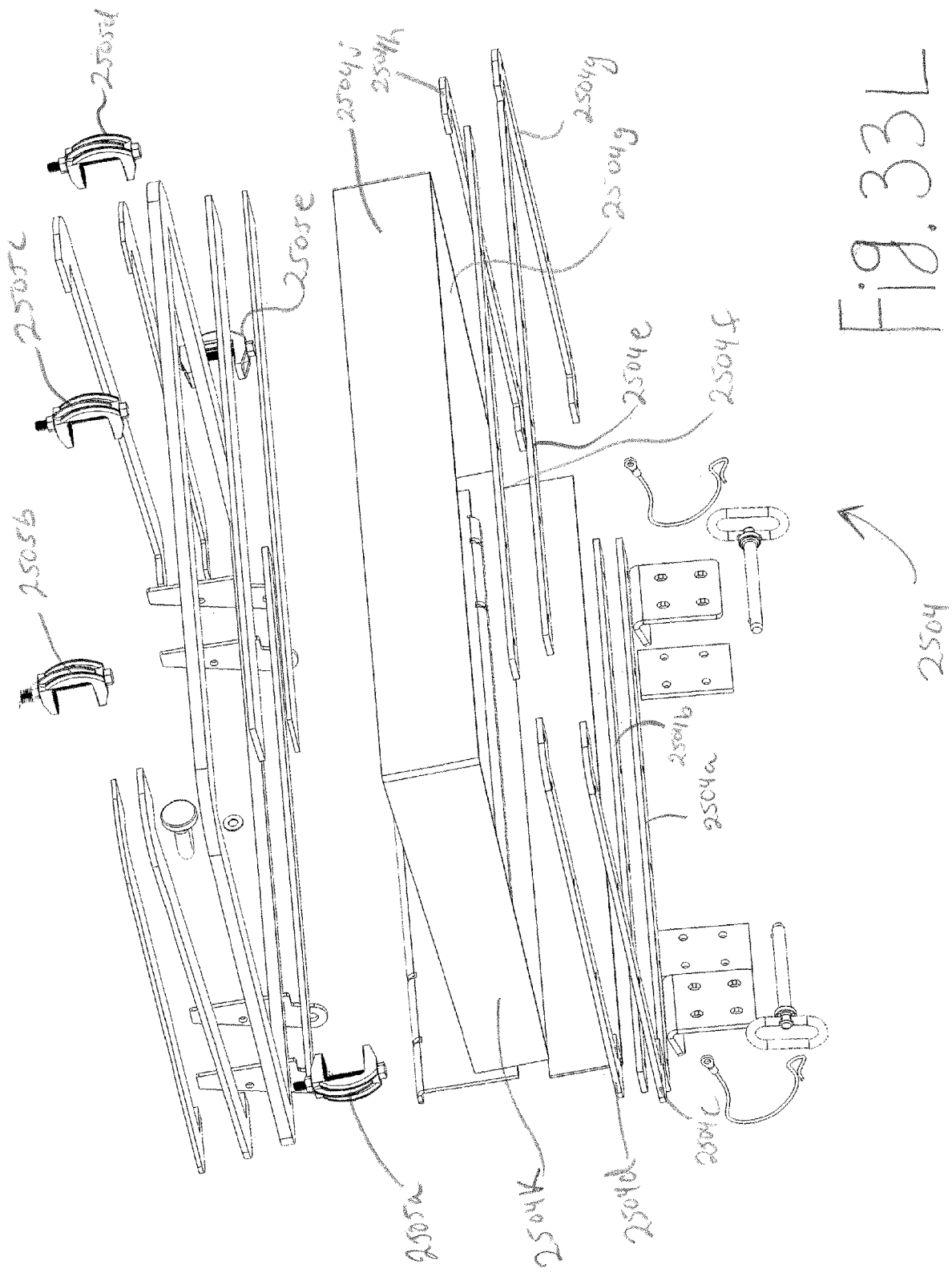
FIG. 33L is a rear exploded perspective view of the chute connector section of the material director of the unloader of FIG. 29.

As best shown in FIG. 33L, the chute connector section 2504 further includes: (a) a plurality of clamp or clamping devices 2505a, 2505b, 2505c, 2505d, and 2505e that are each configured to assist in connecting the chute connector section 2504 to the fixed chute section 2502; (b) a first hinge 2514; and (c) a second hinge 2516.

The first hinge 2514 and the second hinge 2516 are configured to hingedly connect the chute connector section 2504 to the fixed chute section 2502. It should be appreciated that the first hinge 2514 and the second hinge 2516 are substantially similar in this illustrated example embodiment. Thus, for brevity, only the first hinge 2514 is further described below.

Figure 33M:
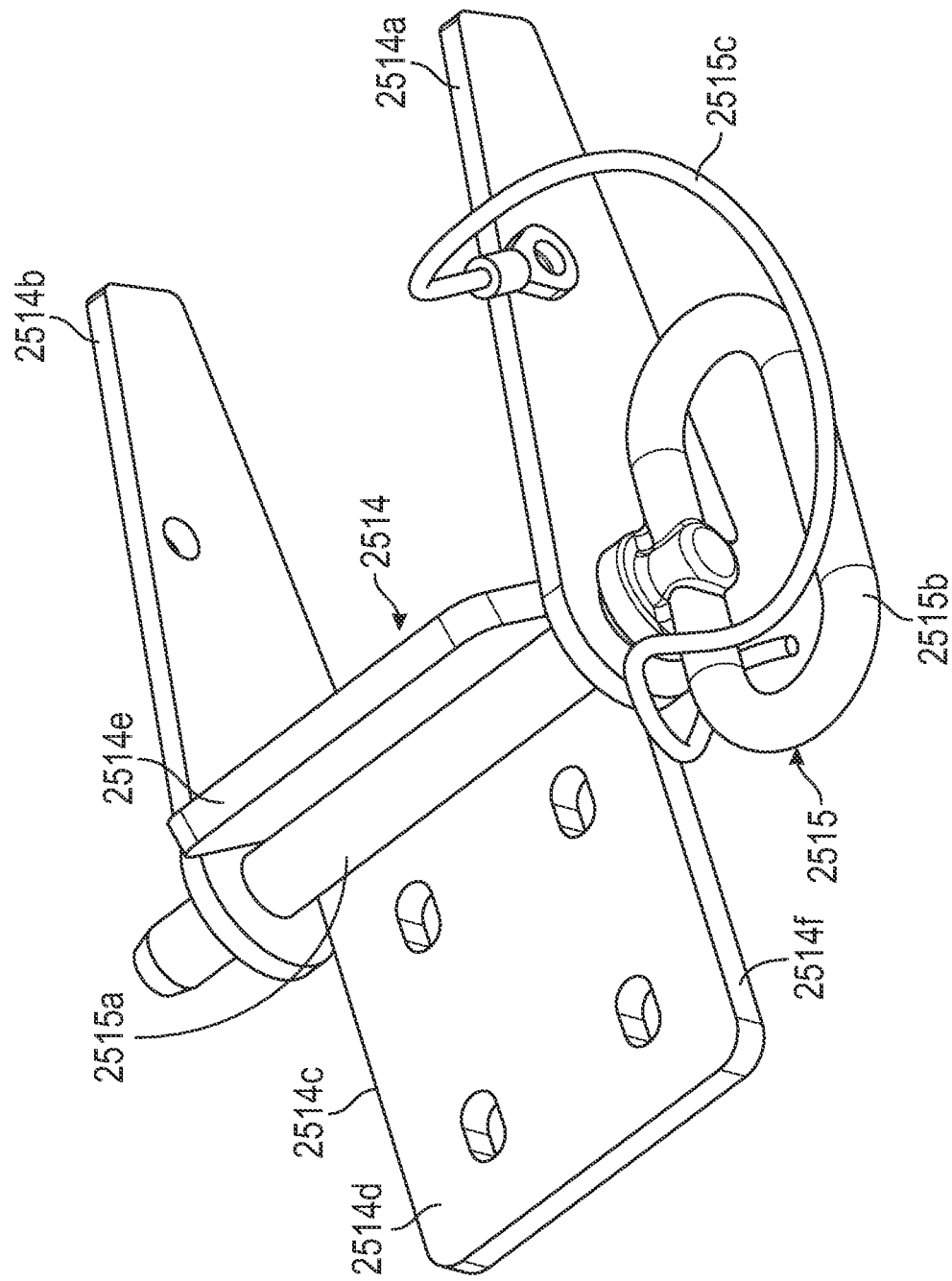
FIG. 33M is an enlarged perspective view of a hinge of the chute connector section of the material director of the unloader of FIG. 29.
Figure 330:
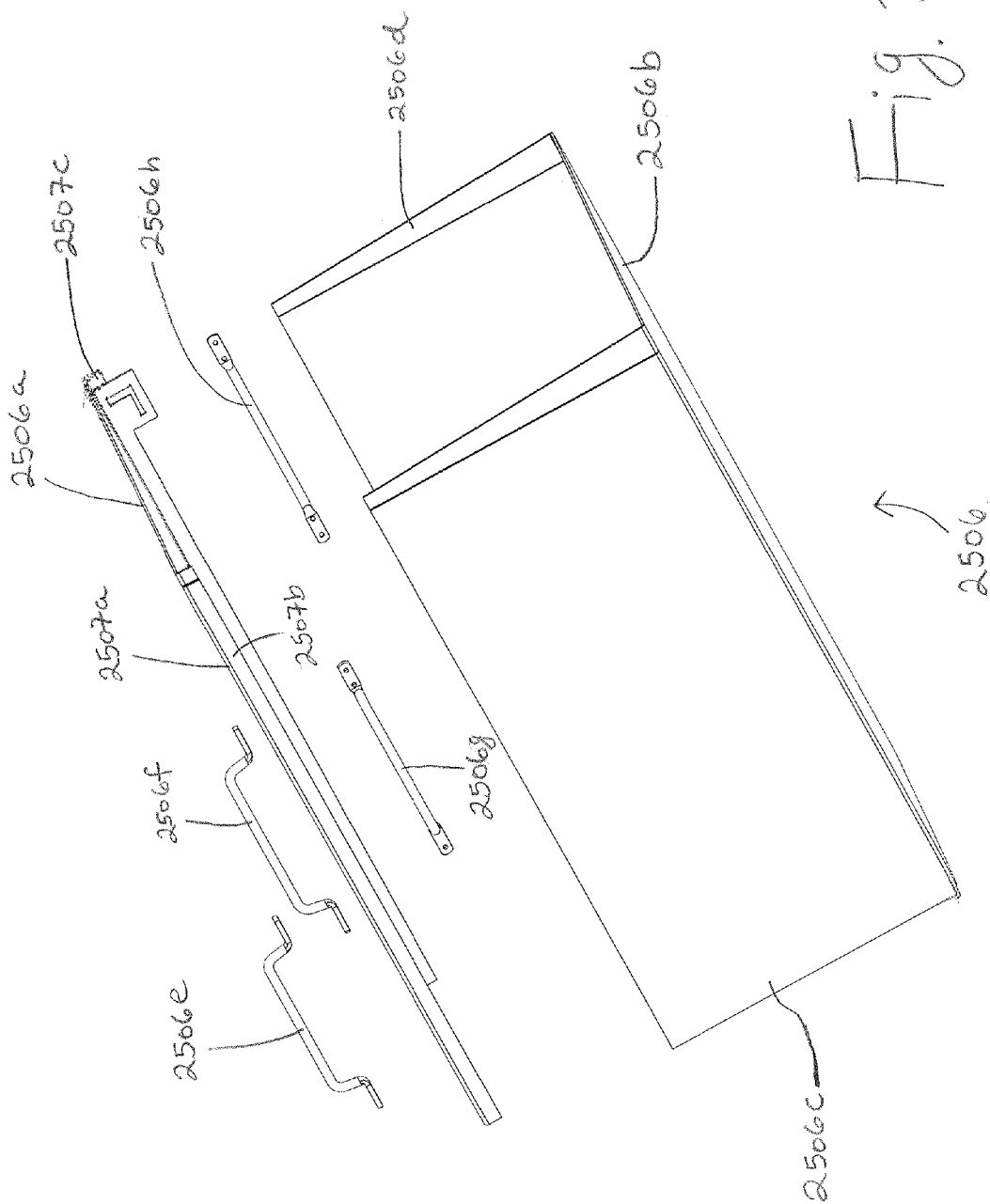
Figure 346:
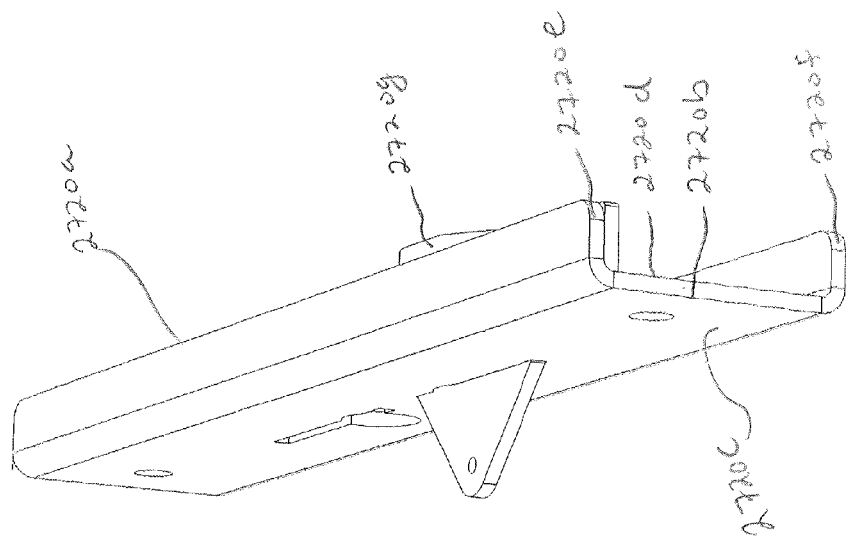

As best shown in FIG. 33M, the first hinge 2514 includes: (a) a first arm 2514a that includes a body that defines a plurality of fastener openings configured to receive a connecting apparatus; (b) a second arm 2514b spaced apart from the first arm 2514a that includes a body that defines a plurality of suitable fastener openings configured to receive a connecting apparatus; (c) a first bracket 2514c, wherein the first bracket 2514c includes a generally planar portion 2514d and a vertically extending portion 2514e integrally connected to the generally planar portion 2514d; and (d) and a connecting apparatus 2515.

The generally planar portion 2514d of the first bracket 2514c includes a body that defines a plurality of fastener openings each configured to receive a suitable fastener. The vertically extending portion 2514e of the first bracket 2514c extends at an angle relative to the planar portion 2514d of the first bracket 2514c. This angle can be ninety degrees or less.

The connecting apparatus 2515 includes: (a) a stem 2515a that is configured to be positioned in the fastener openings of the first arm 2514a and the second arm 2514b; (b) a rotatable handle 2515b; and (c) a wire 2515c that includes one end integrally connected to the handle 2515b and an opposing end connected to the first arm 2514a via a suitable fastener (not shown). The wire 2515c is of a suitable length to enable the first hinge 2514 to rotate.

The first hinge 2514 also includes a generally planar second bracket 2514f that includes a body that defines a plurality of fastener openings each configured to receive a suitable fastener. This generally planar bracket 2514f is connected via suitable fastener to the generally planar portion 2514d of the first bracket 2514c.

As best shown in FIG. 33N, when the stem 2515a of the connecting apparatus 2515 is positioned in the fastener openings of the first arm 2514a and the second arm 2514b of the first hinge 2514, the first arm 2514a and second arm

2514*b* can rotate relative to the stem 2515*a*. This enables the chute connector section 2504 to suitably connect to the fixed chute section 2502.

The first hinge 2514 and the second hinge 2516 are spaced apart from each other. Each hinge is integrally connected to the first and second base brackets 2504*a* and 2504*b*.

The movable and removable chute section 2506 is configured to direct loose materials that exits the gate assembly of the container 20, thereafter moves through the fixed chute section 2502, thereafter moves through the chute connector section, and thereafter direct materials to the material blender (such as the blender shown in FIGS. 17, 18, and 19). The movable and removable chute section 2506 is also configured to extend at an angle from the fixed chute section 2502 and underneath the adjacent unloader 3000.

As shown in FIG. 33O, the movable and removable chute section 2506 includes: (a) a generally rectangular top wall 2506*a*; (b) a generally rectangular bottom wall 2506*b* spaced apart from the top wall 2506*a*; (c) a first side wall 2506*c* integrally connected to the top wall 2506*a* and the bottom wall 2506*b*; (d) a second side wall 2506*d* spaced apart from the first side wall 2506*c* and integrally connected to the top wall 2506*a* and the bottom wall 2506*b*; (e) a first top handle 2506*e* integrally connected to the top wall 2506*a* via suitable fasteners; (g) a second top handle 2506*f* spaced apart from the first handle 2506*e* and integrally connected to the top wall 2506*a* via suitable fasteners; (h) a first side handle 2506*g* integrally connected to the first side wall 2506*c* via suitable fasteners; and (i) a second side handle 2506*h* integrally connected to the second side wall 2506*d* via suitable fasteners.

More specifically, the top wall 2506*a* includes: (a) a planar wall 2507*a*; (b) a first downwardly extending wall 2507*b* integrally connected to the planar wall 2507*a*; and (c) a second downwardly extending wall 2507*c* spaced apart from the first downwardly extending wall 2507*b* and integrally connected to the planar wall 2507*a*. The first downwardly extending wall 2507*c* is configured to engage and connect to the first side wall 2506*c*. The second downwardly extending wall 2507*c* is configured to engage and connect to the second side wall 2506*d*.

In this illustrated example embodiment, one end of the movable and removable chute section 2506 is connected to the chute connector section 2504 so that materials that travel through the chute connector section 2504 can continue to travel through the movable and removable chute section 2506 (as best shown in FIGS. 33A and 33B).

The handles 2506*e*, 2506*f*, 2506*g*, and 2506*h* are configured to enable a user to move the movable and removable chute section 2506.

In this illustrated example embodiment, inner surfaces of the top wall 2506*a*, the bottom wall 2506*b*, the first side wall 2506*c*, and the second side wall 2506*d* together define a material directing channel, that is configured to direct materials through the movable and removable chute section 2506.

It should be appreciated from the above that the material director 2500 (and likewise the material director 4500) is configured to be positioned underneath the pallet receiver 2500 so that loose materials that exit the gate of the container 20 travel through the material director 2500 and into the material blender positioned beneath the pallet receiver 3500 of the unloader 3000. More specifically, the material directing opening assembly 2508 of the fixed chute section 2502 directs loose material that exits the gate of the container 20 to the shaft 2512 of the fixed chute section 2502. The loose materials thereafter travel through the chute connector section 2504. The loose materials thereafter travel through the movable and removable chute section 2506. The loose materials thereafter exit from the movable and removable chute section 2506 and into the material blender underneath the pallet receiver 3300 of the unloader 3000.

As described above, the material director 4500 of the unloader 4000 is substantially similar to the material director 2500 of the unloader 2000. However, the material director 3500 of the unloader 3000 includes different members or components than the material directors 2500 and 4500. Thus, the material director 3500 is further described below and best shown in FIG. 33P.

The material director 3500 is positioned beneath the unloader 3000. The material director 3500 is configured to direct materials that exit the gate opening of the gate assembly of the container 30 when the gate assembly is opened to a blender beneath the material director 3500. As shown in FIG. 33O, the material director 3500 includes: (a) a material directing opening assembly 3502 connected to and supported by the pallet receiver 3300 of the unloader 3000; and (b) a shaft 3504 connected via suitable fasteners to the material directing opening assembly 3502.

The material directing opening assembly 3502 is substantially similar to the material directing opening assembly 2508 of the material director 2500. Thus, the components of the material directing opening assembly 3502 and a description of the material direction assembly opening 3502 are not provided.

The shaft 3504 includes: (a) a first wall 3504*a*; (b) a second wall 3504*b* spaced apart from the first wall 3504*b*; (c) a third wall 3504*c* integrally connected to the first wall 3504*a* and the second wall 3504*b*; (d) a fourth wall 3504*d* spaced apart from the third wall 3504*c* and integrally connected to the first wall 3504*a* and the second wall 3504*b*; (e) a first bottom wall 3504*e* integrally connected to the first wall 3504*a*; (f) a second bottom wall 3504*f* spaced apart from the first bottom wall 3504*e* and integrally connected to the second wall 3504*b*; (g) a third bottom wall 3504*g* integrally connected to the first bottom wall 3504*e*, the second bottom wall 3504*f*, and the third wall 3504*c*; and (h) a fourth bottom wall 3504*h* integrally connected to the first bottom wall 3504*e*, the second bottom wall 3504*f*, and the fourth wall 3504*d*.

The walls 3504*a*, 3504*b*, 3504*c*, 3504*d*, 3504*e*, 3504*f*, 3504*g*, 3504*h* each includes an inner surface that together define a material directing channel configure to direct materials through the shaft 3504 of the material director 3500.

Thus, the material director is configured to be positioned underneath the pallet receiver 3300 so that loose materials that exit the gate of the container 30 travel through the material director 3500 and into the material blender positioned beneath the pallet receiver 3500 of the unloader 3000. More specifically, the material directing opening assembly 3502 of the material director 35000 directs loose material that exits the gate of the container 30 to the shaft 3504 of the material director 3500. The loose materials thereafter exit from the shaft 3504 and into the material blender underneath the pallet receiver 3300 of the unloader 3000.

It should be appreciated that in this illustrated example embodiment, the components of the material directing opening assembly 2508 (except the one or more suitable compressible sealing strip(s) or gasket(s) 2510) of the material director 2500 and the components of the material directing opening (not labeled) of the material director 4500 are made of a suitable material, such as steel. It should further be appreciated that the components of the shaft 2512 of the material director 2500 and the components of the shaft (not labeled) of the material director 4500 are made of a suitable material, such as aluminum. It should further be appreciated that the components of the chute connector section 2504 of the material director 2500 and the components of the chute connector section (not labeled) material director 4500 are made of a suitable material, such as aluminum. It should further be appreciated that the components of the movable and removable and removable chute section 2506 of the material director 2500 and the components of the movable and removable and removable chute section (not labeled) of the material director 4500 are made of a suitable material, such as steel. It should further be appreciated that the components of the material director 3500 are made of a suitable material, such as steel.

In this illustrated example embodiment, the bulk material shipping container unloader 2000 includes one or more vibrators (not labeled) connected to and supported by the material director 2500 in a suitable manner. Each vibrator is configured vibrate the material director 2500 to remove or dislodge materials so that the materials travel through the material director 2500.

The Automatic Bulk Material Container Gate Mover

The illustrated example automatic bulk material container gate mover 2700 of the unloader 2000 is configured to cause a gate assembly (not shown) of the container 20, and particularly a gate closure member (not shown) of a gate assembly, to partially, open fully, and thereafter close. This process is described in more detail below.

Referring now to FIGS. 34A to 34N, in this illustrated example embodiment, the automatic bulk material container gate mover 2700 of the unloader 2000 includes: (a) a track assembly 2702 integrally connected to and supported by the pallet receiver 2300; and (b) a gate mover assembly 2704 supported by the track assembly 2702 and configured to receive and engage a downwardly extending handle or engagement member (not shown) of a gate of a material unloading assembly of the bulk material shipping container 20.

More specifically, as best shown in FIGS. 34A, 34B, and 34C, the track assembly includes: (a) a first track 2706 integrally connected to and supported by the pallet receiver 2300 (and thus the supporter 2100); and (b) a second track 2708 spaced apart from the first track 2706 and integrally connected to and supported by the pallet receiver 2300. The first track 2706 and the second track 2708 are each configured to enable components of the gate mover assembly 2704 to be movable along the first track 2706 and the second track 2708. It should be appreciated that the first track 2706 and the second track 2708 are substantially similar or substantially mirror images of each other in this illustrated example embodiment. Thus, for brevity, only the first track 2706 is further described in more detail.

As best shown in FIGS. 34B and 34C, the first track 2706 includes a C-shaped bracket 2710. The bracket 2710 includes: (a) an elongated horizontally extending wall 2712; (b) an upper wall 2714 integrally connected to and extending horizontally inwardly from the wall 2712; and (c) a lower wall 2716 spaced apart from the upper wall 2714 and integrally connected to and extending horizontally inwardly from the wall 2712.

In this illustrated example embodiment, one end of the wall 2712 of the first track 2706 is integrally connected to the pallet support base 2302 (as shown in FIG. 28). An opposing end of the wall 2712 of the first track 2706 is integrally connected to the pallet support base 2306 (as shown in FIG. 28). An end of the lower wall 2716 of the first track 2706 is integrally connected to the pallet support base 2302 (as shown in FIG. 28). An opposing end of the lower wall 2716 is integrally connected to the pallet support base 2306 (as shown in FIG. 28). It should be appreciated that in this illustrated example embodiment, the length of the lower wall 2716 of the first track 2706 is greater in length than the length of the upper wall 2714 of the first track 2706. A plurality of brackets 2718a, 2718b, 2718c, and 2718d are each integrally connected to the wall 2712 of the first track 2706 and are each configured to connect the wall 2712 of the first track 2706 and an upper surface of the forklift receiver 2334 (as shown in FIG. 34C).

Likewise, in this illustrated example embodiment, an end of a wall of the second track 2708 is integrally connected to the pallet support base (as shown in FIG. 28). An opposing end of the wall of the second track 2708 is integrally connected to the pallet support base (as shown in FIG. 28). An end of a lower wall of the second track 2708 is integrally connected to the pallet support base (as shown in FIG. 28). An opposing end of the lower wall of the second track 2708 is integrally connected to the pallet support base (as shown in FIG. 28). It should be appreciated that in this illustrated example embodiment, the length of the lower wall of the second track 2708 is greater than the length of the upper wall of the second track 2708. A plurality of brackets are each integrally connected to a surface of the wall of the second track 2708 and are each configured to connect the wall of the second track 2708 and an upper surface of the forklift receiver.

Referring now to FIGS. 34D to 34H, the gate mover assembly 2704 includes: (a) a first trolley 2720; (b) a second trolley 2722 spaced apart from the first trolley 2722; (c) a trolley connector 2724 connected to the first trolley 2720 and the second trolley 2722; (d) a gate receiver and engager 2726 integrally connected to and supported by the trolley connector 2724; (e) a first trolley mover assembly 2728 connected to the first trolley 2720; (f) a second trolley mover assembly 2730 connected to the second trolley 2722; and (g) a trolley mover assembly controller 2732 fluidly connected to the first trolley mover assembly 2728 and the second trolley mover assembly 2730.

The first trolley 2720 and the second trolley 2722 are configured to move along the first track 2706 and the second track 2708, respectively. It should be appreciated that first trolley 2720 and the second trolley 2722 are substantially similar in this illustrated example embodiment. Thus, for brevity, only the first trolley 2720 is further described in more detail.

As best shown in FIGS. 34E to 34H, the first trolley 2720 includes a C-shaped bracket 2720a. The bracket 2720a includes: (a) an elongated horizontally extending wall 2720b that includes a body that defines a plurality of fastener openings each configured to receive a suitable fastener, wherein the wall 2720b has an outer surface 2720c and an inner surface 2720d and the body of the wall 2720b defines an opening configured to receive a bracket (as further described below); (b) an upper wall 2720e integrally connected to and extending horizontally inwardly from the wall 2720b, wherein the upper wall includes an outer surface and an inner surface; (c) a lower wall 2720f spaced apart from the upper wall 2720e and integrally connected to and extending horizontally inwardly from the wall 2720b, wherein the lower wall includes an outer surface and an inner surface; and (d) a trolley connector bracket 2734 that includes a planar upper wall 2734a, an L-shaped first side wall 2734*b* integrally connected to the planar upper wall 2734*a* and the inner surface 2720*d* of the wall 2720*b*, and an L-shaped second side wall 2734*c* spaced apart from the L-shaped first side wall 2734*b* and integrally connected to the planar upper wall 2734*a* and the inner surface 2720*d* of the wall 2720*b*, wherein the trolley connector bracket includes a body that defines a plurality of fasteners openings each configured to receive a suitable fastener to connect the trolley connector 2724 and the trolley connector bracket 2734.

As best shown in FIGS. 34E to 34H, the bracket 2720*a* further includes: (a) a generally planar bracket 2720*g* integrally connected to the wall 2720*b* and positioned through the opening of the body of the wall 2720*b* so that the planar bracket 2720*g* partially extends past the outer surface 2720*c* of the wall 2720*b* and the inner surface 2720*d* of the wall 2720*b* and integrally connected to the L-shaped first side bracket 2734*b*, wherein the planar bracket 2720*g* includes a body that defines a fastener opening configured to receive a suitable fastener to connect a wheel to the first trolley 2720; (b) a vertically extending bracket 2720*h* integrally connected to the inner surface 2720*d* of the wall 2720*b* and one end of the generally planar bracket 2720*g*; (c) a generally semi-cylindrical bracket 2720*i* integrally connected to and extending horizontally from the vertically extending bracket 2720*h*, wherein the semi-cylindrical bracket 2720*i* includes a body that defines a first trolley mover fastener opening configured to receive a suitable fastener to connect the first trolley mover 2728 and the first trolley 2720; (d) a rectangular bracket (not shown) connected to and extending inwardly from the inner surface 2720*d* of the wall 2720*b*, wherein the wall includes a body that defines a fastener opening configured to receive a suitable fastener to connect one of the wheels of the first trolley 2720; (e) a vertically extending rectangular wall (not shown) integrally connected to and extending downwardly from the inner surface of the upper wall, connected to and extending upwardly from an upper surface of the rectangular bracket, and integrally connected to a surface of the vertically extending bracket 2720*h*; (f) a first wheel 2720*j* connected to the wall 2720*b* of the first trolley 2720; (g) a second wheel 2720*k* spaced apart from the first wheel 2720*j* and connected to the wall 2720*b* of the first trolley 2720; and (h) a third wheel 2720*l* positioned between the first wheel 2720*j* and the second wheel 2720*k* and connected to the generally planar bracket 2720*g* of first trolley 2720.

The first wheel 2720*j*, the second wheel 2720*k*, and the third wheel 2720*l* are each configured to be movable along the first track 2706 and thus enable the first trolley 2720 to be movable along the first track 2706. The first wheel 2720*j* is each configured to rotate about a first horizontal axis. The second wheel 2720*k* is configured to rotate about a second different horizontal axis. The third wheel 2720*l* is configured to rotate about a vertical axis. The third wheel 2720*l* is configured to prevent the first trolley 2720 from moving tangentially or substantially tangentially to the first track 2706 when moving along the first track 2706. Since the first wheel 2720*j*, the second wheel 2720*k*, and the third wheel 2720*l* are each configured to be movable along the first track 2706, the first horizontal axis about which the first wheel 2720*j* rotates, the second horizontal axis about which the second wheel 2720*k* rotates, and the first vertical axis about which the third wheel 2720*l* rotates are each movable along or relative to the first track 2706.

The first wheel 2720*j* includes a body that defines a fastener opening configured to receive a suitable fastener. The first wheel 2720*j* is connected to the wall 2720*b* of the first trolley 2720 by inserting and securing a suitable fastener through the fastener opening defined by the body of the wheel 2720*j* and further through the fastener opening defined by the wall 2720*b*.

The second wheel 2720*k* includes a body that defines a fastener opening configured to receive a suitable fastener. The second wheel 2720*k* is connected to the wall 2720*b* of the first trolley 2720 by inserting and securing a suitable fastener through the fastener opening defined by the body of the wheel 2720*k*, further through the fastener opening defined by the wall 2720*b*, and further through the fastener opening defined by the rectangular wall (not shown).

The third wheel 2720*l* includes a body that defines a fastener opening configured to receive a suitable fastener. The third wheel 2720*l* is connected to the generally planar bracket 2720*g* of the first trolley 2720 by inserting and securing a suitable fastener through the fastener opening defined by the body of the third wheel 2720*l* and further through the fastener opening defined by the generally planar bracket 2720*g*.

In this illustrated example embodiment, the wall 2720*b* also defines an opening (not labeled) adjacent to the opening that is configured to receive the planar bracket 2720*g*. This opening (not labeled) has a circular portion, a first rectangular portion extending from the circular portion, and an opposing, second shorter rectangular portion extending from the circular portion The trolley connector 2704 connects the first trolley 2720 to the second trolley 2722, as best shown in FIG. 34D.

Figure 34H:
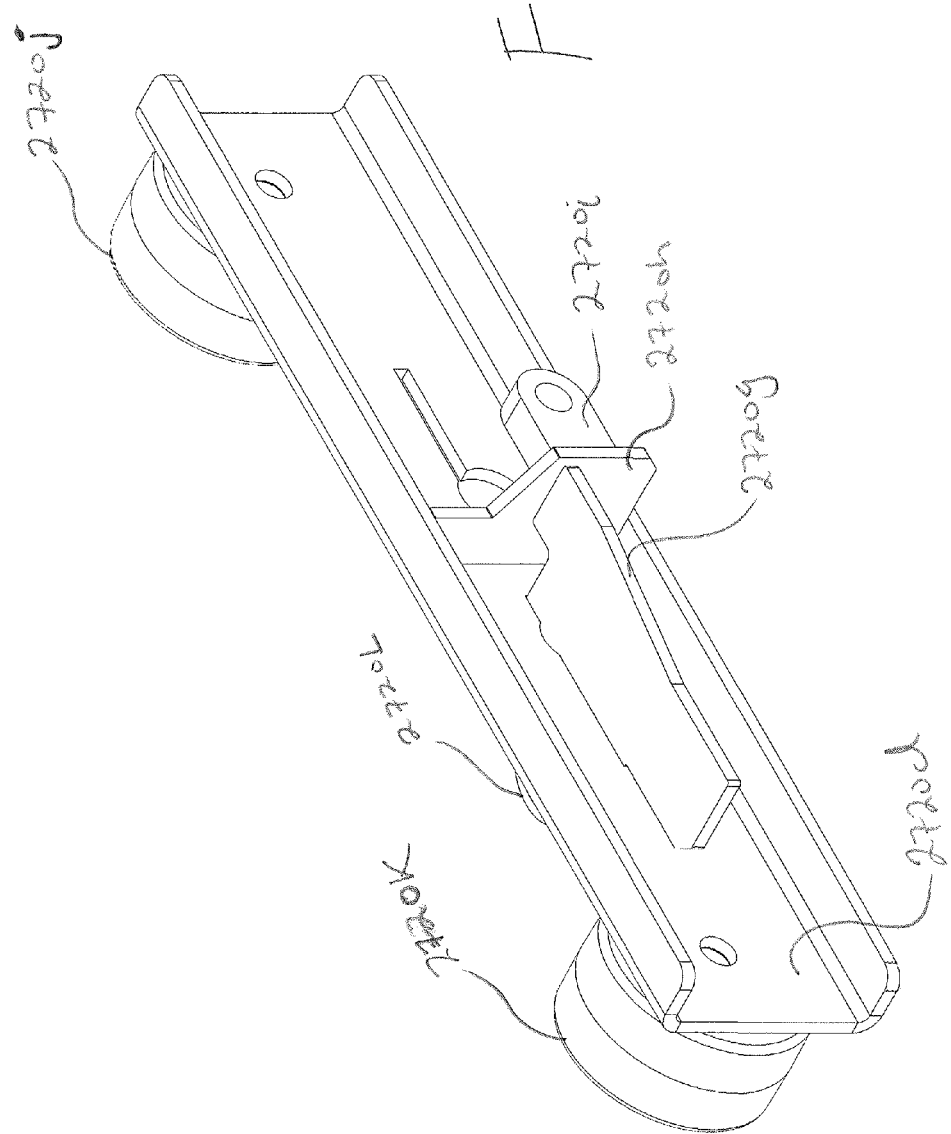
FIG. 34H is a top perspective view of the first trolley of the gate mover assembly of FIG. 34A, showing an inner surface of the C-bracket of the first trolley and showing wheels connected to the first trolley.
Figure 34I:
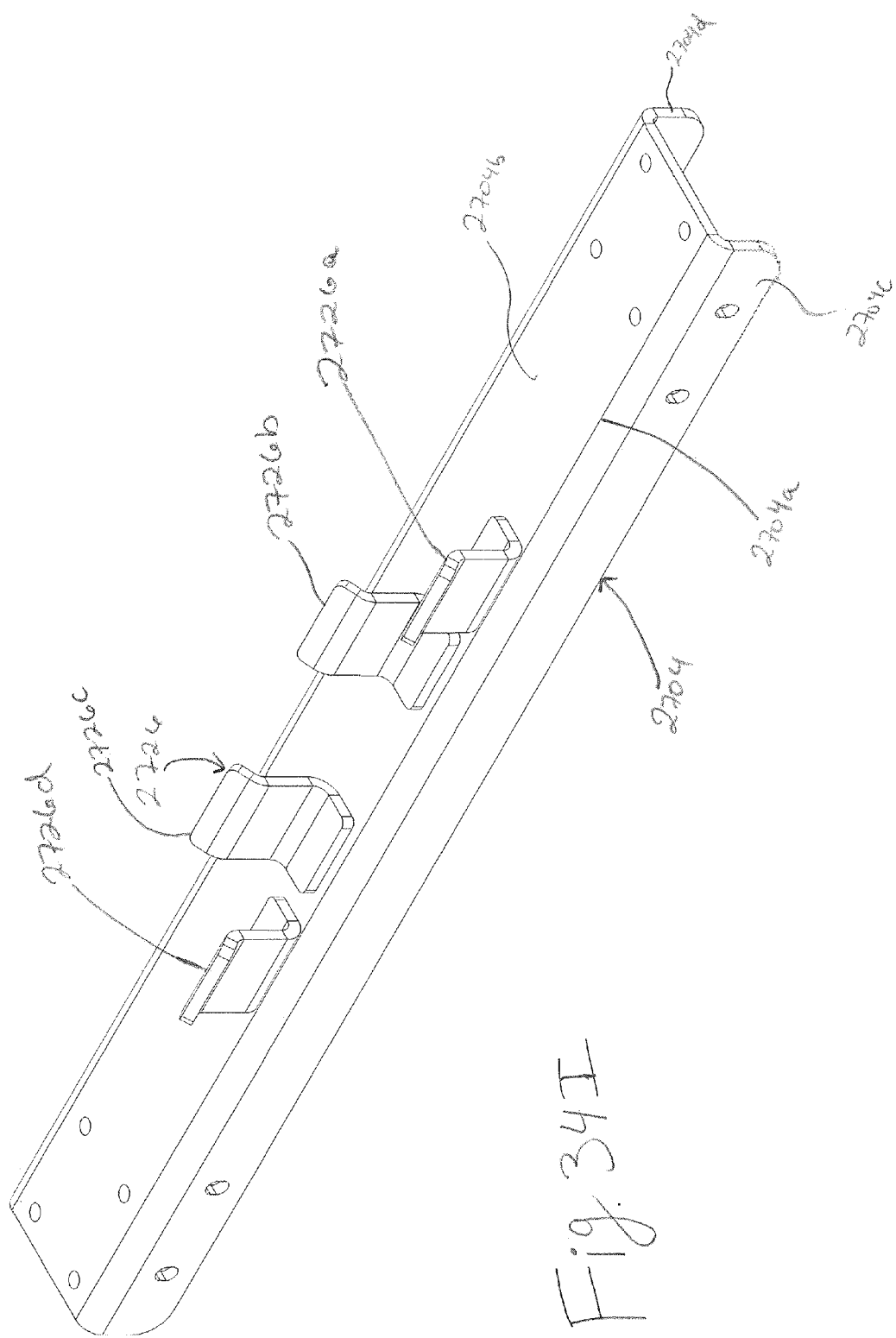
FIG. 34I is a perspective view of a trolley connector of the gate mover assembly of FIG. 34A.

As best shown in FIGS. 34I and 34J, the trolley connector 2704 includes a C-shaped bracket 2704*a*. The bracket 2704*a* includes: (a) a horizontally extending planar wall 2704*b* that includes a body that defines a plurality of fastener openings; (b) a first vertically extending wall 2704*c* integrally connected to and extending downwardly from the horizontally extending wall 2704*b*, wherein the first vertically extending wall 2704*c* includes a body that defines a plurality of fastener openings; and (c) a second vertically extending wall 2704*d* integrally connected to and extending downwardly from the horizontally extending wall 2704*c*, wherein the second vertically extending wall 2704*d* includes a body that defines a plurality of fastener openings.

The fastener openings defined by the bodies of the walls 2704*b*, 2704*c*, and 2704*d*, respectively, are each configured to connect one end of the trolley connector 2704 to the trolley connector bracket 2734 of the first trolley 2720 and connect an opposing end of the trolley connector 2704 to a trolley connector bracket of the second trolley 2722.

The gate receiver and engager 2726 is configured to receive and engage the downwardly extending handle or engagement member of the gate or closure member of the container 20.

The gate receiver and engager 2726 include four spaced apart upwardly extending hands 2726*a*, 2726*b*, 2726*c*, and 2726*d*. The gate receiver and engager 2726 can further include additional different and separately spaced apart upwardly extending locking engager hands (not shown). The four spaced apart upwardly extending hands 2726*a*, 2726*b*, 2726*c*, and 2726*d* are each configured to receive and engage the downwardly extending handle of the gate.

More specifically, two of the upwardly extending hands 2726*a* and 2726*d* are each configured to simultaneously engage a rear side of the downwardly extending handle of the gate. Thus, when the first trolley 2720 and the second trolley 2722 move along the first track 2706 and the second track 2708, respectively, the upwardly extending hands 2726*a* and 2726*d* engage an inwardly facing surface of the downwardly extending handle of the gate and partially open the gate, and thereafter fully open the gate. This enables loose materials in the container 20 to exit the container 20 and travel through the material director 2500. Two of the upwardly extending hands 2726b and 2726c are configured to simultaneously engage a front side of the downwardly extending handle of the gate. Thus, when the first trolley 2720 and the second trolley 2722 move along the first track 2706 and the second track 2708, respectively, in an opposite direction to the direction which causes an opening of the gate, the upwardly extending hands 2726b and 2726c engage and outwardly facing surface of the downwardly extending handle of the gate to partially close the gate, and thereafter fully close the gate.

It should be appreciated that the movement of the first trolley 2720 and the second trolley 2722 move along the first track 2706 and the second track 2708, respectively, can be controlled by the trolley mover assembly controller 2732 (as further described below). Thus, the gate mover assembly 2704 can control the rate or speed and how far the gate of the container should be opened or closed. Therefore, the gate mover assembly 2704 can partially control the rate or speed at which loose materials exit the gate of the container 20 and into the material director 2500.

The upwardly extending locking engager hand is configured to engage a locking assembly of the gate assembly of the container 20. This enables the gate of the container 20 to remain locked when the gate is closed and the container 20 is positioned on the pallet receiver 2500 of the unloader 2000.

The first trolley mover assembly 2728 and the second trolley mover assembly 2730 are respectively configured to cause the first trolley 2720 and the second trolley 2722 to move along the first track 2706 and the second track 2708, respectively. It should be appreciated that first trolley mover assembly 2728 and the second trolley mover assembly 2730 are substantially similar or substantially mirror images of each other in this illustrated example embodiment. Thus, for brevity, only the first trolley mover assembly 2728 is further described below.

As best shown in FIG. 34k, the first trolley mover 2728 includes: (a) a first bracket 2728a integrally connected to and supported by the pallet support base 2706; (b) a first bracket connector 2728b lockingly connected to the first bracket 2728a; (c) a locking bracket fastener 2728c; (d) a first hydraulic piston housing 2728d integrally connected to the first bracket connector 2728b; (e) a first hydraulic piston 2728e movable in the first hydraulic piston housing 2728d; (f) a first hydraulic piston bracket connector 2728f integrally connected to the first hydraulic piston 2728e; and (g) a first hydraulic piston bracket connector fastener 2728g.

More specifically, the first bracket 2728a connects the first trolley mover assembly 2728 and the pallet support base 2306. As best shown in FIG. 34k, the first bracket 2728a includes: (a) a body 2729a integrally connected to an upper surface of the pallet support base 2306; (b) a first triangular wall 2729b integrally connected to a surface of the body 2729a of the first bracket 2928a and the upper surface of the pallet support base 2306; (c) a second triangular wall (not labeled) spaced apart from the first triangular wall 2729b and integrally connected to the surface of the body of the first bracket 2728a and the upper surface of the pallet support base 2306; and (d) a semi-cylindrical bracket 2729c integrally connected to and extending horizontally from a surface of the body 2729a of the first bracket 2728a, wherein the semi-cylindrical bracket 2729c includes a body that defines a fastener opening configured to receive a suitable fastener to connect the first bracket connector 2728b to the first bracket 2728a.

As best shown in FIG. 34K, the first bracket connector 2728b is configured to connect the first bracket 2728a and the first hydraulic piston housing 2728d. The first bracket connector 2728b includes: (a) a body having: (i) a housing engager surface 2729d configured to engage and be integrally connected to an end of the first hydraulic piston housing 2728d, (ii) a bracket engaging surface 2729e; and (iii) four planar walls (not labeled) integrally connected to the housing engager surface 2729d and the bracket engaging surface 2729e; (b) a first horizontally extending upper semi-cylindrical bracket 2729f integrally connected to and extending horizontally from the bracket engaging surface 2729e, wherein the first bracket includes a body that defines a fastener opening configured to receive the locking bracket fastener 2728c to connect the first bracket connector 2728b to the first bracket 2728a; and (c) a second horizontally extending lower semi-cylindrical bracket 2729g spaced apart from the first upper bracket 2729f and integrally connected to and extending horizontally from the bracket engaging surface 2729e, wherein the second bracket 2729g includes a body that defines a fastener opening configured to receive a suitable fastener to connect the first bracket connector to the first bracket.

The locking bracket fastener 2728c is configured to be is inserted through the fastener openings defined by the body of the first semi-cylindrical bracket 2728f of the first bracket connector 2728b, the body of the semi-cylindrical bracket 2729c of the first bracket 2728a, and the body of the second semi-cylindrical bracket 2729g of the first bracket connector 2728b to lockingly connect the first bracket connector 2728b to the first bracket 2728a. The locking bracket fastener 2728c is further lockingly secured with at least one J-pin (not labeled).

The first hydraulic piston housing 2728d is configured to receive the first hydraulic piston 2728e. The first hydraulic piston housing 2728d includes a body that has an outer cylindrical surface and an inner cylindrical surface. The inner surface defines a chamber configured to receive the first hydraulic piston 2728e and enable the first hydraulic piston 2728e to be movable. The first hydraulic piston housing 2728d further includes four spaced apart horizontally extending housing support rods (not labeled) connected to the housing engager surface 2729d of the first bracket connector 2728b and an opposing surface (not labeled).

The first hydraulic piston 2728e is configured to be movable in the first hydraulic piston housing 2728d to cause the first trolley 2720 to move along the first track 2706.

The first hydraulic piston bracket connector 2728f is configured to connect the first hydraulic piston 2728e to the first trolley 2720. As best shown in FIG. 34K, the first hydraulic piston bracket connector 2728f includes: (a) a body 2729h having a cylindrical inner surface that defines a channel configured to engage and connect with an end of the first hydraulic piston 2728e; (b) a first horizontally extending semi-cylindrical bracket 2729i integrally connected to and extending from the body 2729h; and (c) a second horizontally extending semi-cylindrical bracket 2729j spaced apart from the first semi-cylindrical bracket 2729i and integrally connected to and extending from the body 2729h.

The first bracket 2729i of the first hydraulic piston bracket connector 2728f includes a body that defines a fastener opening configure to receive the first hydraulic piston bracket connector fastener 2728g to lockingly connect the first hydraulic piston connector 2728*f* to the first trolley 2720. The second bracket 2729*j* of the first hydraulic piston bracket connector 2728*f* includes a body that defines a fastener opening configure to receive the first hydraulic piston bracket connector fastener 2728*g* to lockingly connect the first hydraulic piston connector 2728*f* to the first trolley 2720.

The first hydraulic piston bracket connector fastener 2728*g* is configured to be is inserted through the fastener openings defined by the body of the first bracket 2729*i* of the first hydraulic piston bracket connector 2728*f*, the body of the semi-cylindrical bracket 2720*i* of the first trolley 2720, and the body of the second semi-cylindrical bracket 2729*j* of the first hydraulic piston bracket connector 2728*f* to lockingly connect the first hydraulic piston bracket connector 2728*f* to the first trolley 2720. The first hydraulic piston bracket connector fastener 2728*g* is further lockingly secured with at least one J-pin (not shown).

In this illustrated example embodiment, the first hydraulic piston 2728*e* and a second hydraulic piston of the second trolley mover assembly 2730 are simultaneously controlled and co-act or operate together to simultaneously move the first and second trolleys 2720 and 2722 respectively along the first and second tracks 2706 and 2708. This enables the gate mover assembly 2704 to control how far to open or close the gate of the container 20. This also enables the gate mover assembly 2704 to control the rate or speed at which loose materials exits the gate of the container 20 and into the material director 2500 of the unloader 2000.

Figure 34M:
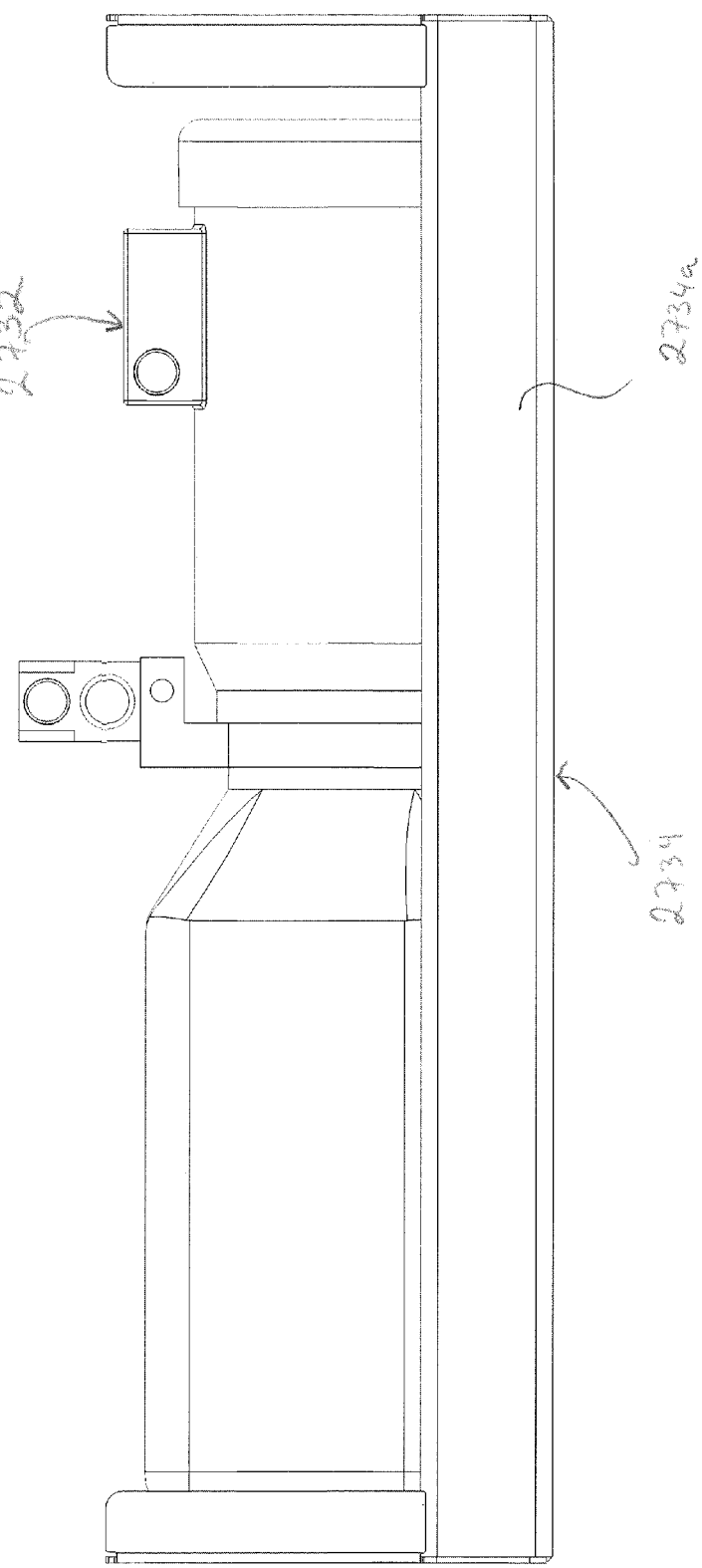
FIG. 34M is a front view the trolley mover assembly controller of FIG. 34L supported by the trolley mover assembly housing.

Referring now to FIGS. 34L, 34M, and 34N, the trolley mover assembly controller 2732 is configured to control the first trolley mover assembly 2728 and the second trolley mover assembly 2730. The trolley mover assembly controller 2732 is supported by a trolley mover assembly housing 2734. The trolley mover assembly housing 2734 is integrally connected to and extends downwardly from the secondary pallet support base stabilizers 2318 and 2320.

More specifically, as best shown in FIG. 35N, the trolley mover assembly controller housing 2734 includes: (a) a first housing base 2734*a*; (b) a second housing base 2734*b* spaced apart from the first housing base 2734*a*; (c) a first housing base bracket 2734*c* integrally connected to the first housing base 2734*a* and the second housing base 2734*b*, wherein the first housing base bracket 2734*c* includes a body that defines a plurality of fastener openings each configured to receive a suitable fastener to connect the trolley mover assembly controller 2732 to the body of the first housing base bracket 2734*c*; (f) a second housing bracket 2734*d* spaced apart from the first housing bracket 2734*c* and integrally connected to the first housing base 2734*a* and the second housing base 2734*b*, wherein the second housing base bracket 2734*d* includes a body that defines a plurality of fastener openings each configured to receive a suitable fastener to connect the trolley mover assembly controller 2732 to the body of the second housing base bracket 2734*d*; (g) a first vertically extending bracket 2734*e* including: (i) a vertically extending generally V-shaped wall 2735*a* integrally connected to the first housing base 2734*a* and the second housing base 2734*b*, wherein the V-shaped wall 2735*a* includes a body that defines fasteners openings each configured to receive suitable fasteners; (ii) a first inwardly extending wall 2735*b* integrally connected to one end of the V-shaped wall 2735*a* and the first housing base 2734*a*; (iii) a second inwardly extending wall 2735*c* internally connected to an opposing end of the V-shaped wall 2735*a* and the second housing base 2734*b*; and (iv) an inwardly extending base wall (not shown) integrally connected to the V-shaped wall 2735*a* and configured to partially support the trolley mover assembly controller 2732; (h) a second vertically extending bracket 2734*f* spaced apart from the first vertically extending bracket 2734*e* and including: (i) a vertically extending V-shaped wall 2735*d* integrally connected to the first housing base 2734*a* and the second housing base 2734*b*, wherein the V-shaped wall 2734*a* includes a body that defines fasteners openings each configured to receive suitable fasteners; (ii) a first inwardly extending wall 2735*f* integrally connected to one end of the V-shaped wall 2735*a* and the first housing base 2734*a*; and (iii) a second inwardly extending wall 2735*g* internally connected to an opposing end of the V-shaped wall 2735*a* and the second housing base 2734*b*; and (iv) an inwardly extending base wall 2735*h* integrally connected to the V-shaped wall 2735*d* and configured to partially support the trolley mover assembly controller 2732; (I) a first connecting bracket (not shown) including: (i) a first vertically extending wall integrally connected to the first wall of the first vertically extending bracket and the second wall of the fourth vertically extending bracket via a suitable fastener; and (ii) a second horizontally extending wall integrally connected to the first vertically extending wall and integrally connected to a bottom surface of the pallet support base stabilizer 2318; and (j) a second connecting bracket including: (i) a first vertically extending wall integrally connected to the second wall of the second vertically extending bracket and the first wall of the third vertically extending bracket via a suitable fastener; and (ii) a second horizontally extending wall integrally connected to the first vertically extending wall and integrally connected to a bottom surface of the pallet support base stabilizer 2320.

In this illustrated example embodiment, the trolley mover assembly controller 2732 is connected to and supported by the first housing base bracket 2734*c* and the second housing base bracket 2734*d* via suitable fasteners. Additionally, in this illustrated example embodiment, the trolley mover assembly controller housing 2734 is configured to support a heater (not shown), which can be adjacent to the trolley mover assembly controller 2732 and configured to provide heat to the trolley mover assembly controller 2732. More specifically, the heater can provide heat to the trolley mover assembly controller 2732 so that hydraulic fluid of the trolley mover assembly controller 2732 can be maintained in a fluidized state (regardless of relatively cold temperatures) to move suitably through various channels, ports, etc. to cause the first trolley mover assembly 2730 and the second trolley mover assembly 2732 to move the first trolley 2720 and the second trolley 2722 along the first track 2706 and the second track 2708, respectively.

It should be appreciated that in this illustrated example embodiment, the components of the track assembly 2702 are made of a suitable material, such as steel. It should further be appreciated that the first trolley 2720 and the second trolley 2722 (except the first, second, and third wheels 2720*j*, 2720*k*, and 2720*l* of the first trolley 2720 and the first, second, and third wheels (each not labeled) of the second trolley 2722) are made of a suitable material, such as steel. It should further be appreciated that the first, second, and third wheels 2720*j*, 2720*k*, and 2720*l* of the first trolley 2720 and the first, second, and third wheels (each not labeled) of the second trolley 2722 are made of a suitable material, such as a plastic or rubber. It should further be appreciated that the trolley connector 2724; the gate receiver and engager 2726; the first bracket 2728*a* of the first trolley mover 2728; the first bracket connector 2728*b* of the first trolley mover 2728 (and likewise, a first bracket (not labeled) of the second trolley mover 2730 and a first bracket connector (not labeled) of the second trolley mover 2730; and the trolley mover assembly controller housing 2734 are each made of a suitable material, such as steel.

The Rack

The illustrated example rack 5000 of the present disclosure is configured to support the supporters 2100, 3100, and 4100 of the unloaders 2000, 3000, and 4000 (as best shown in FIG. 28). More specifically, the rack 5000 is configured to support the supporters 2100, 3100, and 4100 at a suitable height above a grating assembly (further described below) of the rack 5000. This enables the material directors 2500, 3500, and 4500 to be suitably positioned so that these material directors can cooperate to release materials that exit the gates of the containers 20, 30, and 40 into a material blender beneath the pallet receiver 3300 of the unloader 3000.

Figure 35A:
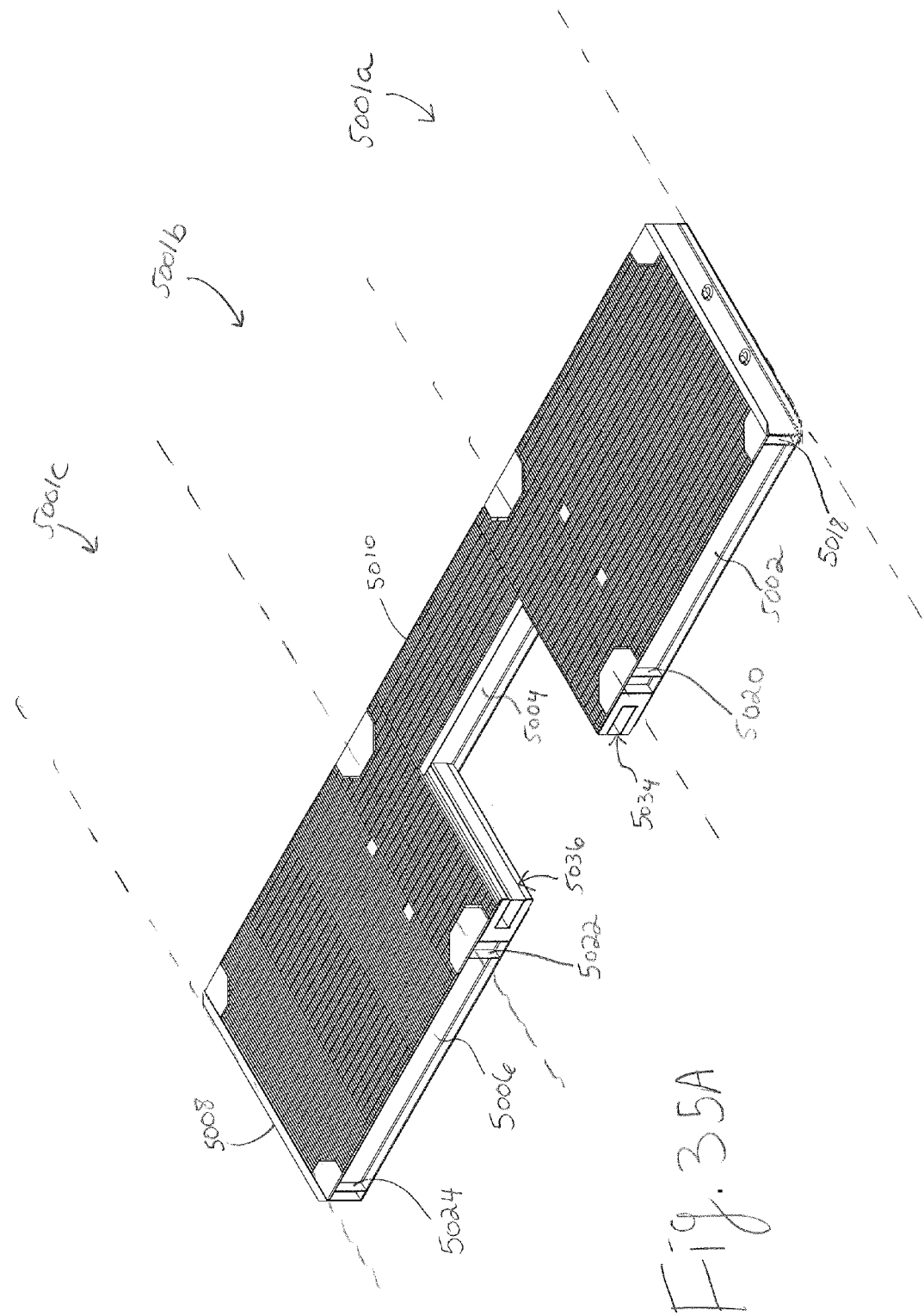
FIG. 35A is a perspective view of the rack of FIG. 29, showing dual and single leg stands and unloader stabilizers removed.
Figure 35B:
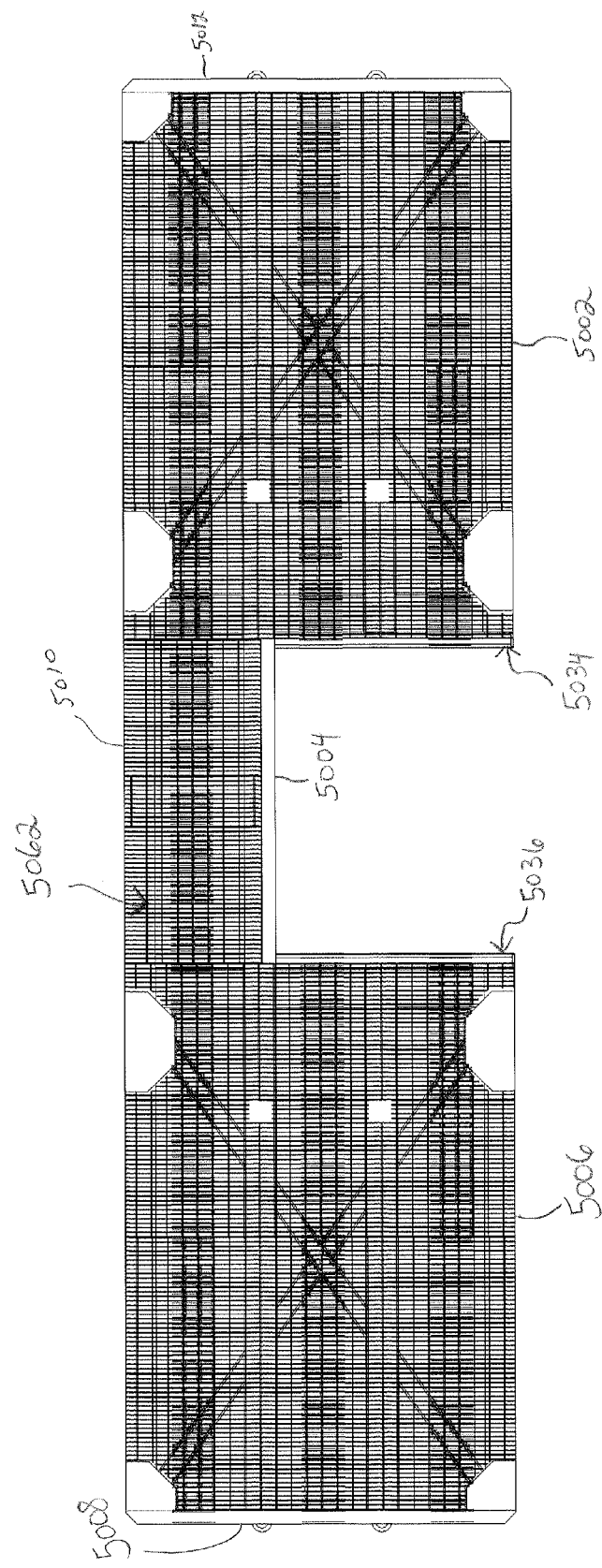
FIG. 35B is a top view of the rack of FIG. 35A, showing the dual and single leg stands and the unloader stabilizers removed.

More specifically, as shown in FIGS. 35A to 35J, and particularly FIG. 35A, the rack 5000 is generally U-shaped. The rack includes three sections: 5001a, 5001b, and 5001c. The section 5001a is configured to position the unloader 2000 relative to the unloaders 3000 and 4000. The section 5001b is configured to position the unloader 3000 relative to the unloaders 2000 and 4000. The section 5001c is configured to position the unloader 4000 relative to the unloaders 2000 and 3000. The U-shaped rack 5000 includes an open area configured to receive a truck and/or a material blender that is suitably positioned underneath and/or adjacent to the material directors 2500, 3500, and 4500 (as best shown in FIGS. 17, 18, and 19) so that loose materials can travel through the gate of the containers 20, 30, and 40 (when the gate is at least partially opened) and into the material blender.

More specifically, as shown in FIGS. 35A to 35J, the rack 5000 includes: (a) base beams 5002, 5004, 5006, 5008, 5010, 5012, 5014, and 5016; (b) supporting brackets 5018, 5020, 5022, and 5024 integrally connected to base beams 5002 and 5006; (c) a plurality of diagonally extending braces 5026, 5028, 5030, and 5032 integrally connected to base beams 5002, 5006, and 5010 and positioned through openings that are defined by a body of the base beams 5004, 5014, and 5016 (as further described below); (d) forklift tine receiver assemblies 5034 and 5036 integrally connected to base beams 5002, 5004, 5006, 5010, 5014, and 5016 and positioned through opening that are defined by the body of the base beam 5004 (as further described below); (e) dual leg stands 5038, 5040, 5042, and 5044 integrally connected to base beams 5002, 5006, and 5010, diagonally extending braces 5026, 5028, 5030, and 5032, and forklift tine receiver assemblies 5034 and 5036; (f) single leg stands 5046, 5048, 5050, and 5052 integrally connected to base beams 5002, 5006, 5008, 5010, and 5012 and diagonally extending braces 5026, 5028, 5030, and 5032; (g) unloader stabilizers 5054 and 5056 integrally connected to base beams 5004, 5014, and 5016; (h) a plurality of D-rings 5060a, 5060b, 5060c, and 5060d integrally connected to base beams 5008 and 5012; and (i) a top grating assembly 5062 removably positioned on a top surface of the base beams 5002, 5004, 5006, 5008, 5010, 5012, 5014, and 5016, a top surface of the diagonally extending braces 5026, 5028, 5030, and 5032, and a top surface of the forklift tine receiver assemblies 5034 and 5036.

It should be appreciated that in alternative example embodiments, the unloader stabilizers 5054 and 5056 can be connected to other components of the unloader 2000, 3000, and/or 4000, such as the legs of one of the unloaders.

The base beams 5002, 5004, 5006, 5008, 5010, 5012, 5014, and 5016 are configured to co-act together to support the dual leg stands 5038, 5040, 5042, and 5044; the single leg stands 5046, 5048, 5050, and 5052; and thus the unloaders 2000, 3000, and 4000 and the containers 20, 30, and 40 the unloaders each respectively support. Each base beam includes a top surface and a bottom surface. The bottom surfaces of the base beams are configured to engage a substrate on which the rack 5000 rests.

It should be appreciated that base beams 5002, 5004, 5006, 5008, 5010, 5012, 5014, and 5016 are substantially similar in this illustrated example embodiment. Thus, for brevity, only the base beam 5002 is further described in detail. As best shown in FIG. 35E, the base beam 5002 includes: (a) an elongated vertically extending wall 5002a; (b) an elongated top wall 5002b integrally connected to and extending horizontally from the vertically extending wall 5002a; and (c) an elongated bottom wall 5002c spaced apart from the top wall 5002b and integrally connected to and extending horizontally from the vertically extending wall 5002a.

Figure 35C:
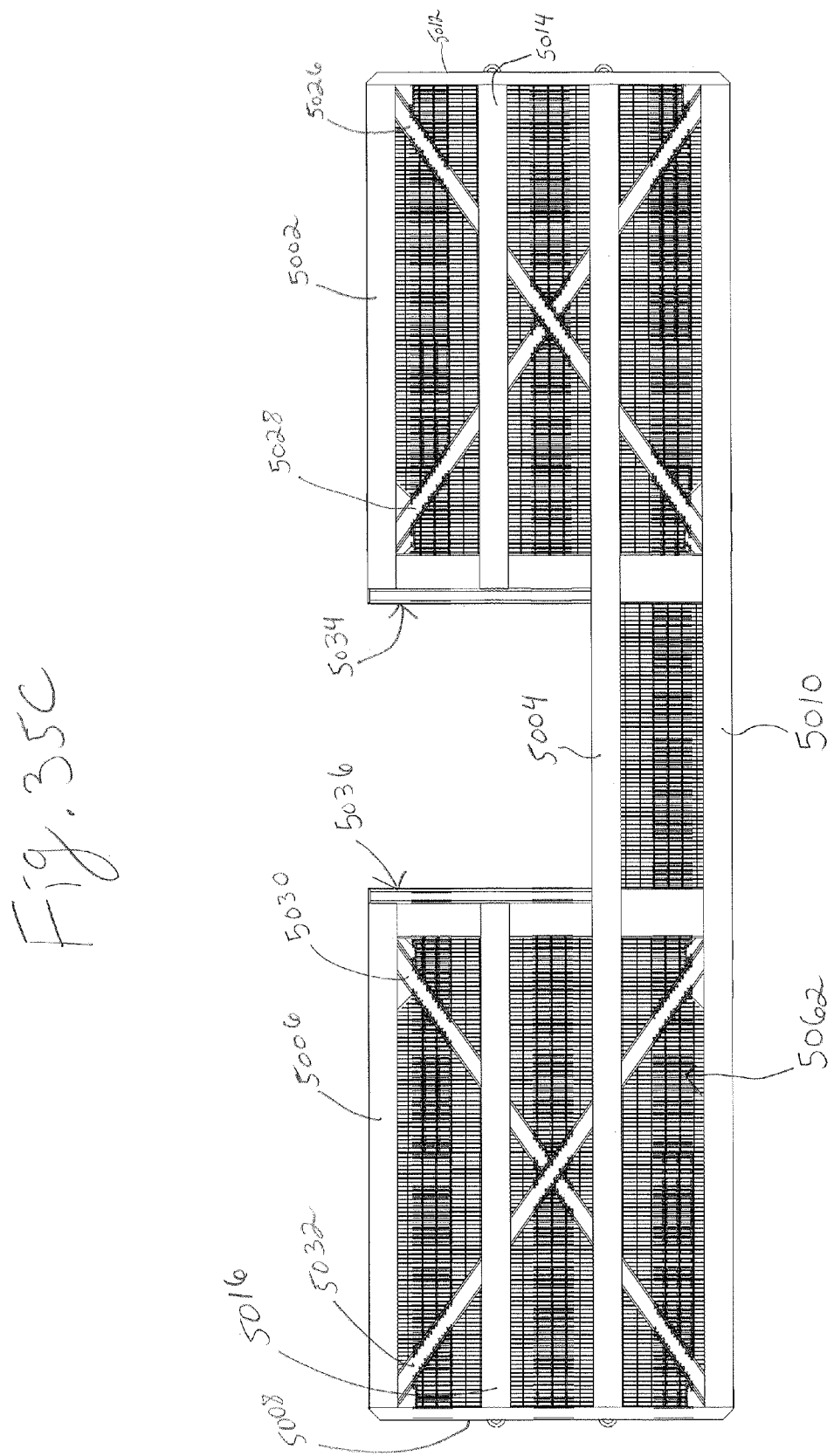
FIG. 35C is a bottom view of the rack of FIG. 35A.
Figure 35E:
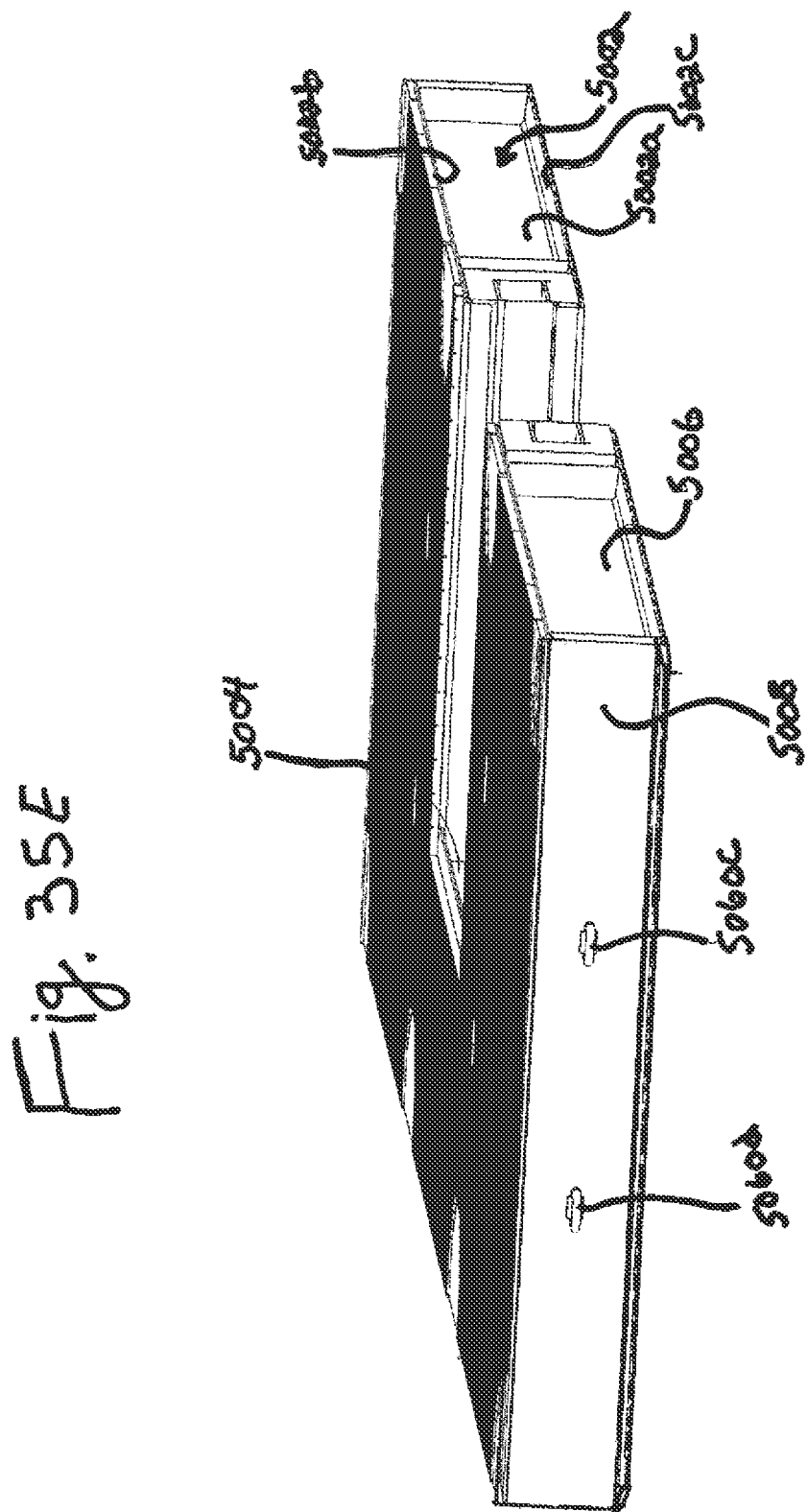
FIG. 35E is a right perspective view of the rack of FIG. 35A, showing the dual and single leg stands and the unloader stabilizers removed.

As best shown in FIG. 35C, in this illustrated example embodiment, base beams 5004, 5014, and 5016 each include a body (not labeled). Each body of the base beams 5004, 5014 and 5016 define a plurality of openings. Each opening is configured to receive a portion of the diagonally extending braces 5026, 5028, 5030, and 5032. Additionally, in this illustrated example embodiment, the body of the base beam 5004 defines a plurality of different openings each configured to receive a portion of the forklift tine receiver assemblies 5034 and 5036.

The supporting brackets are each configured to provide additional support for the base beams 5002 and 5006 to assist in supporting the dual leg stands 5038, 5040, 5042, and 5044; the single leg stands 5046, 5048, 5050, and 5052; and thus the unloaders 2000, 3000, and 4000 and the containers 20, 30, and 40 the unloaders each respectively support.

It should be appreciated that the supporting brackets 5018, 5020, 5022, and 5024 are substantially similar in this illustrated example embodiment. Thus, for brevity, only the supporting bracket 5018 is further described below.

As best shown in FIG. 35A, the supporting bracket 5018 includes: (a) a first vertically extending wall (not labeled); (b) a second vertically extending wall (not labeled) spaced apart from the first wall; (c) a third vertically extending wall (not labeled) integrally connected to the first wall and second wall; (d) a fourth vertically extending wall (not labeled) spaced apart from the third wall and integrally connected to the first wall and second wall; (e) a top wall (not labeled) integrally connected to the first wall, second wall, third wall, and fourth wall; and (f) a bottom wall (not labeled) spaced apart from the top wall and integrally connected to the first wall, second wall, third wall, and fourth wall.

The top wall of the supporting bracket 5018 is integrally connected to the top wall 5002b of the base beam 5002. The bottom wall of the supporting bracket 5018 is integrally connected to the bottom wall 5002c of the base beam 5002.

The second support 5020 bracket is spaced apart from the first support bracket 5018 and is integrally connected to the top wall 5002b and bottom wall 5002c of the base beam 5002.

The third support bracket 5022 and the fourth support bracket 5024 are spaced apart from one another and are integrally connected to the top wall and bottom wall of the third base beam 5006.

The forklift tine receiver assemblies 5034 and 5036 are each configured to receive a forklift tine of a forklift and assist the forklift in lifting and moving the rack 5000, and/or the unloaders 2000, 3000, and 4000 when each unloader is connected to and supported by the rack from a first position to a plurality of second positions.

As best shown in FIGS. 35C and 34G, in this illustrated example embodiment, one end of the forklift tine receiver assembly 5034 is integrally connected to one end of the base beam 5002. A middle portion of the forklift tine receiver assembly 5034 is integrally connected to one end of the base beam 5014. A different middle portion of the forklift tine receiver assembly 5034 is positioned through the opening defined by the body of the base beam 5004. An opposing end of the forklift tine assembly is integrally connected to the base beam 5010.

Likewise, in this illustrated example embodiment, one end of the forklift tine receiver assembly 5036 is integrally connected to one end of the base beam 5006. A middle portion of the forklift tine receiver assembly 5036 is integrally connected to one end of the base beam 5016. A different middle portion of the forklift tine receiver assembly 5036 is positioned through the opening defined by the body of the base beam 5004. An opposing end of the forklift tine assembly is integrally connected to the base beam 5010.

It should be appreciated that the forklift tine receiver assemblies 5034 and 5036 are substantially similar in this illustrated example embodiment. Thus, for brevity, only the forklift tine receiver assembly 5036 is further described below.

As best shown in FIG. 35F, the forklift tine receiver assembly 5036 includes: (a) a forklift tine receiver body 5036*a*; (b) a first elongated bar 5036*b* integrally connected to the forklift tine receiver body 5036*a*; (c) a second elongated bar 5036*c* spaced apart from the first elongated bar 5036*b* and integrally connected to the forklift tine receiver body 5036*a*; and (d) a cover plate 5036*d* integrally connected to the base beam 5002, the forklift tine receiver body 5036*a*, one end of the first elongated bar 5036*b*, and one end of the second elongated bar 5036*c*.

The forklift tine receiver body 5036*a* includes four vertically extending walls integrally connected to each other (each not labeled). An inner surface of each wall defines a channel that is configured to receive a forklift tine of a forklift so that the forklift can move the rack 5000, and/or the unloaders 2000, 3000, and 4000 when each unloader is connected to and supported by the rack from a first position to a plurality of second positions.

The first elongated bar 5036*b* and the second elongated bar 5036*c* are each configured to provide structural support to the forklift tine receiver assembly 5036 and provide suitable spacing so that the cover plate 5036*d* is connected to the proper portions of the base beam 5006 and the forklift tine receiver assembly 5036.

As best shown in FIG. 35F, the cover plate includes a frontwardly facing wall 5036*e* that is generally C shaped. This wall 5036*e* is integrally connected to the top wall (not labeled) of the base beam 5006, the bottom wall (not labeled) of the base beam 5006, the forklift tine receiver body 5036*a*, one end of the first elongated bar 5036*b* and one end of the second elongated bar 5036*c*.

As best shown in FIG. 35F, the cover plate further includes a side wall 5036*f* The side wall 5036*f* is integrally connected to the top wall (not labeled) of the base beam 5006, the bottom wall (not labeled) of the base beam 5006, and the vertically extending wall (not labeled) of the base beam 5006.

The dual leg stands 5038, 5040, 5042, and 5044 are each configured to support and be removably and securely connected to the one leg of one unloader and another adjacent leg of an adjacent unloader.

It should be appreciated that the dual leg stands 5038, 5040, 5042, and 5044 are substantially similar in this illustrated example embodiment. Thus, for brevity, only the dual leg stand 5038 is further described below.

Figure 35G:
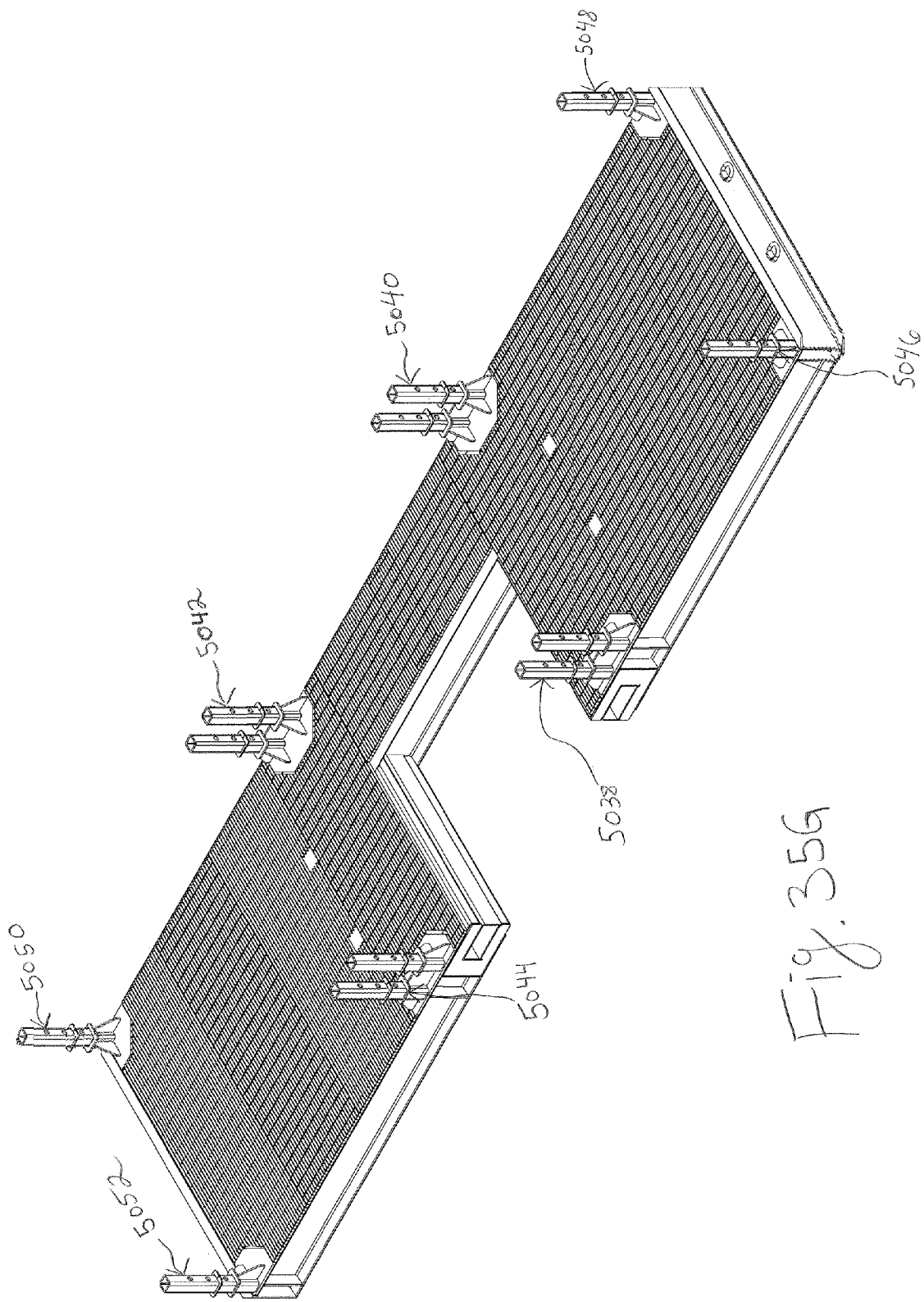
FIG. 35G is a perspective view of the rack of FIG. 35A, showing the dual and single leg stands.

As best shown in FIGS. 35G and 35H, the dual leg stand 5038 stand includes: (a) a pentagonal shaped base 5038*a* integrally connected to a top surface of the base beams 5002, a top surface of the diagonally extending braces 5028, and a top surface of the forklift tine receiver assembly 5034; (b) a first leg supporter 5038*b* integrally connected to the base 5038*a*; (c) a second leg supporter 5038*c* spaced apart from the first leg supporter 5038*b* and integrally connected to the base 5038*a*; (d) support brackets 5038*d*, 5038*e*, 5038*f*, and 5038*g* integrally connected to the first leg supporter 5038*a*, the second leg supporter 5038*b*, and the base 5038*a*; (e) a leg supporter connector bracket 5038*h* integrally connected to the first leg supporter 5038*a*, the second leg supporter 5038*b* and the base 5038*a*; and (f) a first leg engager platform 5038*i* integrally connected to the first leg supporter 5038*b*, the support brackets 5038*d* and 5038*e*, and the leg supporter connector bracket 5038*h*; and (g) a second leg engager platform 5038*j* integrally connected to the second leg supporter 5038*c*, the support brackets 5038*f* and 5038*g*, and the leg supporter connector bracket 5038*h*.

More specifically, the first leg supporter 5038*b* includes four vertically extending walls integrally connected to each other (each not labeled). Each wall is configured to be positioned in a channel defined by a leg of an unloader when the unloader is positioned and securely connected to the dual leg stand 5038 of the rack 5000. A body of one of the walls of the first leg supporter 5038*b* and a body of an opposing wall of the first leg supporter 5038*b* each defines plurality of openings configured to receive a pin or locking apparatus. This locking apparatus is configured to be positioned in these openings to lockingly secure a leg of an unloader to the first leg supporter 5038*b* when the unloader is positioned and securely connected to the dual leg stand 5038 of the rack 5000.

Likewise, the second leg supporter 5038*c* includes four vertically extending walls integrally connected to each other (each not labeled). Each wall is configured to be positioned in a channel defined by a leg of an unloader when the unloader is positioned and securely connected to the dual leg stand 5038 of the rack 5000. A body of one of the walls of the second leg supporter 5038*c* and a body of an opposing wall of the second leg supporter 5038*c* each defines plurality of openings configured to receive a pin or locking apparatus. This locking apparatus is configured to be positioned in these openings to lockingly secure a leg of an unloader to the second leg supporter 5038*c* when the unloader is positioned and securely connected to the dual leg stand 5038 of the rack 5000.

It should be appreciated that in alternative example embodiments, the legs of the supporter can include a telescoping mechanism that co-acts with the dual leg stand(s) of the rack.

The first and second leg engager platforms 5038*i* and 5038*j* are each configured to engage bottom edges of a leg of an unloader when the unloader is positioned on the dual leg stand 5038 of the rack 5000. This enables the legs of the unloader to be positioned on the rack 5000 and be supported by the dual leg stand 5038, and thus the rack 5000.

The single leg stands 5046, 5048, 5050, and 5052 are each configured to support and be removably and securely connected to respective legs of one unloader.

It should be appreciated that the single leg stands 5046, 5048, 5050, and 5052 are substantially similar in this illustrated example embodiment. Thus, for brevity, only the single leg stand 5046 is further described in detail.

As best shown in FIGS. 35G and 34I, the single leg stand 5046 includes: (a) a base 5046a integrally connected to the base beams 5002 and 5012 and the diagonally extending brace 5026; (b) a leg supporter 5046b integrally connected to the base 5046a; (c) support brackets 5046c and 5046d integrally connected to the leg supporter 5046b and the base 5046a; and (d) a leg engager platform 5046e integrally connected to the leg supporter 5046b and the support brackets 5046c and 5046d.

More specifically, the leg supporter 5046b includes four vertically extending walls integrally connected to each other (each not labeled). Each wall is configured to be positioned in a channel defined by a leg of an unloader when the unloader is positioned and securely connected to the single leg stand 5046 of the rack 5000. A body of one of the walls of the leg supporter 5046b and a body of an opposing wall of the leg supporter 5046b each defines plurality of openings configured to receive a locking pin or locking apparatus. This locking apparatus is configured to be positioned in these openings to lockingly secure a leg of an unloader to the leg supporter 5046b when the unloader is positioned and securely connected to the single leg stand 5046 of the rack 5000.

It should be appreciated that in alternative example embodiments, the legs of the supporter can include a telescoping mechanism that co-acts with the single leg stand(s) of the rack.

The leg engager platform 5046e is configured to be engaged by the bottom edges of a leg of an unloader when the unloader is positioned on the single leg stand 5046 of the rack 5000. This enables the leg of the unloader to be positioned on the rack 5000 and be supported by the single leg stand 5046, and thus the rack 5000.

The unloader stabilizers 5054 and 5056 are each configured to extend from a first position to a plurality of different second extended positions to stabilize the rack 5000 and the unloaders 2000, 3000, and 4000 when the containers 20, 30, and 40 are positioned on or off each respective unloader. More specifically, the unloader stabilizers 5054 and 5056 can extend past the rack 5000 and can be lowered to engage a substrate on which the rack 5000 rests. Therefore, if there is any substantial force displacement due to weight displacement when the containers are positioned on or off each respective unloader, the unloader stabilizers 5054 and 5056 can prevent the force of the weight of the container from causing the unloaders and/or the rack to move or tip over.

It should be appreciated that the stabilizers 5054 and 5056 are substantially similar in this illustrated example embodiment. Thus, for brevity, only the stabilizer 5054 is further described below.

As best shown in FIGS. 20, 22, 23, 24, 26, 27, 28, and 35J, and particularly FIG. 35J, the unloader stabilizer 5054 includes: (a) a first upwardly extending tubular base 5054a integrally connected to a top surface the base beam 5014; (b) a second upwardly extending tubular base 5054b integrally connected to a top surface of the base beam 5004; (c) an extendable bar housing 5054c integrally connected to the first and second tubular bases 5054a and 5054b; (d) an extendable bar 5054d at least partially positioned in the extendable bar housing 5054c; (e) an extendable bar stabilizer engager wall 5054e integrally connected to one end of the extendable bar 5054d; (f) a supporting bar 5054f integrally connected to an extendable bar stabilizer engager wall 5054e and a bottom surface of the extendable bar 5054d; and (g) an extendable bar stabilizer 5055 integrally connected to the extendable bar stabilizer engager wall 5054e.

The extendable bar housing 5054c includes four spaced apart integrally connected walls. Each wall includes a body, wherein one of the bodies defines a plurality of openings configured to receive a locking pin or locking apparatus. This locking apparatus is configured to be positioned in one of these openings to lockingly secure the extendable bar 5054d in a suitable extended position past the rack 5000.

Likewise, the extendable bar 5054d includes four spaced apart integrally connected walls. Each wall includes a body, wherein one of the bodies defines a plurality of openings configured to receive a locking pin or locking apparatus. These openings align with the openings on the extendable bar housing 5054c. This locking apparatus is configured to be positioned in one of these openings to lockingly secure the extendable bar 5054d in a suitable extended position past the rack 5000. The extendable bar 5054d is thus configured to be extendable and movable through the extendable bar housing 5054c The extendable bar stabilizer 5055 is configured to be movable so that a base of the extendable bar stabilizer 5055 can engage a substrate on which the rack 5000 rests. This enables the extendable bar, and therefore the unloader stabilizer 5054, to prevent the rack 5000 and unloaders 2000, 3000, and 4000 from moving or tipping when the containers are positioned on or off of the unloaders.

The extendable bar stabilizer 5055 includes: (a) a housing 5055a; (b) a movable tubular body 5055b at least partially positioned in the housing 5055a and integrally connected to the extendable bar stabilizer engager wall 5054e; (c) a movable base 5055c integrally connected to the tubular body 5055b; (d) a crank or handle 5055d suitably connected to the tubular body 5055b and the housing 5055a so that when the handle 5055d is rotated, the tubular body 5055b and the base 5055c move upwardly or downwardly; (e) a cap 5055e integrally connected to the tubular body 5055b; and (f) a locking pin 5055f integrally connected to the base 5055c. The extendable bar stabilizer 5055 can also include a securing member (not shown) configured to secure the base 5055c to the substrate with which the base 5055c engages. This can assist the unloader stabilizer in stabilizing the unloader and/or the rack.

As described above, the extendable bar stabilizer 5055 is configured to be movable so that the base 5055c engages the substrate on which the rack 5000 rests. Thus, when the extendable bar 5054d is extended to a suitable length past the rack 5000, the handle 5055d is rotated to cause the tubular body 5055b and the base 5055c to move downwardly so that the base 5055c engages the substrate, and the base is secured by force to the substrate, the unloader stabilizer 5054 (and also the unloader stabilizer 5056) can suitably prevent the force of the weight of the container from causing the unloaders and/or the rack to move or tip when the containers are positioned on or off the unloaders.

The grating assembly 5062 is configured to collect or capture material that leaks out of the containers or the material directors. The grating assembly 5062 can be made of rubber or another suitable material. The grating assembly 5062 can be made in one section or more than one section. The grating assembly 5062 can be removable from the rack 5000.

It should be appreciated that in this illustrated example embodiment, the base beams 5002, 5004, 5006, 5008, 5010, 5012, 5014, and 5016; the supporting brackets 5018, 5020, 5022, and 5024; the plurality of diagonally extending braces 5026, 5028, 5030, and 5032; the components of the forklift tine receiver assemblies 5034 and 5036; the components of the dual leg stands 5038, 5040, 5042, and 5044; the components of the single leg stands 5046, 5048, 5050, and 5052; the components of the unloader stabilizers 5054 and 5056; and the plurality of D-rings 5060a, 5060b, 5060c, and 5060d are each made of a suitable material, such as steel. It should further be appreciated that the top grating assembly 5062 is made of a suitable material, such as a rubber.

Additional Features

As described above, in this illustrated example embodiment, the unloaders 2000, 3000, and 4000 each include one or more power, control, status indication, and lighting systems. These systems of each unloader are identical or substantially similar for each unloader. Thus, for brevity, only the one or more power, control, status indication, and lighting systems of the unloader 2000 is further described below. It should be appreciated that the unloader of the preset disclosure can include any suitable alternative power, control, status indication, and lighting systems.

Figure 20:
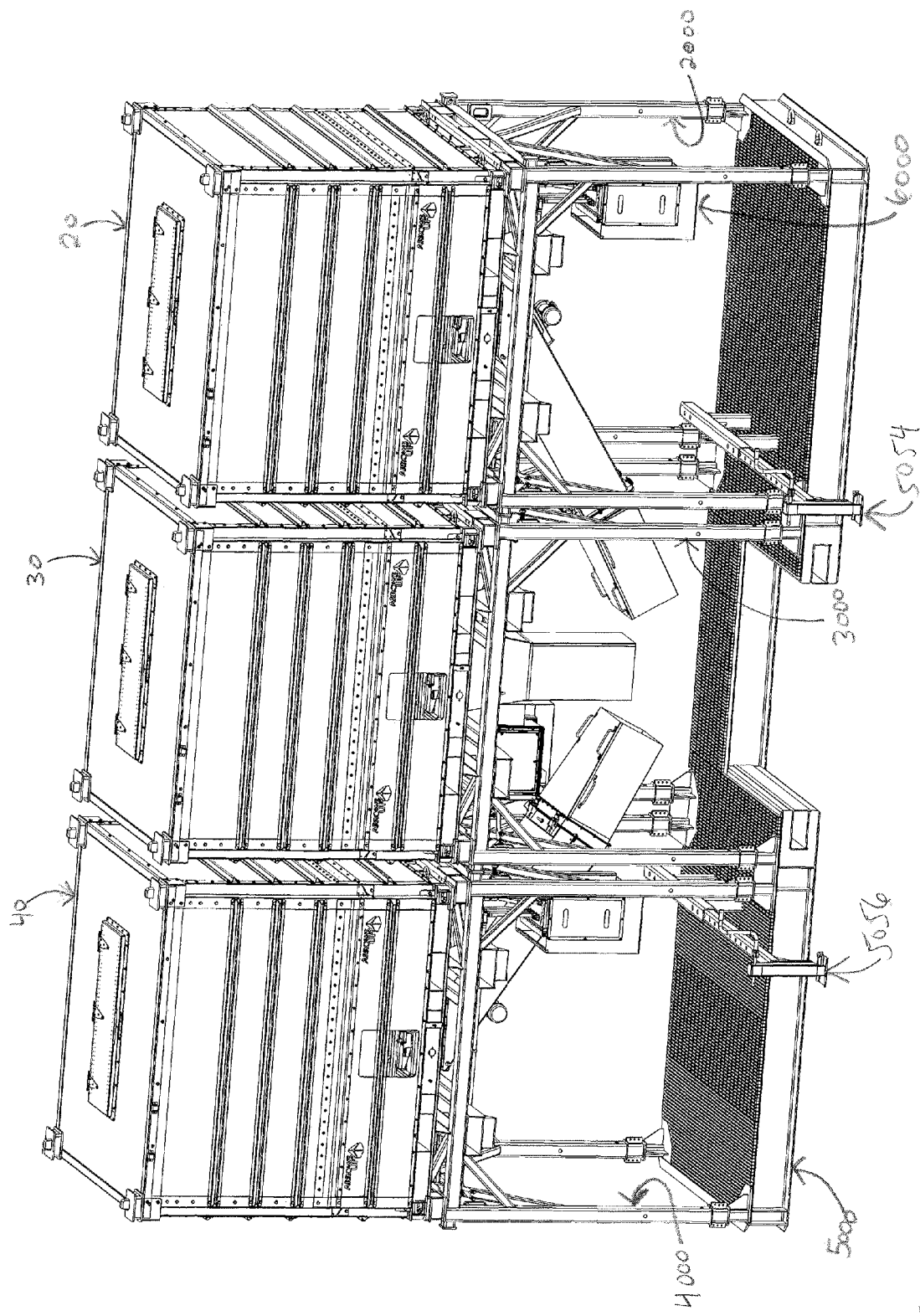
FIG. 20 is a perspective view of an alternative example embodiment of the present disclosure of three adjacently positioned bulk material shipping container unloaders, shown being supported by a rack and respectively supporting three adjacent bulk material shipping containers.
Figure 21:
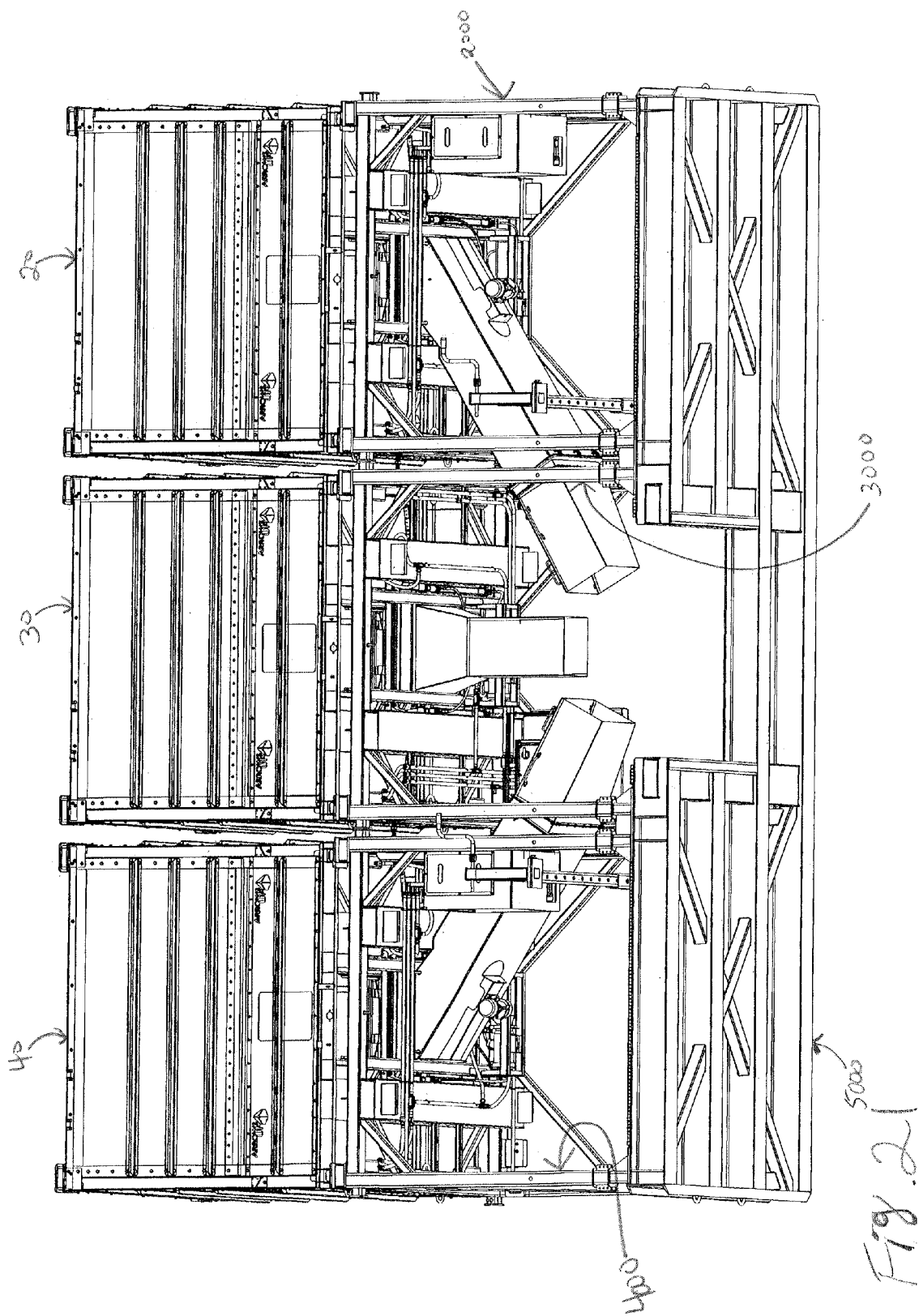
FIG. 21 is a bottom front perspective view of the three bulk material shipping container unloaders of FIG. 20, shown being supported by the rack and respectively supporting three adjacent bulk material shipping containers.
Figure 22:
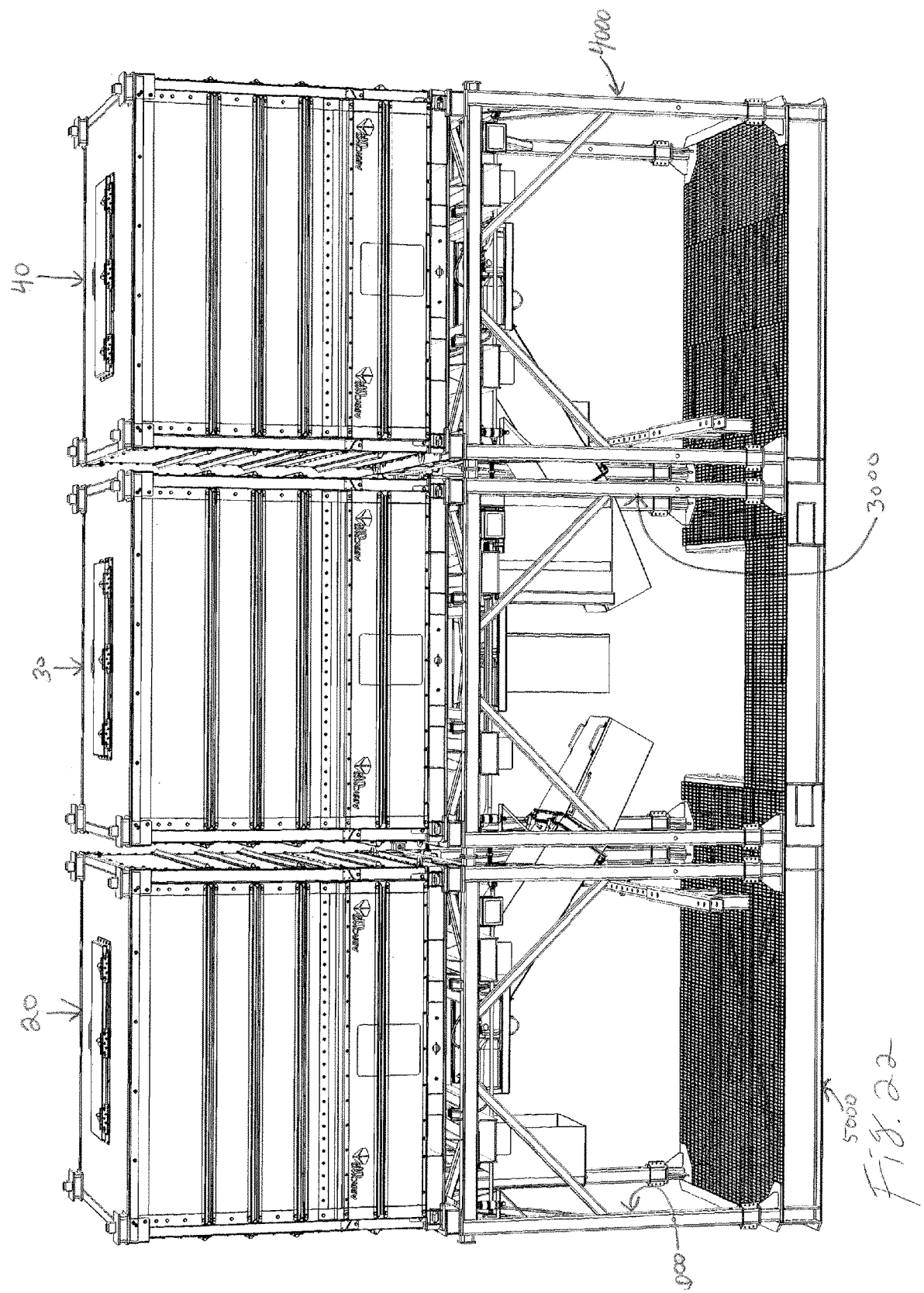
FIG. 22 is a top rear perspective view of the three bulk material shipping container unloaders of FIG. 20, shown being supported by the rack and respectively supporting three adjacent bulk material shipping containers.
Figure 23:
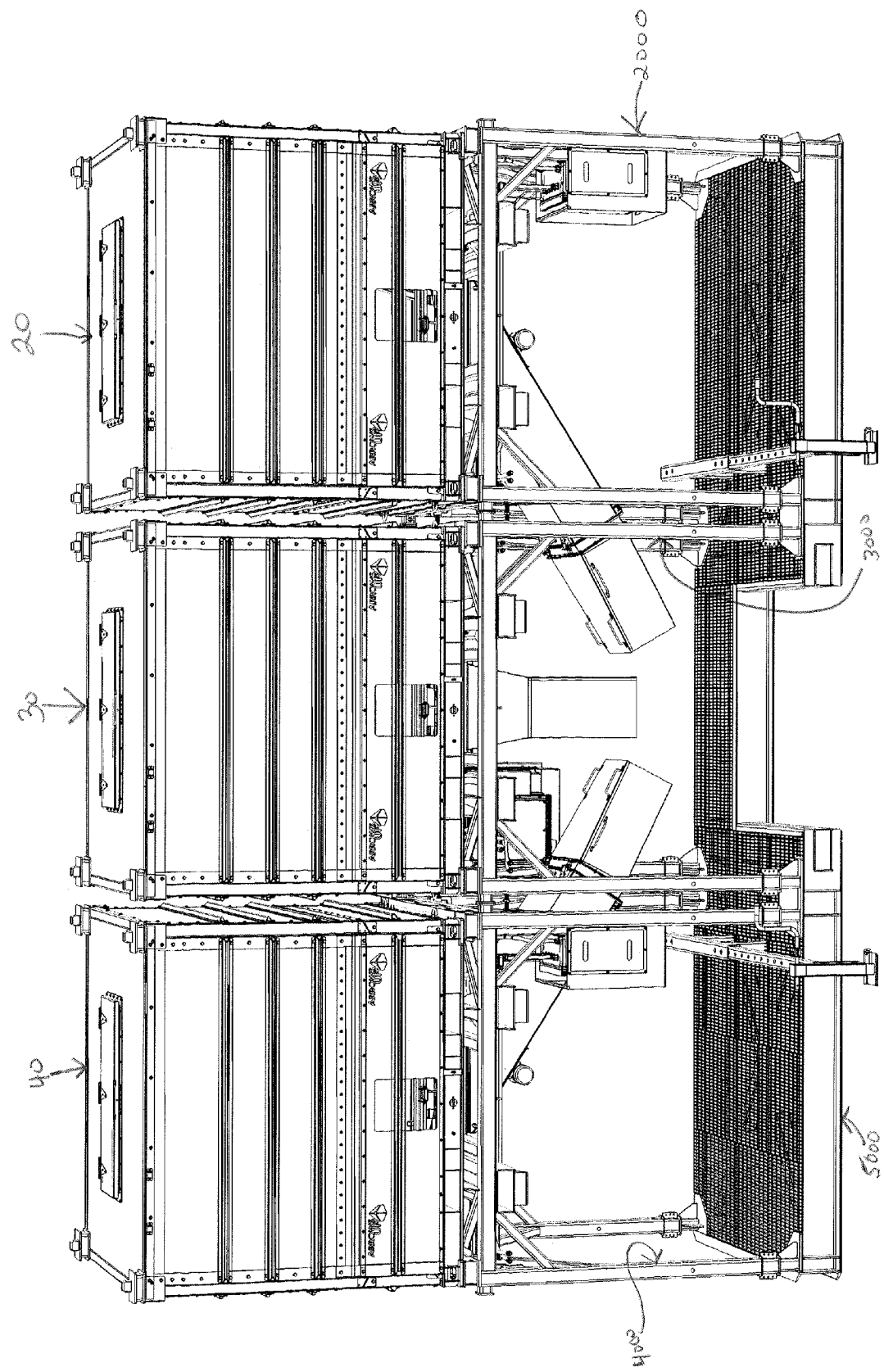
FIG. 23 is a top front view of the three bulk material shipping container unloaders of FIG. 20, shown being supported by the rack and respectively supporting three adjacent bulk material shipping containers.
Figure 24:
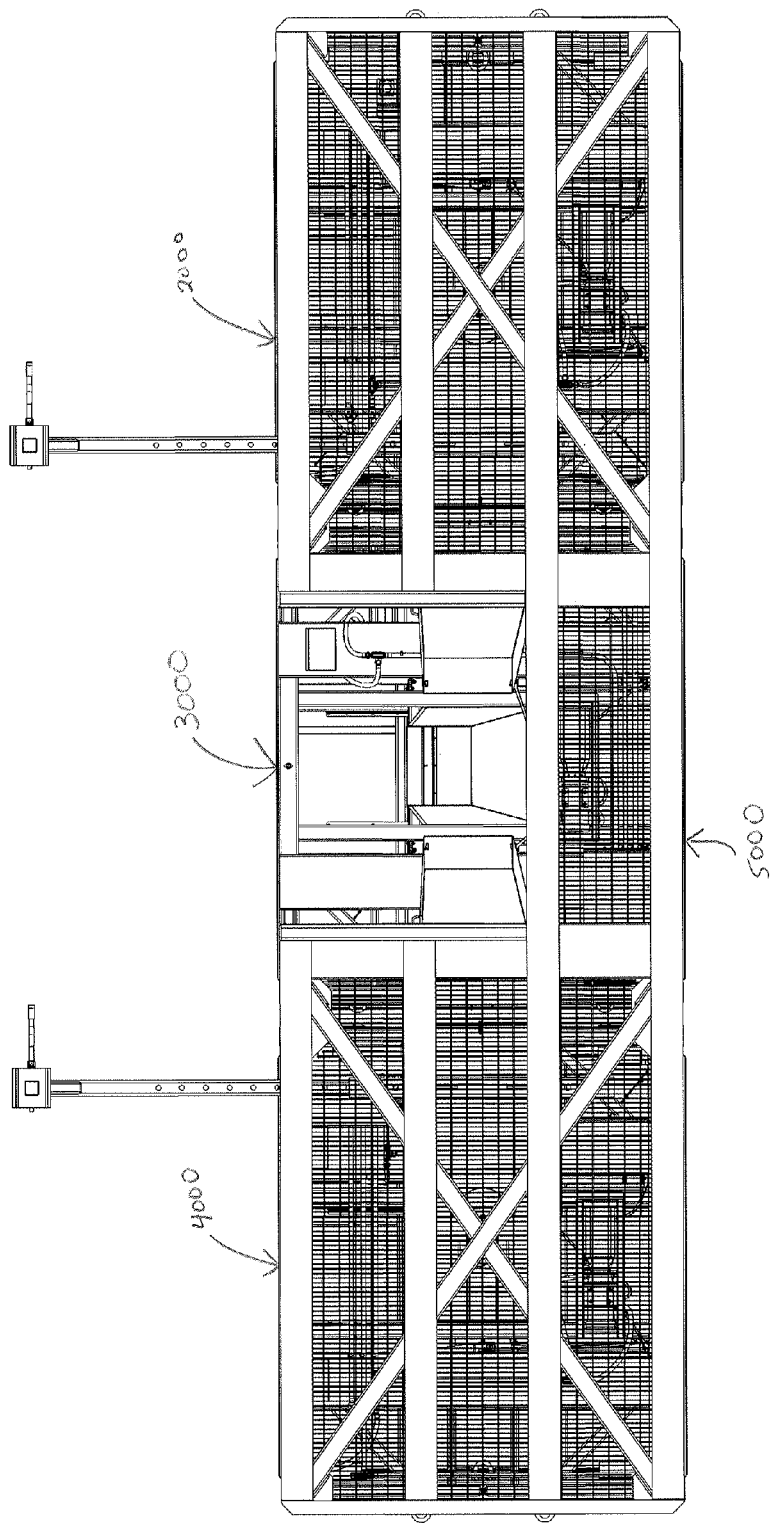
FIG. 24 is a bottom view of the three bulk material shipping container unloaders of FIG. 20, shown being supported by the rack and respectively supporting three adjacent bulk material shipping containers.

In this illustrated example embodiment, the power and control systems of the unloader 2000 are housed in a suitable control housing box 6000 that is connected to and extends downwardly from the pallet receiver 2300 and that is supported by the supporter 2100 (as shown in FIG. 20). The control housing box 6000 can include one or more heaters (not shown) and/or air conditioners (not shown) configured to regulate the temperatures for the power and control systems housed in the control housing box 6000. It should be appreciated that additional or alternative housings can be provided for the electronic and electrical components of the unloader of the present disclosure.

Generally, in this illustrated example embodiment, the power systems are configured to provide power to the control system, the status indication system (not shown), the lighting system (not shown), the weight measuring system, the heaters, the air conditioners, the vibrators, and the automatic bulk material container gate movers of the unloader 2000.

Generally, in this illustrated example embodiment, the control systems are suitably configured to control the operation of the status indication system, the lighting system, the weight measuring system, the heaters, the air conditioners, the vibrator(s), and the automatic bulk material container gate movers of the unloader 2000.

More specifically, in this illustrated example embodiment, the control systems are configured to operate the lights of the operation status indication system 2146. The status lights such as light 2146 is configured to indicate the operation statues of the unloader to an operator.

In this illustrated example embodiment, the control systems are configured to operate a different light assembly, such as an explosion proof light assembly (not shown). The explosion proof light assembly can be connected to and supported by the supporter of the unloader and/or the pallet receiver of the unloader. The explosion proof light assembly can be configured to provide lighting to the unloader and/or area surrounding the unloader, and particularly to the unloader and/or area surrounding the unloader if an explosion(s) occur.

In this illustrated example embodiment, the control systems include or are configured to operate the computing or control portion of the weight measuring system. More specifically, when the container is positioned on the unloader, the control system can operate the computing or control portion of the weight measuring system to determine the weight of the container and materials in the container as described above.

In this illustrated example embodiment, the control systems are configured to operate the automatic bulk material container gate mover. More specifically, the control system operates the automatic bulk material container gate mover to partially open the gate of the container to a plurality of second positions, fully open the gate of the container, close the gate of the container to a plurality of second positions, and/or fully close the gate of the container. The control system that operates the automatic bulk material container gate mover can further co-act or operate with the control systems that operate the computing or control portion of the weight measuring system to determine at what position the gate of the container should be opened or closed. This can enable the control of the rate at which loose materials exit the container.

In this illustrated example embodiment, the control systems are configured to operate the one or more heaters of the unloader so that hydraulic fluid of the trolley mover assembly controller is maintained at suitable operating temperatures.

In this illustrated example embodiment, the control systems are configured to operate one or more vibrators connected to the material director of the unloader. More specifically, the control systems can operate or control the frequency and/or the duration at which one or more vibrators operate.

It should be appreciated that the control systems can further be configured to operate with any other controller or processors of or controlling any of the other unloaders 3000 and 4000.

It should be appreciated that the one or more control systems can control one or more operations of the unloader that are described at simultaneous times or at different times.

It should be appreciated that in various embodiments of the present disclosure, the unloader includes one or more container identification devices (such as an RFID identification device) electrically connected to the unloader control system that enables the controller to identify a container positioned on the unloader.

It should be appreciated that in various embodiments of the present disclosure, the unloader includes one or more electronic communication devices or electronic transmitters/receivers (such as cellular communication devices) electrically connected to the unloader control system that enables the controller to communicate with remote electronic systems (such a monitoring systems).

It should be appreciated that in various embodiments of the present disclosure, the unloader includes one or more electronic display devices electrically connected to the unloader control system that enables the controller to cause a display of information regarding the unloader or container on the unloader such as one or more weight measurements or determinations.

It should be understood that modifications and variations may be effected without departing from the scope of the novel concepts of the present disclosure, and it should be understood that this application is to be limited only by the scope of the appended claims.

What is claimed:

1. An unloader for a shipping container having a pallet, a storage volume for a bulk material and a movable gate assembly having a downwardly extending handle, the unloader comprising:
   a supporter having a frame structure;
   a pallet base supported by the frame structure and configured to receive the pallet and support the shipping container in an elevated position, wherein a full shipping container is positionable onto the pallet base and an empty shipping container is removable from the pallet base without disassembly of the unloader;
   a gate moving mechanism comprising:
      a track assembly connected to and supported by the pallet base; and
      a gate mover assembly movably supported by the track assembly and having a gate receiver and engager, wherein the gate receiver and engager receives the downwardly extending handle of the shipping container via one or more upwardly extending hands and the gate receiver and engager moves the movable gate assembly to a partially or fully opened position due to movement of the gate mover assembly; and
   a material director having a first end located beneath the pallet base subjacent of the gate moving mechanism, the material director extending downwardly therefrom and terminating at a second end opposite the first end, wherein bulk material from the shipping container is dispensed into the first end and discharged from the second end of the material director.

2. The unloader of claim 1, further comprising a vibrating mechanism operable to generate a vibration for dislodging the bulk material.

3. The unloader of claim 2, wherein the vibrating mechanism is connected to and supported by the material director and operable to dislodge the bulk material travelling through the material deflector.

4. The unloader of claim 2, wherein the vibrating mechanism further comprises a control system configured to control a vibration parameter of the vibrating mechanism.

5. The unloader of claim 4, wherein the vibration parameter is chosen from a vibration frequency, a vibration duration, or a combination thereof.

6. The unloader of claim 1, wherein the material director comprises a first chute section fixedly secured to the unloader and defining the first end of the material director and a second chute section extending at an angle from the first chute section and defining the second end of the material director.

7. The unloader of claim 6, wherein the second chute section is operably coupled to the first chute section so that the second chute section is positionable with respect to the first chute section beneath the pallet.

8. The unloader of claim 1, further comprising a container scale system supported on the pallet base and configured to measure a weight of the shipping container posing onto the loader.

9. The unloader of claim 1, further comprising a rack underlying the supporter and supporting the frame structure, the rack having a floor assembly beneath the material director.

10. The unloader of claim 9, further comprising a stabilizer extending from the rack, the stabilizer having a vertically-adjustable base configured to be raised and lowered relative to the rack for stabilizing the unloader.

11. An unloader assembly for a plurality of shipping containers, each shipping container having a pallet, a storage volume for a bulk material and a movable gate assembly having a downwardly extending handle, the unloader assembly comprising:
   a rack having a floor assembly;
   a frame structure extending from the floor assembly of the rack;
   a first pallet base supported by the frame structure and configured to receive the pallet of a first shipping container and support the first shipping container in an elevated position, wherein a full shipping container is positionable onto the first pallet base and an empty shipping container is removable from the first pallet base without disassembly of the unloader;
   a first gate moving mechanism comprising:
      a first track assembly connected to and supported by the pallet base; and
      a first gate mover assembly movably supported by the first track assembly and having a first gate receiver and engager, wherein the first gate receiver and engager receives the downwardly extending handle of the shipping container via one or more first upwardly extending hands and the first gate receiver and engager moves the movable gate assembly to a partially or fully opened position due to movement of the first gate mover assembly;
   a first material director having a first end located beneath the first pallet base subjacent of the first gate moving mechanism, the first material director extending downwardly therefrom and terminating at a second end opposite the first end, wherein bulk material from the first shipping container is dispensed into the first end and discharged from the second end of the first material director;
   a second pallet base supported by the frame structure and configured to receive the pallet of a second shipping container and support the second shipping container in an elevated position adjacent to the first shipping container, wherein a full shipping container is positionable onto the second pallet base and an empty shipping container is removable from the second pallet base without disassembly of the unloader;
   a second gate moving mechanism comprising:
      a second track assembly, connected to and supported by the pallet base; and
      a second gate mover assembly movably supported by the second track assembly and having a second gate receiver and engager, wherein the second gate receiver and engager receives the downwardly extending handle of the shipping container via one or more second upwardly extending hands and the second gate receiver and engager moves the movable gate assembly to a partially or fully opened position due to movement of the second gate mover assembly; and
   a second material director having a first end located beneath the second pallet base subjacent of the second gate moving mechanism, the second material director extending downwardly therefrom and terminating at a second end opposite the first end, wherein bulk material from the second shipping container is dispensed into the first end and discharged from the second end of the first material director.

12. The unloader assembly of claim 11, further comprising a vibrating mechanism operable to generate a vibration for dislodging the bulk material.

13. The unloader of claim 12, wherein the vibrating mechanism comprises a first vibrator connected to and supported by the first material director and operable to dislodge the bulk material travelling therethrough, and a second vibrator connected to and supported by the first material director and operable to dislodge the bulk material travelling therethrough.

14. The unloader assembly of claim 12, wherein the vibrating mechanism further comprises a control system configured to control a vibration parameter of the vibrating mechanism.

15. The unloader assembly of claim 14, wherein the vibration parameter is chosen from a vibration frequency, a vibration duration, or a combination thereof.

16. The unloader assembly of claim 11, wherein each of the first and second material directors comprise a first chute section fixedly secured to the unloader and defining the first end of the material director and a second chute section extending at an angle from the first chute section and defining the second end of the material director.

17. The unloader assembly of claim 16, wherein the second chute section is operably coupled to the first chute section so that the second chute section is positionable with respect to the first chute section beneath the pallet.

18. The unloader assembly of claim 11, further comprising a first container scale system supported on the first pallet base and configured to measure a weight of the first shipping container positioned onto the loader, and a second container scale system supported on the second pallet base and configured to measure a weight of the second shipping container positioned onto the loader.

19. The unloader assembly of claim 11, wherein the frame structure comprises a plurality of first leg members extending from the rack to the first pallet base and a plurality of second leg members extending from the rack to the second pallet base.

20. The unloader assembly of claim 11, further comprising a stabilizer extending from the rack, the stabilizer having a vertically-adjustable base configured to be raised and lowered relative to the rack for stabilizing the unloader.

\* \* \* \* \*